US007046685B1

(12) United States Patent
Matsuoka et al.

(10) Patent No.: US 7,046,685 B1
(45) Date of Patent: May 16, 2006

(54) SCHEDULING CONTROL SYSTEM AND SWITCH

(75) Inventors: Naoki Matsuoka, Kawasaki (JP);
Kenichi Kawarai, Kawasaki (JP);
Hiroshi Tomonaga, Kawasaki (JP);
Tsuguo Kato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/460,898

(22) Filed: Dec. 14, 1999

(30) Foreign Application Priority Data

Dec. 15, 1998 (JP) ............................ 10-355888

(51) Int. Cl.
*H04L 12/56* (2006.01)
*H04L 12/54* (2006.01)
*H04L 12/43* (2006.01)
*H04J 7/00* (2006.01)

(52) U.S. Cl. .................... 370/409; 370/412; 370/461; 709/213; 709/238

(58) Field of Classification Search ............... 370/230, 370/397, 398, 399, 254, 413, 461, 392, 409, 370/412; 709/213, 238
See application file for complete search history.

(56) References Cited

U.S. PATENT DOCUMENTS

| 5,509,001 | A | * | 4/1996 | Tachibana et al. ........... 370/230 |
| 5,590,123 | A | * | 12/1996 | Lyles et al. .................. 370/397 |
| 5,689,644 | A | * | 11/1997 | Chou et al. .................. 370/392 |
| 5,926,458 | A | * | 7/1999 | Yin ............................ 370/230 |
| 5,956,342 | A | * | 9/1999 | Manning et al. ............. 370/414 |
| 6,101,193 | A | * | 8/2000 | Ohba .......................... 370/429 |
| 6,262,986 | B1 | * | 7/2001 | Oba et al. ................... 370/399 |
| 6,359,861 | B1 | * | 3/2002 | Sui et al. ..................... 370/230 |
| 6,449,283 | B1 | * | 9/2002 | Chao et al. .................. 370/461 |
| 6,480,911 | B1 | * | 11/2002 | Lu ............................. 710/54 |
| 6,563,837 | B1 | * | 5/2003 | Krishna et al. .............. 370/413 |
| 6,614,790 | B1 | * | 9/2003 | Veres et al. ................. 370/395.2 |
| 6,654,374 | B1 | * | 11/2003 | Fawaz et al. ................ 370/394 |
| 6,667,984 | B1 | * | 12/2003 | Chao et al. .................. 370/414 |

OTHER PUBLICATIONS

1998 Electronics Information and Communication Society Communication Society Conference, A study on scheduling algorithms for input buffered ATM switches, K. Kawarai, et al., Fujitsu Laboratories Ltd.
Terabit Switch Architecture using Input Queueing Technique, K. Kawarai et al., Fujitsu Laboratories Ltd.
The Institute of Electronics, Information and Communication Engineers, Technical Report of IEICE, A Study on Large Scale Input Queueing Switch Architecture, H. Tomonaga, et al., Fujitsu Laboratories, Ltd.

* cited by examiner

*Primary Examiner*—Christopher Revak
*Assistant Examiner*—Christian LaForgia
(74) *Attorney, Agent, or Firm*—Katten Muchin Rosenman LLP

(57) ABSTRACT

A scheduling system is capable of causing no deterioration of characteristics even under equal and unequal loads, eliminating the necessity for high-speed repetitive scheduling and complicated arithmetic processes, simplifying its architecture and having its processing speed which does not depend upon a device capability. For attaining this system, an inter-highway pointer is updated to an adjacent line (rightward) when the scheduling for all the lines are finished. If the inter-highway pointer is updated N-times in the same direction (clockwise), the same pointer is updated to an adjacent line in a reverse direction (counterclockwise) in next N-processes of scheduling.

39 Claims, 76 Drawing Sheets

FIG.1
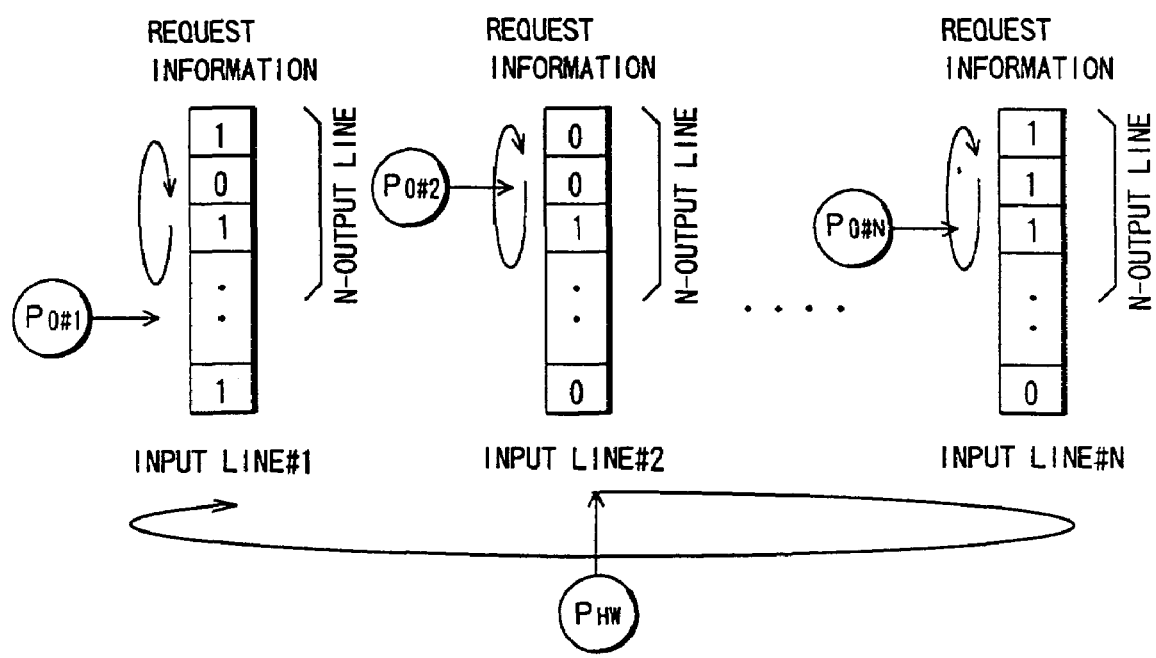
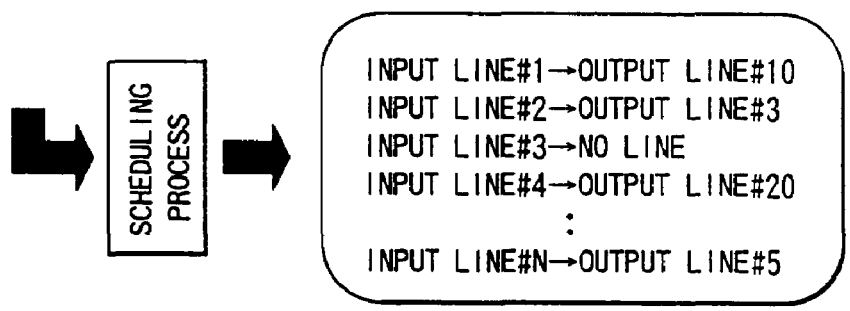

| | | INTRA-HW POINTER | REQUEST INFORMATION |
|---|---|---|---|
| | i1 o⟶o1 | Pi1=1 | (o3) |
| PHW=1 | i2 o⟶o2 | Pi2=2 | (o1, o3, o4) |
| | i3 o⟶o3 | Pi3=3 | (o2, o3) |
| | i4 o⟶o4 | Pi4=4 | (o2, o3) |

FIG. 9(a) INITIAL STATE (STEP0)

| | | INTRA-HW POINTER | SCHEDULING RESULT |
|---|---|---|---|
| | i1 o—o1 | *Pi1=4 | (o3) |
| PHW=1 | i2 o  o2 | Pi2=2 | (-) |
| | i3 o  o3 | Pi3=3 | (-) |
| | i4 o  o4 | Pi4=4 | (-) |

FIG. 9(b) AFTER STEP1

| | | INTRA-HW POINTER | SCHEDULING RESULT |
|---|---|---|---|
| | i1 o  o1 | Pi1=4 | (o3) |
| PHW=1 | i2 o  o2 | *Pi2=1 | (o4) |
| | i3 o  o3 | Pi3=3 | (-) |
| | i4 o—o4 | Pi4=1 | (-) |

FIG. 9(c) AFTER STEP2

| | | INTRA-HW POINTER | SCHEDULING RESULT |
|---|---|---|---|
| | i1 o  o1 | Pi1=4 | (o3) |
| PHW=1 | i2 o—o2 | Pi2=1 | (o4) |
| | i3 o  o3 | *Pi3=3 | (o2) |
| | i4 o  o4 | Pi4=4 | (-) |

FIG. 9(d) AFTER STEP3

| | | INTRA-HW POINTER | SCHEDULING RESULT |
|---|---|---|---|
| | i1 o  o1 | Pi1=4 | (o3) |
| PHW=1 | i2 o  o2 | Pi2=1 | (o4) |
| | i3 o  o3 | Pi3=3 | (o2) |
| | i4 o  o4 | Pi4=4 | (-) |

FIG. 9(e) AFTER STEP4

| | | INTRA-HW POINTER | SCHEDULING RESULT |
|---|---|---|---|
| | i1 o  o1 | Pi1=4 | (o3) |
| *PHW=2 | i2 o  o2 | Pi2=2 | (o4) |
| | i3 o  o3 | Pi3=3 | (o2) |
| | i4 o  o4 | Pi4=4 | (-) |

FIG. 9(f) AFTER STEP5

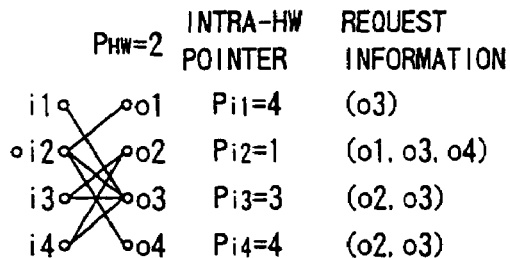
FIG. 10(a) INITIAL STATE (STEP0)
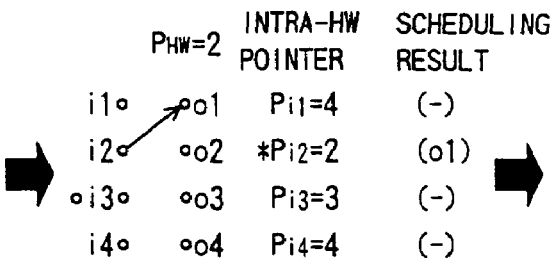
FIG. 10(b) AFTER STEP1
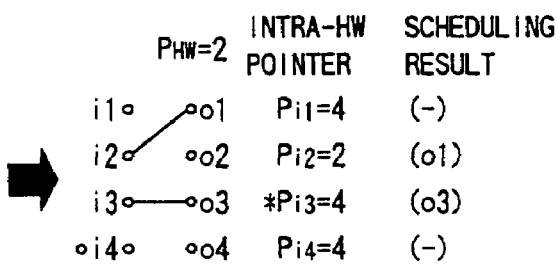
FIG. 10(c) AFTER STEP2
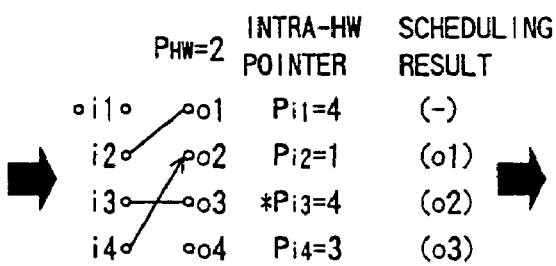
FIG. 10(d) AFTER STEP3
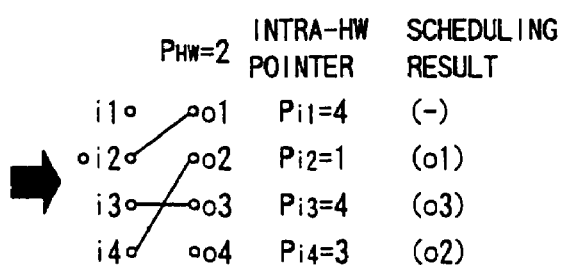
FIG. 10(e) AFTER STEP4
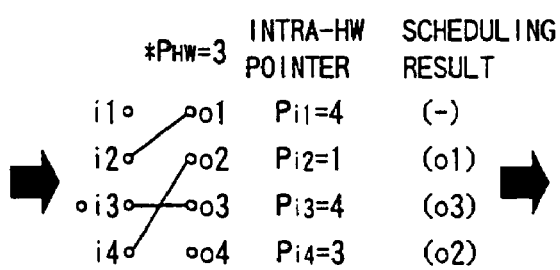
FIG. 10(f) AFTER STEP5

FIG.12
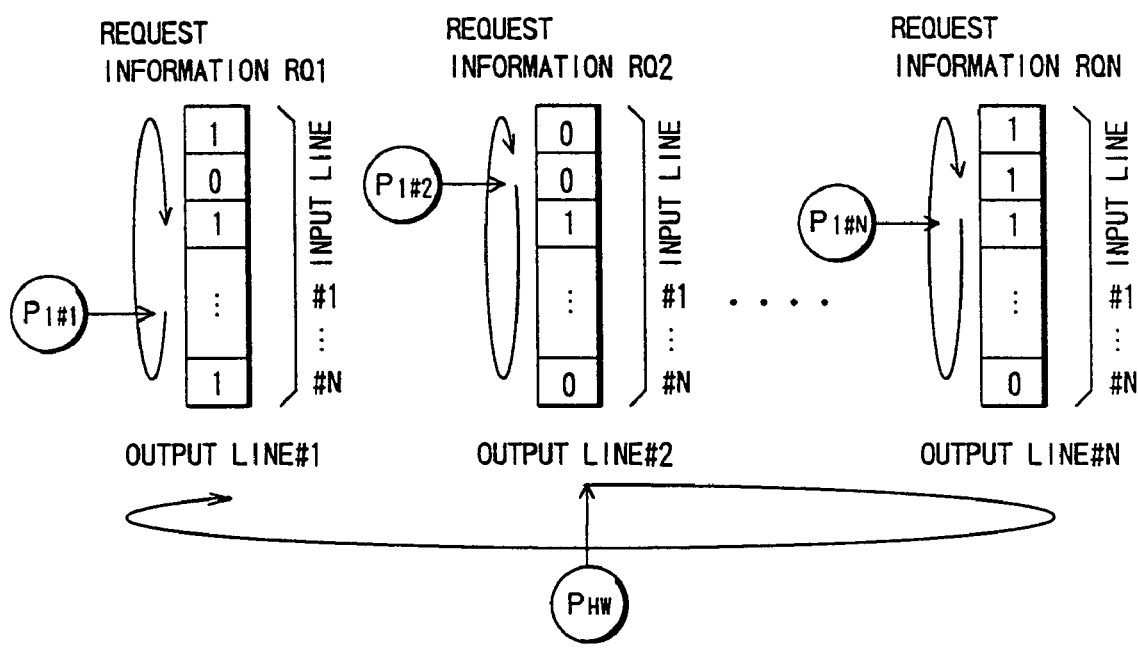
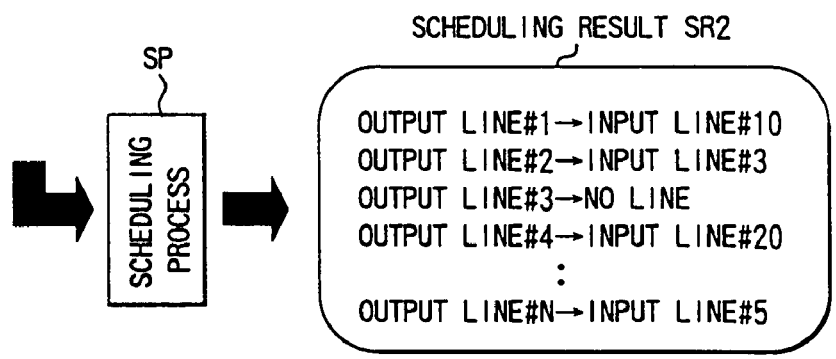

|  | $P_{HW}=1$ | INTRA-HW POINTER | REQUEST INFORMATION |
|---|---|---|---|
| | i1 | o1 | $P_{o1}=1$ | (i2) |
| | i2 | o2 | $P_{o2}=2$ | (i3, i4) |
| | i3 | o3 | $P_{o3}=3$ | (i1, i2, i3, i4) |
| | i4 | o4 | $P_{o4}=4$ | (i2) |

FIG. 13(a) INITIAL STATE (STEP0)

|  | $P_{HW}=1$ | INTRA-HW POINTER | SCHEDULING RESULT |
|---|---|---|---|
| | i1 | o1 | *$P_{o1}=3$ | (i2) |
| | i2 | o2 | $P_{o2}=2$ | (-) |
| | i3 | o3 | $P_{o3}=3$ | (-) |
| | i4 | o4 | $P_{o4}=4$ | (-) |

FIG. 13(b) AFTER STEP1

|  | $P_{HW}=1$ | INTRA-HW POINTER | SCHEDULING RESULT |
|---|---|---|---|
| | i1 | o1 | $P_{o1}=3$ | (i2) |
| | i2 | o2 | *$P_{o2}=4$ | (i3) |
| | i3 | o3 | $P_{o3}=3$ | (-) |
| | i4 | o4 | $P_{o4}=4$ | (-) |

FIG. 13(c) AFTER STEP2

|  | $P_{HW}=1$ | INTRA-HW POINTER | SCHEDULING RESULT |
|---|---|---|---|
| | i1 | o1 | $P_{o1}=3$ | (i2) |
| | i2 | o2 | $P_{o2}=4$ | (i3) |
| | i3 | o3 | *$P_{o3}=3$ | (i4) |
| | i4 | o4 | $P_{o4}=4$ | (-) |

FIG. 13(d) AFTER STEP3

|  | $P_{HW}=1$ | INTRA-HW POINTER | SCHEDULING RESULT |
|---|---|---|---|
| | i1 | o1 | $P_{o1}=3$ | (i2) |
| | i2 | o2 | $P_{o2}=4$ | (i3) |
| | i3 | o3 | $P_{o3}=3$ | (i4) |
| | i4 | o4 | $P_{o4}=4$ | (-) |

FIG. 13(e) AFTER STEP4

|  | *$P_{HW}=2$ | INTRA-HW POINTER | SCHEDULING RESULT |
|---|---|---|---|
| | i1 | o1 | $P_{o1}=3$ | (i2) |
| | i2 | o2 | $P_{o2}=4$ | (i3) |
| | i3 | o3 | $P_{o3}=3$ | (i4) |
| | i4 | o4 | $P_{o4}=4$ | (-) |

FIG. 13(f) AFTER STEP5

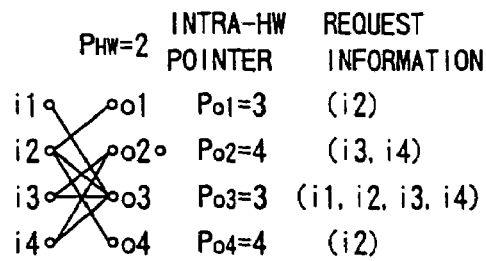
FIG. 14(a) INITIAL STATE (STEP0)
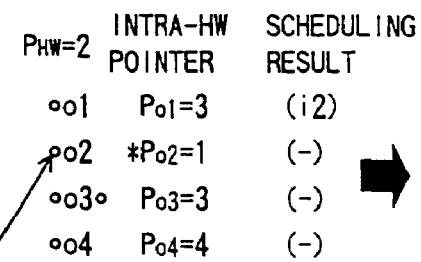
FIG. 14(b) AFTER STEP1
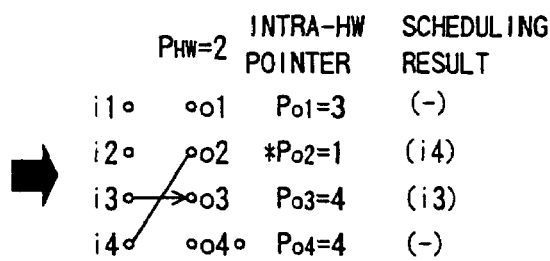
FIG. 14(c) AFTER STEP2
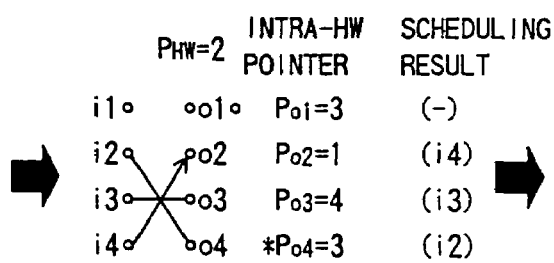
FIG. 14(d) AFTER STEP3
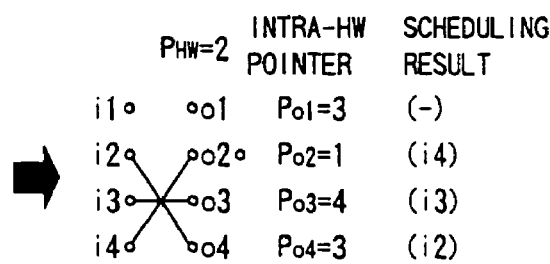
FIG. 14(e) AFTER STEP4
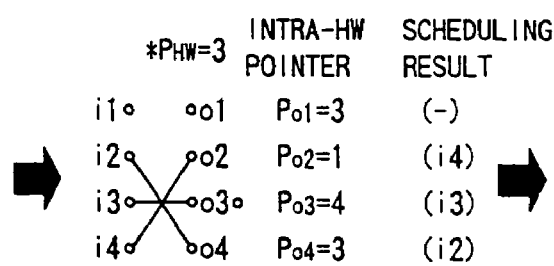
FIG. 14(f) AFTER STEP5

|  | PRIORTY | REQUEST |
|---|---|---|
| | P$_{pri}$=1 1st 2nd 3rd 4th | INFORMATION | i1 — o1   o1 o3 o2 o4   (o3)
i2 — o2   o4 o2 o1 o3   (o1,o2)
i3 — o3   o3 o1 o4 o2   (o2,o4)
i4 — o4   o2 o4 o3 o1   (o2,o3)

FIG. 18(a) INITIAL STATE (STEP0)

|  | PRIORTY | SCHEDULING |
|---|---|---|
| | P$_{pri}$=1 1st 2nd 3rd 4th | RESULT | i1 — o1   o1 o3 o2 o4   (-)
i2 — o2   o4 o2 o1 o3   (-)
i3 — o3   o3 o1 o4 o2   (-)
i4 — o4   *o2 o4 o3 o1  (o2)

FIG. 18(b) AFTER STEP1

|  | PRIORTY | SCHEDULING |
|---|---|---|
| | P$_{pri}$=1 1st 2nd 3rd 4th | RESULT | i1 — o1   *o1 o3 o2 o4   (o3)
i2 — o2   o4 o2 o1 o3    (-)
i3 — o3   *o3 o1 o4 o2   (o1)
i4 — o4   o2 o4 o3 o1    (o2)

FIG. 18(c) AFTER STEP2

|  | PRIORTY | SCHEDULING |
|---|---|---|
| | P$_{pri}$=1 1st 2nd 3rd 4th | RESULT | i1 — o1   o1 o3 o2 o4   (o3)
i2 — o2   o4 o2 o1 o3   (-)
i3 — o3   o3 o1 o4 o2   (o1)
i4 — o4   o2 o4 o3 o1   (o2)

FIG. 18(d) AFTER STEP3

|  | PRIORTY | SCHEDULING |
|---|---|---|
| | P$_{pri}$=1 1st 2nd 3rd 4th | RESULT | i1 — o1   o1 o3 o2 o4   (o3)
i2 — o2   o4 o2 o1 o3   (-)
i3 — o3   o3 o1 o4 o2   (o1)
i4 — o4   o2 o4 o3 o1   (o2)

FIG. 18(e) AFTER STEP4

|  | PRIORTY | SCHEDULING |
|---|---|---|
| | *P$_{pri}$=1 1st 2nd 3rd 4th | RESULT | i1 — o1   o1 o3 o2 o4   (o3)
i2 — o2   o4 o2 o1 o3   (-)
i3 — o3   o3 o1 o4 o2   (o1)
i4 — o4   o2 o4 o3 o1   (o2)

FIG. 18(f) AFTER STEP5

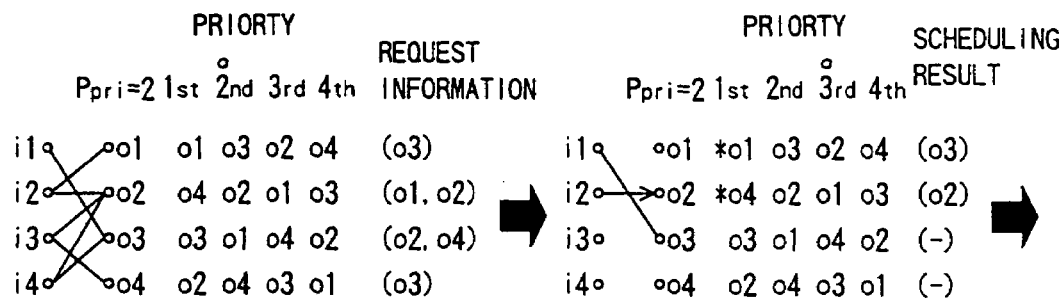
FIG. 19(a) INITIAL STATE (STEP0)
FIG. 19(b) AFTER STEP1
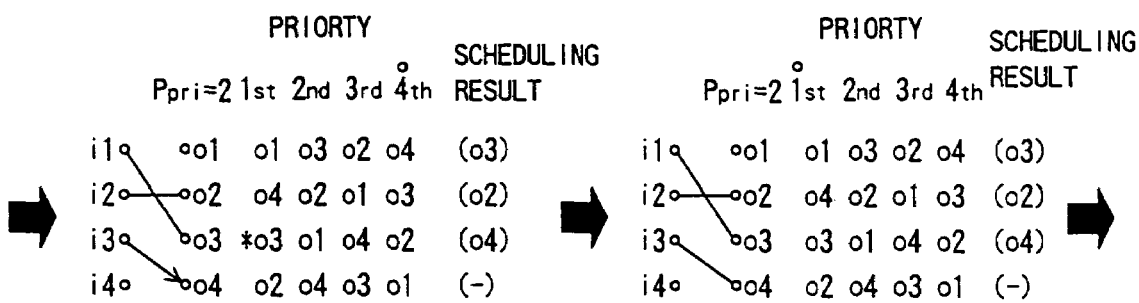
FIG. 19(c) AFTER STEP2
FIG. 19(d) AFTER STEP3
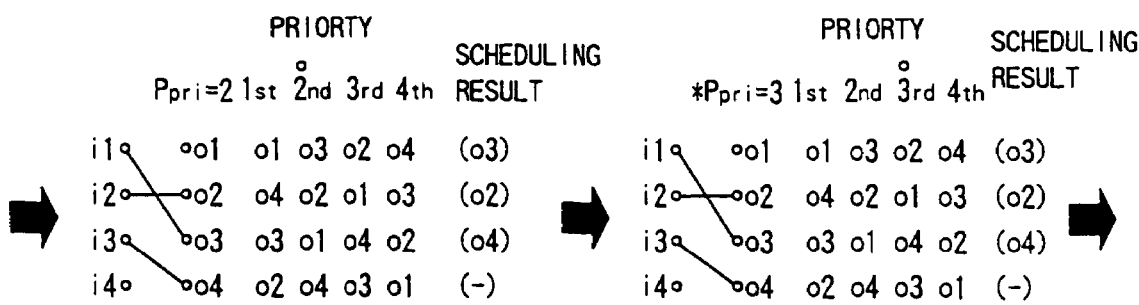
FIG. 19(e) AFTER STEP4
FIG. 19(f) AFTER STEP5

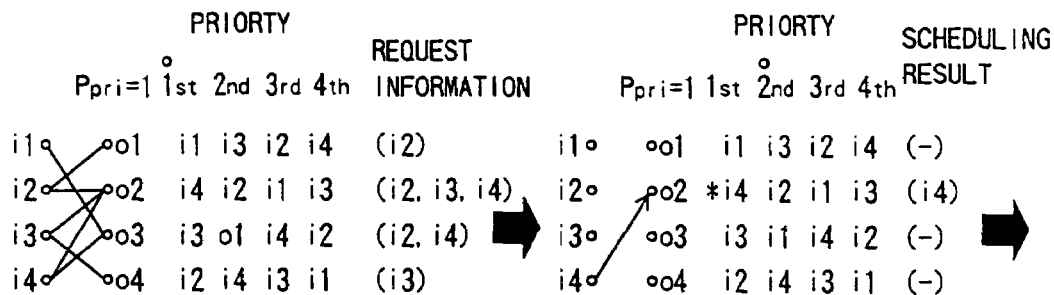
FIG. 22(a) INITIAL STATE (STEP0)
FIG. 22(b) AFTER STEP1
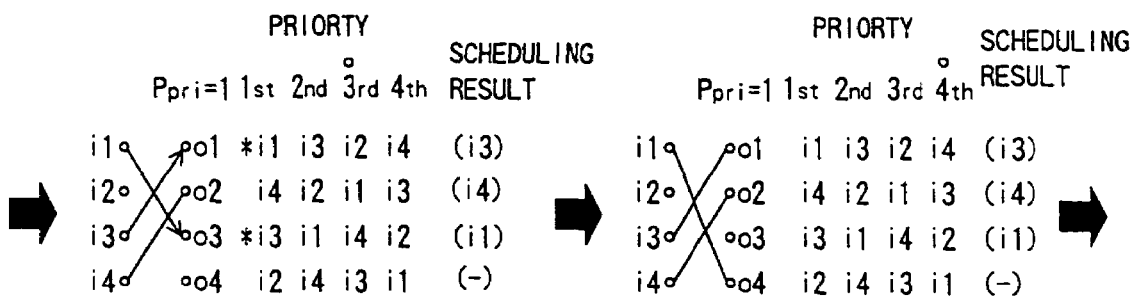
FIG. 22(c) AFTER STEP3
FIG. 22(d) AFTER STEP4
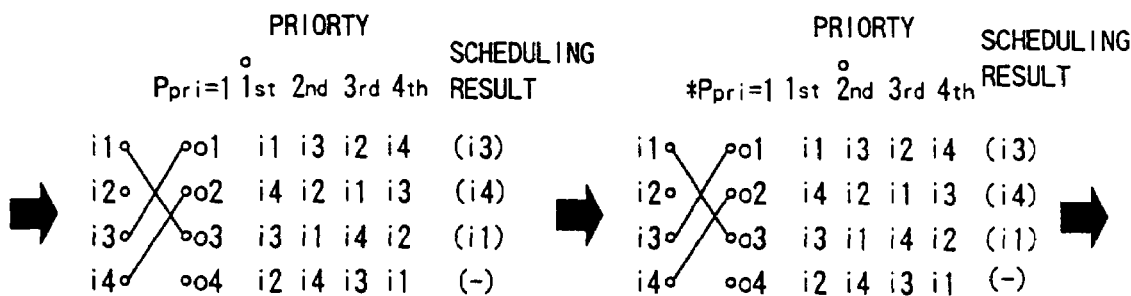
FIG. 22(e) AFTER STEP4
FIG. 22(f) AFTER STEP5

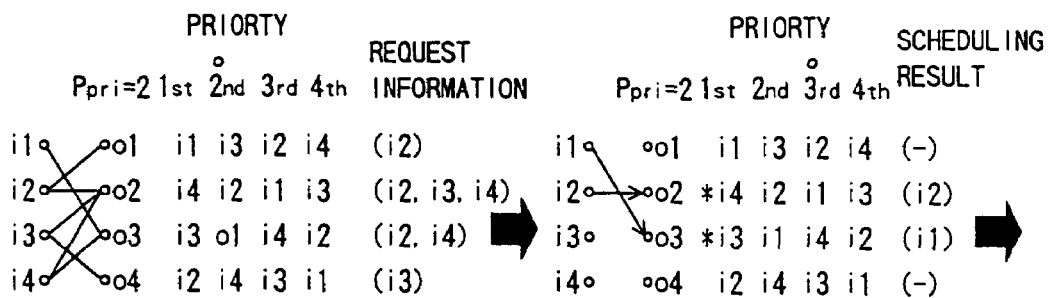
FIG. 23(a) INITIAL STATE (STEP0)
FIG. 23(b) AFTER STEP1
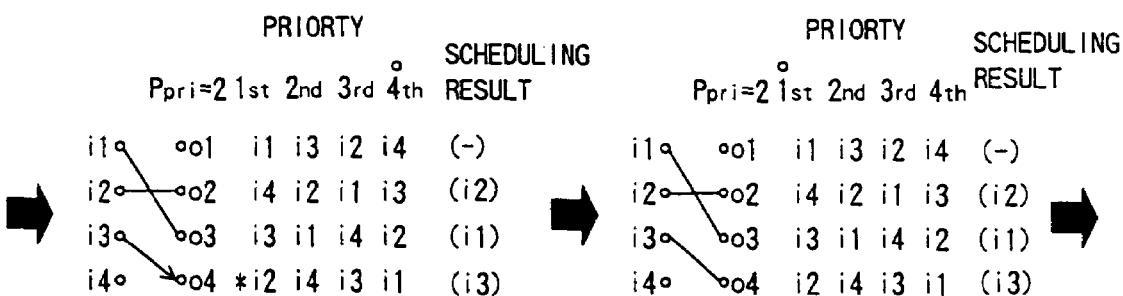
FIG. 23(c) AFTER STEP3
FIG. 23(d) AFTER STEP4
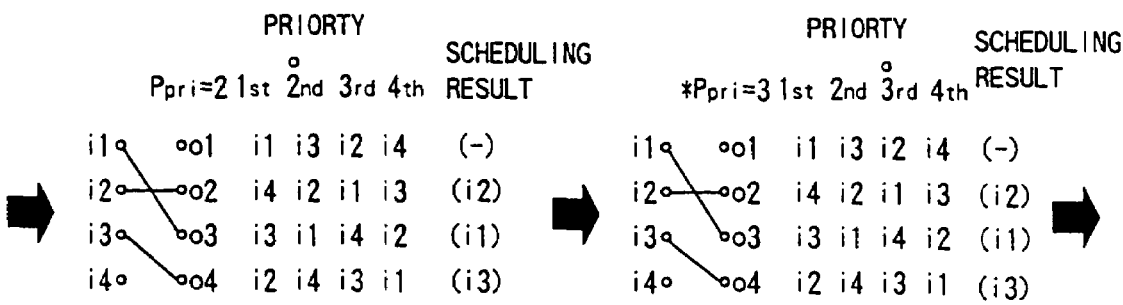
FIG. 23(e) AFTER STEP4
FIG. 23(f) AFTER STEP5

FIG.26 (a)

TENTATIVE CANDIDATE SELECTION IN SCHEDULING PROCESSING UNIT A

| | PRIORTY 1st 2nd | SCHEDULING RESULT | | | PRIORTY 1st 2nd | SCHEDULING RESULT |
|---|---|---|---|---|---|---|
| i1○────○o1 | o1 o2 | (o1) | ➡ | i1○──➤○o1 | o1 o2 | (o1) |
| i2○────○o2 | o2 o1 | (o2) | | i2○──➤○o2 | o2 o1 | (o2) |

TENTATIVE CANDIDATE SELECTION IN SCHEDULING PROCESSING UNIT B

| | PRIORTY 1st 2nd | SCHEDULING RESULT | | | PRIORTY 1st 2nd | SCHEDULING RESULT |
|---|---|---|---|---|---|---|
| i1○────○o3 | o3 o4 | (o3) | ➡ | i1○──➤○o3 | o3 o4 | (o3) |
| i2○   ○o4 | o4 o3 | (-) | | i2○   ○o4 | o4 o3 | (-) |

TENTATIVE CANDIDATE SELECTION IN SCHEDULING PROCESSING UNIT C

| | PRIORTY 1st 2nd | SCHEDULING RESULT | | | PRIORTY 1st 2nd | SCHEDULING RESULT |
|---|---|---|---|---|---|---|
| i3○   ○o1 | o1 o2 | (-) | ➡ | i3○   ○o1 | o1 o2 | (-) |
| i4○   ○o2 | o2 o1 | (-) | | i4○   ○o2 | o2 o1 | (-) |

TENTATIVE CANDIDATE SELECTION IN SCHEDULING PROCESSING UNIT D

| | PRIORTY 1st 2nd | SCHEDULING RESULT | | | PRIORTY 1st 2nd | SCHEDULING RESULT |
|---|---|---|---|---|---|---|
| i3○──➤○o3 | o3 o4 | (o3) | ➡ | i3○──➤○o3 | o3 o4 | (o3) |
| i4○   ○o4 | o4 o3 | (o3) | | i4○   ○o4 | o4 o3 | (-) |

FIG.26 (b)

| | PRIORTY 1st 2nd 3rd 4th | SCHEDULING RESULT | | | PRIORTY 1st 2nd 3rd 4th | SCHEDULING RESULT |
|---|---|---|---|---|---|---|
| i1○────○o1 | o1 o3 o2 o4 | (o1, o3) | ➡ | i1○──➤○o1 | o3 o4 o1 o2 | (o1) |
| i2○────○o2 | o2 o1 o4 o3 | (o2) | | i2○──➤○o2 | o4 o3 o2 o1 | (o2) |
| i3○────○o3 | o3 o4 o1 o2 | (o3) | | i3○──➤○o3 | o1 o2 o3 o4 | (o3) |
| i4○   ○o4 | o4 o3 o2 o1 | (-) | | i4○   ○o4 | o2 o1 o4 o3 | (-) |

FIG.33

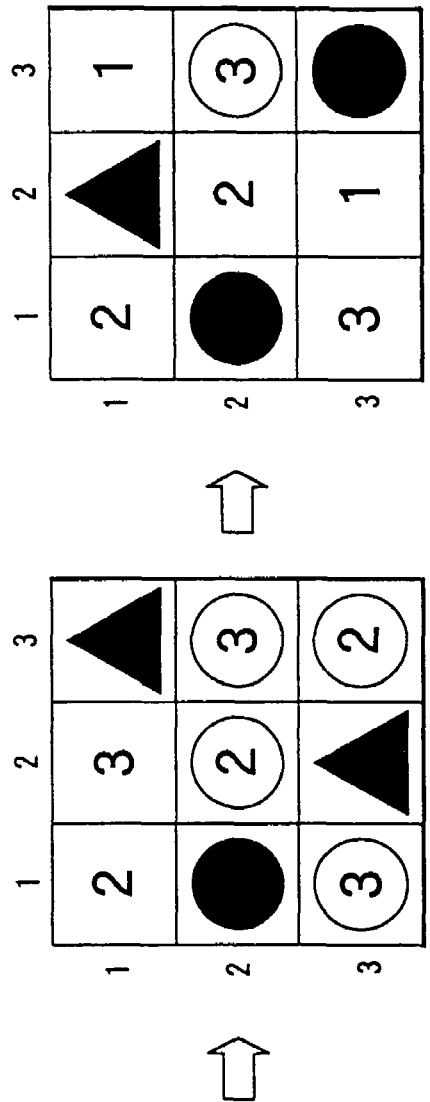

CONCERNING PRIORITY 1: VALID CELL ESTABLISHMENT IS MADE WHEN DATA EXISTS. IDLE CELL TENTATIVE ESTABLISHMENT IS MADE WHEN NO DATA EXISTS

CONCERNING PRIORITY 2: ESTABLISHMENT IS MADE WHEN DATA EXIST AND VALID CELL WITH PRIORITY 1 OF SAME I/O LINE IS NOT YET ESTABLISHED. TENTATIVE ESTABLISHMENT IS RULED OUT WHEN DATA EXISTS AND IDLE CELL WITH PRIORITY 1 OF SAME I/O LINE IS ESTABLISHED. THEREAFTER, TENTATIVE ESTABLISHMENT FOR IDLE CELL IS MADE WHEN NO DATA EXISTS, AND WHEN NEITHER ESTABLISHMENT NOR TENTATIVE ESTABLISHMENT IS MADE IN SAME I/O LINE

SAME PROCESSES ARE REPEATED AS FOR PRIORITY 3

○ : DATA EXISTING
● : READOUT ESTABLISHED (VALID CELL)
▲ : READOUT TENTATIVELY ESTABLISHED (IDLE CELL)

FIG.35

| | SCHEDULER UNIT | INPUT LINE NUMBER | DELAY COMPONENT (INPUT BUFFER) | INPUT TO SW | |
|---|---|---|---|---|---|
| T=0 | 8 7 6 5 4 3 2 1<br>3 2 1 3 2 1 3 2<br>8 7 6 5 4 3 2 1<br>1 3 2 1 3 2 1 3<br>8 7 6 5 4 3 2 1<br>2 1 3 2 1 3 2 1 | #3<br>#2<br>#1 | 3<br>2<br>1 | | |
| T=1 | 9 8 7 6 5 4 3 2<br>1 3 2 1 3 2 1 3<br>9 8 7 6 5 4 3 2<br>2 1 3 2 1 3 2 1<br>9 8 7 6 5 4 3 2<br>3 2 1 3 2 1 3 2 | #3<br>#2<br>#1 | 3<br>2<br>1 | 1<br>[1] | START OF PHASE ADJUSTMENT<br>△T=0, SW=1 |
| T=2 | 10 9 8 7 6 5 4 3<br>2 1 3 2 1 3 2 1<br>10 9 8 7 6 5 4 3<br>3 2 1 3 2 1 3 2<br>10 9 8 7 6 5 4 3<br>1 3 2 1 3 2 1 3 | #3<br>#2<br>#1 | 3<br>2<br>1 | 1<br>[3]<br>2<br>[2] | △T=1, SW=1 |
| T=3 | 11 10 9 8 7 6 5 4<br>3 2 1 3 2 1 3 2<br>11 10 9 8 7 6 5 4<br>1 3 2 1 3 2 1 3<br>11 10 9 8 7 6 5 4<br>2 1 3 2 1 3 2 1 | #3<br>#2<br>#1 | 3<br>2<br>1 | 1<br>[2]<br>2<br>[1]<br>3<br>[3] | PHASE ADJUSTMENT<br>=△SW-△T=-1<br>△T=2, SW=1, △SW=2-1=1 |
| T=4 | 12 11 10 9 8 7 6 5<br>1 3 2 1 3 2 1 3<br>12 11 10 9 8 7 6 5<br>2 1 3 2 1 3 2 1<br>12 11 10 9 8 7 6 5<br>3 2 1 3 2 1 3 2 | #3<br>#2<br>#1 | 3<br>1=2-1<br>1 | 2<br>[3]<br>4<br>[3]<br>4<br>[1] | DISCARD CELL WHEN REDUCING PHASE DIFFERENCE |
| T=5 | 13 12 11 10 9 8 7 6<br>2 1 3 2 1 3 2 1<br>13 12 11 10 9 8 7 6<br>3 2 1 3 2 1 3 2<br>13 12 11 10 9 8 7 6<br>1 3 2 1 3 2 1 3 | #3<br>#2<br>#1 | 3<br>2<br>1 | 3<br>[1]<br>6<br>[1]<br>5<br>[2] | START OF PHASE ADJUSTMENT, PHASE DIFFERENCE |
| T=6 | 14 13 12 11 10 9 8 7<br>3 2 1 3 2 1 3 2<br>14 13 12 11 10 9 8 7<br>1 3 2 1 3 2 1 3<br>14 13 12 11 10 9 8 7<br>2 1 3 2 1 3 2 1 | #3<br>#2<br>#1 | 1=3-2<br>2<br>1 | 6<br>[1]<br>6<br>[2]<br>6<br>[3] | DISCARD CELL WHEN REDUCING PHASE DIFFERENCE<br>COMPLETION OF PHASE ADJUSTMENT |

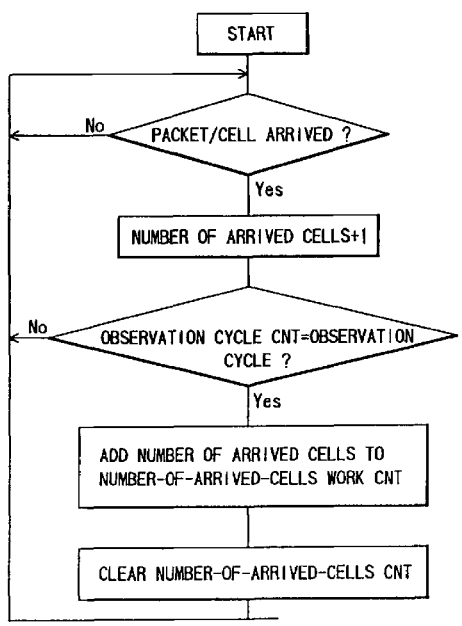
FIG. 50(a) LOAD OBSERVATION FLOW
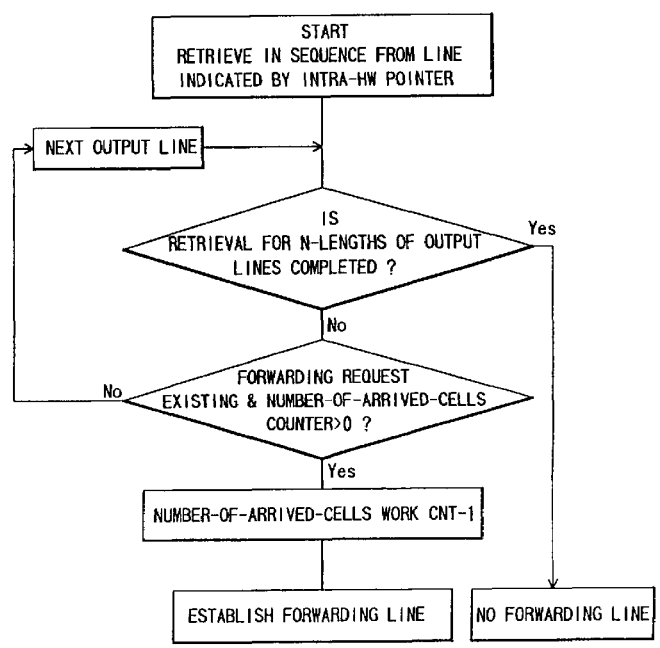
FIG. 50(b) SCHEDULING FLOW

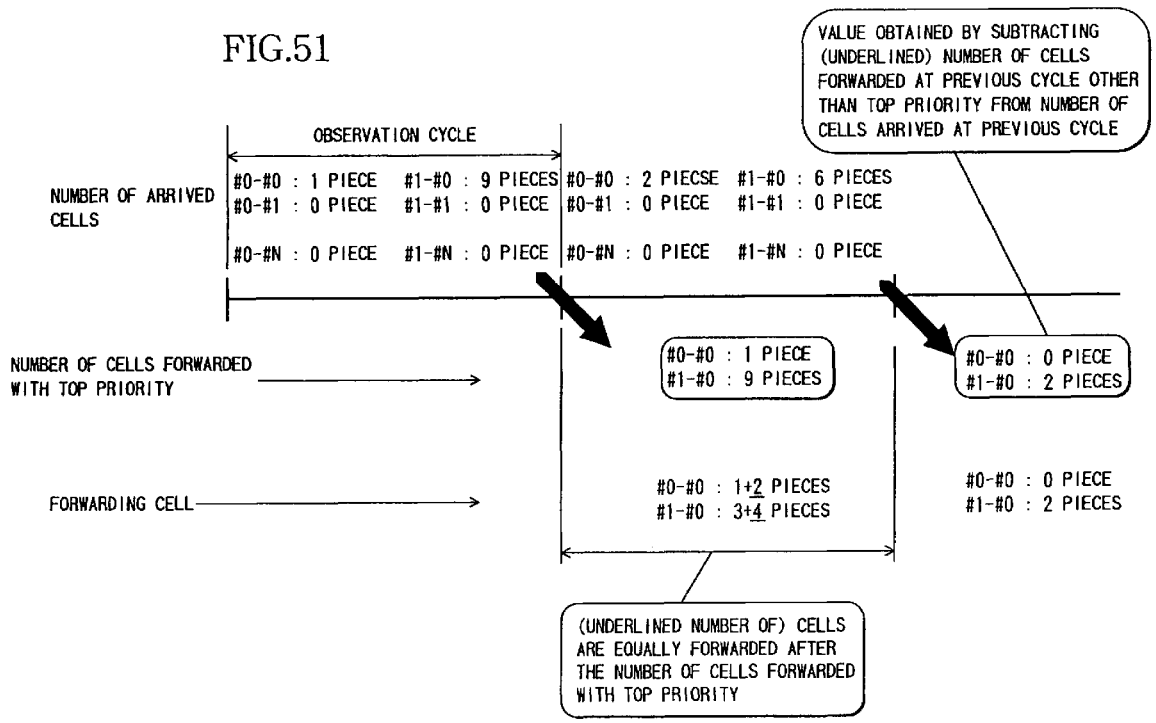

FIG. 54(a) LOAD OBSERVATION FLOW ON QUEUE LENGTH BASE (PART 1)
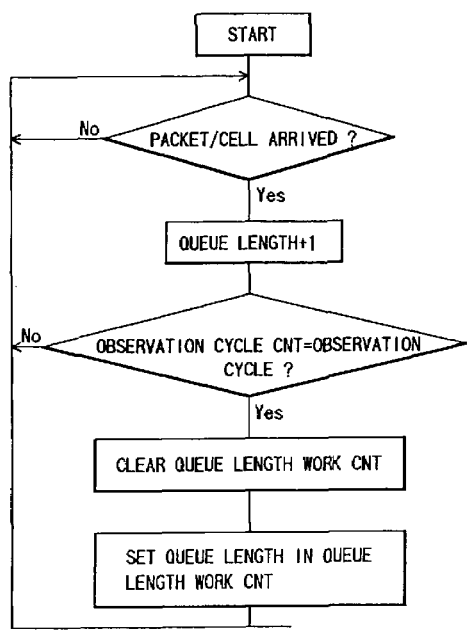
FIG. 54(b)(c) LOAD OBSERVATION FLOW BASED ON QUEUE LENGTH BASE (PART 2)
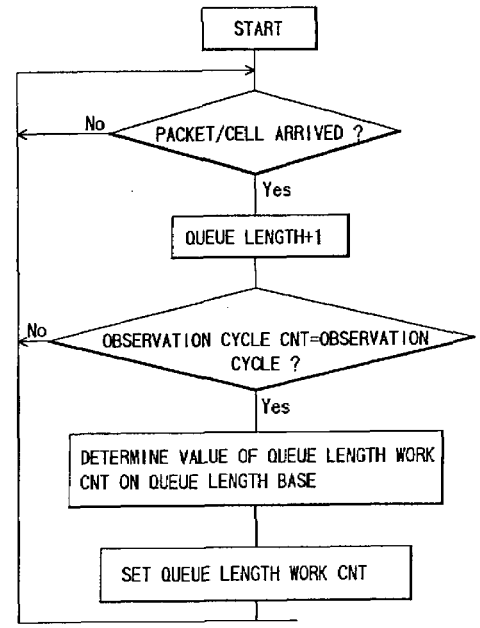

FIG.55 a) MEASURED RESULTS ARE SET INTACT
  PATH#0-PATH#0 QUEUE LENGTH:10PIECES→10
  PATH#1-PATH#0 QUEUE LENGTH:2PIECES→1
  PATH#2-PATH#0 QUEUE LENGTH:5PIECES→3
  PATH#3-PATH#0 QUEUE LENGTH:10PIECES→10 b) FORWARDING RATE AT NEXT CYCLE IS DETERMINED AT RATE OF QUEUE LENGTH(EXAMPLE:FIXED CYCLE=20-PACKET TIME
  PATH#0-PATH#0 QUEUE LENGTH:10PIECES→10/(10+2+5+10)*20=7.4=7
  PATH#1-PATH#0 QUEUE LENGTH:2PIECES→2/(10+2+5+10)*20=1.4=1
  PATH#2-PATH#0 QUEUE LENGTH:5PIECES→5/(10+2+5+10)*20=3.7=3
  PATH#3-PATH#0 QUEUE LENGTH:10PIECES→10/(10+2+5+10)*20=7.4=7 c) FORWARDING RATE AT NEXT CYCLE IS DETERMINED CORRESPONDING TO QUEUE LENGTH(EXAMPLE:FIXED CYCLE=20-PACKET TIME
  QUEUE LENGTH:1~3→0.05*20→1
  QUEUE LENGTH:3~10→0.1*20→2      ← RANGE AND RATE MAY BE ARBITRARILY SET
  QUEUE LENGTH:10~20→0.2*20→4
  QUEUE LENGTH:20~30→0.3*20→6

QUEUE LENGTH:90~100→1.0*20→20

PATH#0-PATH#0 QUEUE LENGTH:10PIECES→2
  PATH#1-PATH#0 QUEUE LENGTH:2PIECES→1
  PATH#2-PATH#0 QUEUE LENGTH:5PIECES→2
  PATH#3-PATH#0 QUEUE LENGTH:10PIECES→2

FIG. 58(a) RING CONNECTION
FIG. 58(b) TANDEM CONNECTION
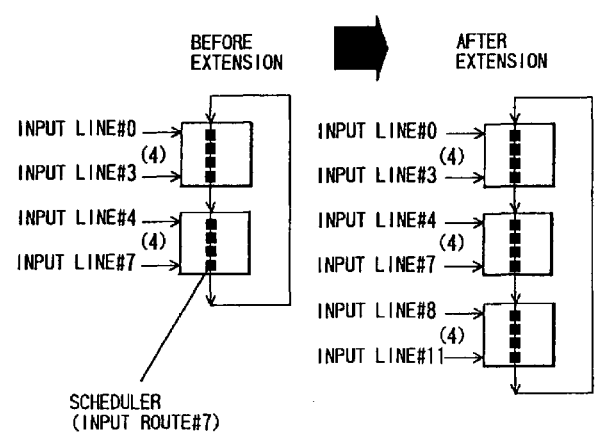
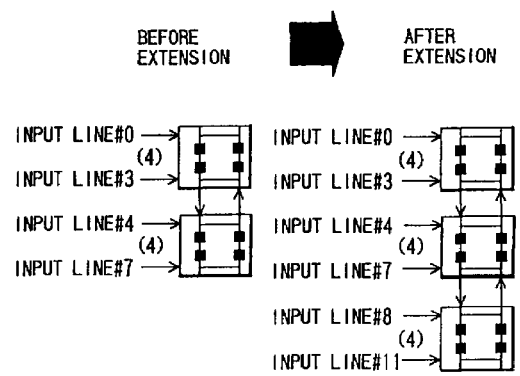

FIG.59
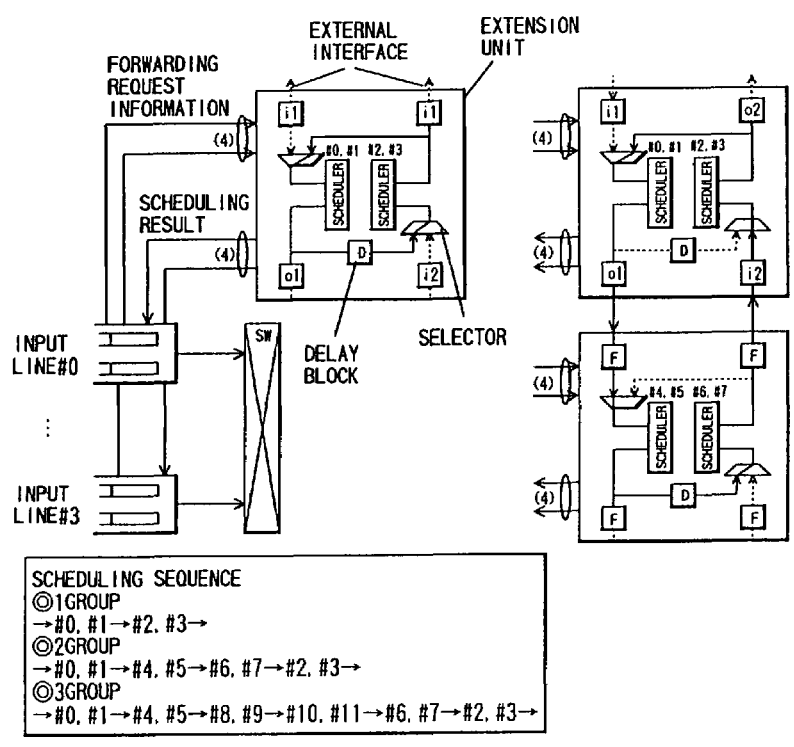
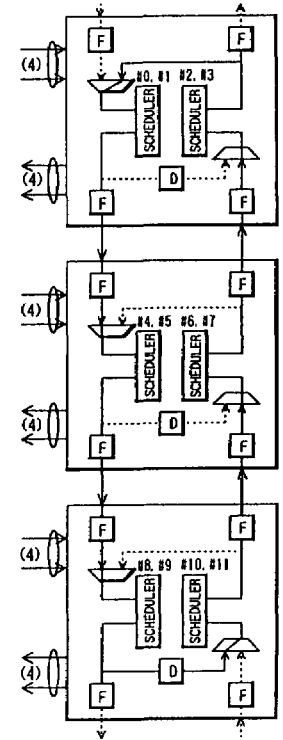

LN: SELECTION LINE NUMBER
QoS: QoS NUMBER OF ARITHMETIC UNIT
PT(n): ELAPSED TIME OF LINE n
$LB\_r(n, q)$: LEAKY BUCKET COUNTER VALUE (READ VALUE) OF LINE n, QoSq
$LB\_w(n, q)$: LEAKY BUCKET COUNTER VALUE (UPDATED VALUE) OF LINE n, QoSq
$IF(n, q)$: LEAKY BUCKET ADDED VALUE OF LINE n, QoSq
$DF(n, q)$: LEAKY BUCKET SUBTRACTED VALUE OF LINE n, QoSq

FIG. 74(a) LAST-TIME SELECTION TIME RETAINING RAM BIT MAP (EXAMPLE)
SELECTION TIME VALID FLAG(1 BIT)
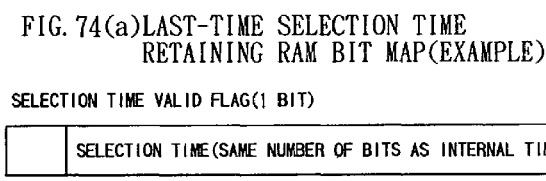
FIG. 74(b) TIME REGION BASED VALID TIME CHECKING METHOD
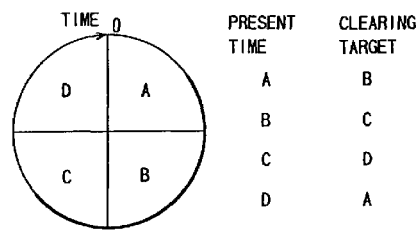
FIG. 74(c) THRESHOLD VALUE BASED VALID TIME CHECKING METHOD
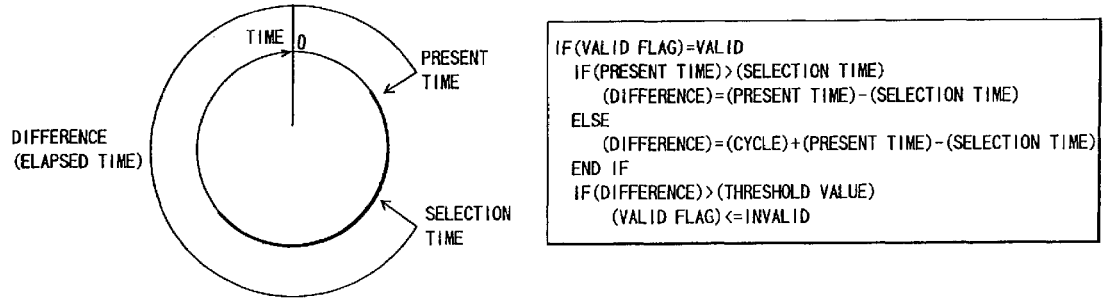

FIG.77

|  | POINTER=0→ | POINTER=1→ | POINTER=2→ | POINTER=3 |
|---|---|---|---|---|
| INPUT LINE #0 | [1] | 4 | [3] | [2] |
| INPUT LINE #1 | 2 | [1] | 4 | 3 |
| INPUT LINE #2 | 3 | 2 | 1 | 4 |
| INPUT LINE #2 | 4 | 3 | 2 | 1 |

FIG.78

|  | POINTER=0→ | POINTER=1→ | POINTER=2→ | POINTER=1 |
|---|---|---|---|---|
| INPUT LINE #0 | [1] | 4 | [3] | 4 |
| INPUT LINE #1 | 2 | [1] | 4 | [1] |
| INPUT LINE #2 | 3 | 2 | 1 | 2 |
| INPUT LINE #2 | 4 | 3 | 2 | 3 |

FIG.79

|  | 1ST | 2ND | 3RD |
|---|---|---|---|
| INPUT LINE #0 | OUTPUT LINE #0 | OUTPUT LINE #2 | OUTPUT LINE #1 |
| INPUT LINE #1 | OUTPUT LINE #2 | OUTPUT LINE #1 | OUTPUT LINE #0 |
| INPUT LINE #2 | OUTPUT LINE #1 | OUTPUT LINE #0 | OUTPUT LINE #2 |

FIG.80

|  | OUTPUT LINE #0 | OUTPUT LINE #1 | OUTPUT LINE #2 |
|---|---|---|---|
| INPUT LINE #0 | 1 | 2 | 3 |
| INPUT LINE #1 | 3 | 1 | 2 |
| INPUT LINE #2 | 2 | 3 | 1 |

SCHEDULING CONTROL SYSTEM AND SWITCH

BACKGROUND OF THE INVENTION

The present invention generally relates to a scheduling control system, and more particularly to a technology effective in an application to the scheduling control system in an input buffer type switch, which is defined as one method of constructing a large-scale ATM switch.

With an explosive spread of Internet and an advent of media dealing with large-capacity and high-quality information over the recent years, it has been highly expected to prepare a large-scale communications infrastructure capable of flexibly dealing with the large-capacity data. Then, the concerns are concentrated upon a switch having a capacity as large as several hundreds of giga order to several tera order as a key for actualization thereof.

A basic input buffer type switch (on the left side in FIG. 2) having a unit buffer for every input route, has a problem of HOL (Head of Line) blocking, and it is known that a throughput thereof increases up to approximately 58.6% at the maximum.

As contrivances for avoiding the HOL blocking, as shown in FIG. 3, there have been proposed some systems for scheduling a forwarding right in accordance with a predetermined algorithm by logically dividing an input buffer unit per output route. What is known as one of those systems is a system for executing Request/Acknowledge control between the input and the output. Based on this system, the scheduling process is executed by transferring and receiving the information many times between the input and the output. Further, according to another system for obtaining such a combination as to maximize an I/O combination, complicated arithmetic processes are repeatedly executed for obtaining an optimum combination.

The input buffer unit has logical buffers corresponding to the number of output lines, but has hitherto come to require a leaky bucket counter (LB counter) for QoS (Quality of Service) band control per output line in order to perform the QoS band control. For example, when the number of output lines is 128 and the number of QoS classes is 16, the number of the band control LB counters becomes as large as 2048 pieces.

A system (FIG. 4) for constructing a unit switch in a cross-bar type, a batcher sorter type (FIG. 5) and a batcher/Banyan type (FIG. 6) may be exemplified by way of conventional methods of constructing a large-scale input buffer type switch oriented switch module.

Further, as a cell synchronizing method, there is a method of taking the synchronization of a cell heading by transferring a frame pulse indicating the cell heading and the data in parallel as shown in FIG. 7.

The above-described system involving the use of the Request/Acknowledge control requires repetitive transfers and receipts of the information between the input and output in order to enhance the characteristic, and therefore a high-speed device is needed for completing the processing within a 1-packet time. Further, according to the system for obtaining the maximum combination, the complicated logical operation is needed and is hard to be actualized by hardware.

Moreover, according to the system using simple round robin control for determining the output line in the scheduling process, the respective lines are always equally allocated under the round robin control. Then, there arises a problem of causing a remarkable decline of forwarding delay from a high-load input line if there are forwarding requests from a plurality of lines with different input loads (unequal loads) with respect to one single output line.

Further, in the large-scale switch accommodating a multiplicity of lines, if the LB counter for band control is structured of logics, a quantity of hardware becomes tremendous. Moreover, if constructed by use of a memory, a problem is that it is difficult to access simultaneously within the 1-packet time.

Furthermore, when the large-scale switch is constructed of a plurality of LSIs or packages, there are required inputs/outputs (I/O) between the LSIs or the packages, of which the number is four times the number of cell highways, and the number of I/Os (inputs/outputs) results in a bottleneck.

Further, in the batcher sorter type, the number of I/Os which is twice the number of cell highways may suffice, however, a configuration per block is different. A problem is that there arise necessities for structuring plural types of LSIs or packages because of I/O lengths being different and for making a phase adjustment.

In addition, when the large-scale switch is constructed of the plurality of LSIs or packages, according to the batcher sorter type etc, it is required that the unit switch be inserted in a path on a minimum scale on the occasion of an extension of the switch scale, and hence the paths are required to be re-configured, resulting in such a problem that the system must be stopped when extending the switch scale.

Moreover, when the large-scale switch is constructed of the plurality of LSIs or packages, the switch module is constructed of only the unit sorters, and, for attaining this construction, it is required that the cells having the output line numbers different from each other without being overlapped be always transferred to the switch module from all the input lines. Hence, if there are not the cells that should be forwarded, what is required of the input buffer is to impart dummy output line numbers to idle cells.

As for this point, Japanese Patent Application Laid-Open No.Hei 3-36841 discloses that the input buffer imparts the output line numbers to the idle cells. According to this technology, the input lines corresponding in sequence to the output line numbers are determined. Therefore, a problem is that the above technology can not be applied to a scheduling system in which the input buffer is constructed of a logical queue per output route, and the input lines can not be univocally determined according to such a sequence of the output line numbers as to determine the output route with respect to each input buffer under contention control.

Further, if the switch, the input buffer and the scheduler are structured extending over a plurality of packages, there might occur desynchronization of a cell level between the packages. In the system for transferring the frame indicating the cell heading and the data in parallel as shown in FIG. 7, however, there exists such a problem that asynchronism of the cell level can not be detected.

The present invention was devised in view of the points described above, and therfore, has an object to actualize a scheduling system capable of causing no deterioration of characteristics even under equal and unequal loads, having no necessity for high-speed repetitive scheduling or complicated arithmetic processes, simplifying its structure, and having a processing speed that does not depend upon a device capability.

SUMMARY OF THE INVENTION

FIGS. 1 and 8 illustrate basic architecture of the present invention.

A scheduling system is structured to determine a proper output route based on a forwarding request given from an input buffer unit and to perform scheduling so that packets forwarded from respective input buffers are routed to different output routes.

Referring to FIG. 8, a request information management unit manages per input line a forwarding request to the output line desired by each input line, and also manages the number of forwarding requests, wherein "0" and "1" represent an existence and non-existence of the forwarding request.

A load observation unit counts the number of pieces of request information arrived within a fixed cycle per logical output queue, and measures a load.

An inter-highway pointer (PHW) is held by an inter-highway pointer control unit, and, on the occasion of scheduling, indicates which input line the scheduling starts from. The scheduling for N-lengths of input lines is performed in sequence from the input line indicated by the inter-highway pointer (PHW).

An intra-highway pointer (PO#j: j is a line number) is held by an intra-highway pointer control unit, and, when selecting one desired output line among a plurality of output lines, indicates which output line a retrieval begins from. The scheduling processing unit retrieves the output lines from the one indicated by the intra-highway pointer (PO#j), and gives a forwarding right to the line detected at first.

The scheduling processing unit starts the retrieval from the lines indicated by the intra-highway pointer and by the inter-highway pointer, and implements the scheduling in accordance with a load obtained in the load observation unit.

The scheduling is done to give the forwarding right to the line (on condition of its being unselected by other lines) found at first under the pointer control among the lines having the forwarding requests. Then, the pointer is updated so that the line given the forwarding right comes to have a low priority in a next scheduling process.

The pointer is updated by the following procedures.

FIG. 1 shows one characteristic pointer control operation according to the present invention. The inter-highway pointer is, just when finishing the scheduling for all the lines, updated to an adjacent line (rightward). At this time, if updated N-times in the same direction (clockwise), next N-processes of scheduling are executed to update to adjacent lines in the reverse direction (counterclockwise).

The intra-highway pointer updates an intra-highway pointer value to a line next to the line determined by the scheduling processing unit. If the line indicated by the intra-highway pointer has a request and has already been scheduled by other lines, however, the updating is not carried out.

An operational principle of the present invention will be explained more specifically with reference to FIGS. 9–11.

Note that 4×4 switches are assumed, the input lines are designated by i1~i4, and the output lines are denoted by o1~o4 in this example. Then, each of the solid lines connecting those lines implies an existence or non-existence of the forwarding request. For example, FIG. 9 shows that an input line #2 has a forwarding request with respect to output lines #1, #3, #4.

To start with, an example of the first scheduling process in FIG. 9 will be explained referring to a flowchart in FIG. 11.

At the first onset, a scheduling processing unit 4 executes the scheduling for N-lengths of lines from the input line indicated by the inter-highway pointer (PHW) set as shown in S0 in FIG. 11. In this example, because of the inter-highway pointer (PHW)=1, the scheduling is performed in sequence of the input line #1, the line #2, the line #3 and the line #4.

(a) STEP0 (Initial State)

It is presumed that the input line #1 has the request for the output line #3, the input line #2 has the request for the output lines #1, #3, #4, the input line #3 has the request for the output lines #2, #3, and the input line #4 has the request for the output lines #2, #3.

It is assumed that the inter-highway pointer (PHW) be set such as the initial value=1, and the intra-highway pointers (Pi#j: j is the highway number) for the respective input lines be set such as Pi1=1, Pi2=2, Pi3=3, and Pi4=4.

(b) STEP1

The input line #1 has the forwarding request for the output line #3. The intra-highway pointer (Pi1) points "1", and it is retrieved whether the forwarding request is given from the output line #1 or not (S1). In this example, since there is only the request for the output line #3, it is the output line #3 that is detected at first, and the output line for the input line #1 is determined to be #3 (S2, S3). Then, the intra-highway pointer is updated to the output line next to the determined line (i.e., updated such as Pi1=4) (S4), and the next input line is informed of the determined line number (#3).

(c) STEP2

Next, the same process is also executed with respect to the input line #2.

Namely, the output lines requested by the input line #2 are #1, #3 and #4. The intra-highway pointer (Pi2) points "2", and it is retrieved whether the request is given from the output line #2 or not. In this example, the line #3 is, though found at first, already ensured by the input line #1 and therefore can not be used. Accordingly, the output line #4, which is to be found next, is set as a forwarding line. Then, the intra-highway pointer is updated to the output line next to the determined line (i.e., Pi2=1), and the next line is informed of the determined line #4 together with the ensured information (#3) received from the previous line.

(d) STEP3

Next, the same process is also executed with respect to the input line #3.

Namely, the output lines requested by the input line #3 are #2, and #3. The intra-highway pointer (Pi3) points "3", and it is retrieved whether the request is given from the output line #3 or not. In this example, the line #3 is, though found at first, already ensured by the input line #1 and therefore can not be used. Accordingly, the output line #2, which is to be found next, is set as a forwarding line.

According to first through fifth aspects of the present invention, as in this example, there is the request in the line (#3) indicated by the intra-highway pointer, and besides this line is already ensured by other line, in which case the highway pointer is not updated. With the operation being thus done, the equal scheduling can be attained. Then, the next line is informed of the determined line number #2 together with the ensured information (#3, #4) received from the previous line.

(e) STEP4

The same process is also executed with respect to the last line.

Namely, the output lines requested by the input line #4 are #2 and #3. The intra-highway pointer (Pi4) points "4", and it is retrieved whether the request is given from the output line #4 or not. In this example, the line #2 is, though found at first, already ensured by the input line #3 and therefore can not be used. Further, the output line #3, which is to be found next, is also used by the input line #1 and, after all, can not be forwarded to any output lines. In this case also, the intra-highway pointer is not updated.

Thereafter, it is judged whether over a maximum number of lines (LINE) or not (S5). Only when over this maximum number, the output line number is returned to #1, and confirmations about all the outputs are made (S6). Only when over the maximum number of lines, the input line number is returned to #1 (S7).

(f) STEP5

Just when finishing the scheduling for N-lengths of lines (S8), the inter-highway pointer is updated for the scheduling at a next cycle (S9). That is, PHW=2.

The following results are obtained by the scheduling process described above.

Input Line #1→Output Line #3
Input Line #2→Output Line #4
Input Line #3→Output Line #2
Input Line #4→No Line At the next second scheduling cycle, as shown in FIGS. 10(a)–10(f), the operations (STEP0~STEP5) exemplified in FIG. 9 are similarly repeated, and the flowchart in FIG. 11 is likewise applied. The inter-highway pointer points "21" this time, and hence the scheduling starts with the input line #2 and proceeds in sequence such as #3, #4 and #1.

Supposing that the request information is the same as that in the first scheduling, the results of the scheduling are as follows:

Input Line #1→No Line
Input Line #2→Output Line #1
Input Line #3→Output Line #3
Input Line #4→Output Line #2

FIG. 12 shows an operational principle (2) according to the second aspect of the present invention.

Functions in the respective functional blocks are basically the same as those based on the operational principle (1) in FIG. 1, however, roles thereof are different.

A request information management unit 1 manages per output line a forwarding request given from each input line with respect to the output line, wherein the existence or non-existence of the forwarding request is represented by "0" or "1". The inter-highway pointer (PHW) indicates which output line the scheduling starts from. The scheduling for N-lengths of lines is performed in sequence from the input line indicated by the inter-highway pointer (PHW).

The intra-highway pointer (Pi#j: j is a line number), when selecting one of a plurality of input lines sending the forwarding request to the output lines, indicates which input line a retrieval begins from. The retrieval is executed in sequence from the input line indicated by the intra-highway pointer (Pi#j), and a forwarding right is given to the forwarding request detected at first.

The scheduling processing unit 4 controls the intra-highway pointer and the inter-highway pointer, and gives the forwarding right to the line, found at first, with the request unselected by other lines, and reflects the line given the forwarding permission as a scheduling result SR2 in the next scheduling processing unit.

Thus, the basic operation in the case of making the inter-highway pointer correspond to the output line and the intra-highway pointer correspond to the input line, is the same as that in the example of the scheduling process based on the operational principle (1). The scheduling processing unit 4, however, performs the scheduling for N-lengths of lines from the output line indicated by the inter-highway pointer. In this example, because of the inter-highway pointer (P highway)=1, the scheduling is conducted in sequence of the output line #1, the line #2, the line #3 and the line #4.

A specific explanation will hereinafter be given along with the examples of the scheduling processes exemplified in FIG. 13 (first time) and FIG. 14 (second time).

(a) STEP0: FIG. 13

It is presumed that the input line #1 has the request for the output line #3, the input line #2 has the request for the output lines #1, #3, #4, the input line #3 has the request for the output lines #2, #3, and the input line #4 has the request for the output lines #2, #3.

When viewed in terms of the output line, the requests may be otherwise conceived as follows.

The output line #1 has the forwarding request from the input line #2, the output line #2 has the request from the input lines #3, #4, the output line #3 has the request from the input lines #1, #2, #3, #4, and the output line #4 has the request from the input line #2.

It is assumed that the inter-highway pointer (PHW) be set such as the initial value=1, and the intra-highway pointers (PO#j: j is the highway number) for the respective output lines be set such as P01=1, P02=2, P03=3, and P04=4.

(b) STEP1

The output line #1 has the forwarding request from the input line #2. The intra-highway pointer (PO) points "1", and it is retrieved whether the forwarding request is given from the input line #1 or not. In this example, since there is only the request from the input line #2, it is the input line #2 that is detected at first, and the input line #2 is determined to be a forwarding permission line. Then, the intra-highway pointer is updated to the input line next to the determined line (i.e., P01=3), and the next output line is informed of the determined line number (#2).

(c) STEP2

Next, the same process is also executed with respect to the output line #2.

The input lines giving the requests to the output line #2 are #3 and #4. The intra-highway pointer (P02) points "2", and it is retrieved whether the request is given from the input line #2 or not. In this example, the line #3 is found at first. This line is not ensured by other line, therefore the output line #3 is determined to be a forwarding permission line. Then, the intra-highway pointer is updated to the input line next to the determined line (i.e., P02=4), and the next output line is informed of the determined line number (#3) together with the ensured information (#2) received from the previous line.

(d) STEP3

Next, the same process is also executed with respect to the output line #3.

The input lines giving the requests to the output line #3 are #1, #2, #3, and #4. The intra-highway pointer (P03) points "3", and it is retrieved whether the request is given from the input line #3 or not. In this example, the line #3 is, though found at first, already ensured by the output line #2 and therefore can not be used.

Accordingly, the input line #4, which is to be found next, is set as a forwarding line.

According to the first through fifth aspects of the present invention, as in this example, there is the request in the line (#3) indicated by the intra-highway pointer, and besides this line is ensured by other line, in which case the intra-highway pointer is not updated. With the operation being thus done, the equal scheduling can be attained. Then, the next line is informed of the determined line number #4 together with the ensured information (#2, #3) received from the previous line.

(e) STEP4

The same process is also executed with respect to the last line.

The input line giving the forwarding request to the output line #4 is #2. The intra-highway pointer (P04) points "4", and it is retrieved whether the forwarding request is given from the input line #4 or not. In this example, the line #2 is, though found at first, already ensured by the output line #1 and therefore can not be used. According to the fifth aspect of the invention, the forwarding right is therefore given to none of the input lines after all. In this case also, the intra-highway pointer is not updated.

(f) STEP5

Just when finishing the scheduling for N-lengths of lines, the inter-highway pointer is updated for the scheduling at a next cycle. That is, PHW=2.

The following results are obtained by the scheduling process described above.

Input Line #1→No Line
Input Line #2→Output Line #1
Input Line #3→Output Line #2
Input Line #4→Output Line #3

At the next second scheduling cycle, as shown in FIGS. 14(a)–14(f), the operations (STEP0~STEP5) exemplified in FIG. 13 are similarly repeated.

The inter-highway pointer points "2" this time, and hence the scheduling proceeds in sequence such as the output lines #2, #3, #4 and #1.

Supposing that the request information is the same as that in the first scheduling, the results of the scheduling are as follows:

Input Line #1→No Line
Input Line #2→Output Line #4
Input Line #3→Output Line #3
Input Line #4→Output Line #2

Note that in STEP3 shown in FIGS. 13 and 14, the intra-highway pointer is not updated if ensured by other line but may be updated always to a line next to the selected line for simplifying the control.

Further, all the inter-highway pointers are updated to the next line just when finishing the scheduling for N-lengths of lines, and the start-of-scheduling line is changed at every scheduling cycle.

The intra-highway pointer updates the intra-highway pointer value to the line next to the line determined by the scheduling processing unit 4. According to the fifth aspect of the invention, if there is the request for the line indicted by the intra-highway pointer and this line is already scheduled for other line, however, the updating is not carried out. The priorities in the selection are equally allocated per scheduling.

According to the third aspect of the invention, in the discussion made so far, the scheduling processing unit updates the inter-highway pointer to the next adjacent line at the every scheduling cycle, and updates the intra-highway pointer to the next line adjacent to the line with the forwarding determined. The inter-highway pointer may, however, be updated to the line next to the line with the forwarding determined at first during the scheduling cycle, and the intra-highway pointer may also be updated to the next line adjacent to the line with the forwarding determined (Claim 4).

Namely, as in the following example, the pointer may be moved to the input line next to the input line having obtained the forwarding right at first.

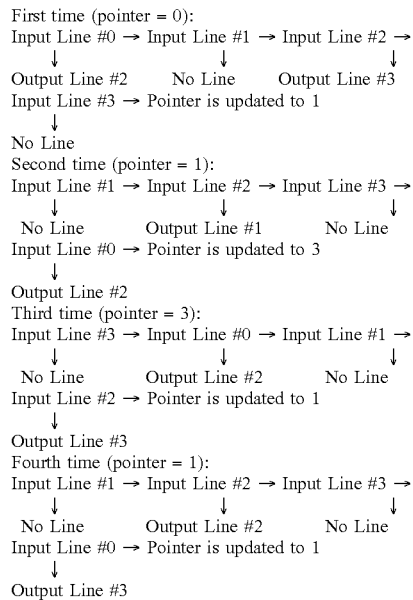

It is presumed that the forwarding requests be given from the respective input lines in the following case.
Input line #0→Output Line #0, Output Line #1
Input line #1→Output Line #0, Output Line #1
Input line #2→No request
Input line #3→No request FIG. 77 shows the priorities of the scheduling sequence in each pointer process.

FIG. 77
Priorities of scheduling sequence in each pointer process

|  | Pointer = 0 → | Pointer = 1 → | Pointer = 2 → | Pointer = 3 |
|---|---|---|---|---|
| Input line #0 | 1 | 4 | 3 | 2 |
| Input line #1 | 2 | 1 | 4 | 3 |
| Input line #2 | 3 | 2 | 1 | 4 |
| Input line #2 | 4 | 3 | 2 | 1 |

When comparing the input lines #1 with the lines #1, three input lines #0 (lower number) among four lines are able to obtain the forwarding right earlier (the squared numbers have higher priorities), with the result that the equal scheduling can not be implemented.

Next, the priorities according to the fourth aspect of the invention of the present invention are shown in FIG. 78.

FIG. 78
Priorities of scheduling sequence in each pointer process

|  | Pointer = 0 → | Pointer = 1 → | Pointer = 2 → | Pointer = 1 |
|---|---|---|---|---|
| Input line #0 | 1 | 4 | 3 | 4 |
| Input line #1 | 2 | 1 | 4 | 1 |

-continued

FIG. 78
Priorities of scheduling sequence in each pointer process

|  | Pointer = 0 → | Pointer = 1 → | Pointer = 2 → | Pointer = 1 |
|---|---|---|---|---|
| Input line #2 | 3 | 2 | 1 | 2 |
| Input line #2 | 4 | 3 | 2 | 3 |

When the pointer=2, the pointer by which the input line #0 is preferentially selected is the one next to #0, i.e., #1. In the case of comparing the input line #0 with the line #1 in terms of their priorities, the priorities are equally given, whereby the impartial scheduling can be attained.

FIG. 15 shows the present invention in terms of principle by exemplifying a scheduling control system according to a seventh aspect of the invention, for selecting one of pieces of request information on scheduling target lines.

Herein, it is assumed by way of one example that a certain output line has the forwarding requests from four input lines, and the input line #0 is selected in the scheduling of the last time (a previous state in FIG. 15). Then, it is also presumed that in the scheduling of this time (a present state in FIG. 15), the intra-highway pointer ("P" in FIG. 15) exists at the input line #1, and the requests are given from the input lines #0, #2, #3.

Herein, bitmap information (in which "1" represents an existence of the request, while "0" represents non-existence of the request) of N bits (4 bits in this example), is divided into two masks from a point indicated by the intra-highway pointer. Then, the mask after the intra-highway pointer is referred to as a mask-A, and the mask before the intra-highway pointer is referred to as a mask-B. This can be easily actualized by preparing exclusive two mask patterns (Masks-A, B in FIG. 15) with the intra-highway pointer being interposed therebetween, and taking a logic AND between the mask patterns and the N-bits request information.

Then, with respect to each of them, a location where "1" is detected at first is obtained by use of a low-number selection logic circuit which will be mentioned later on.

Referring to FIG. 15, the lowest number line in which "1" is set is "2" in the mask-A and "0" in the mask-B. Herein, there must be a necessity for choosing any one of these two results. If "1" exists in the mask-A, the result in the mask-A is preferentially set as a final result. Whereas if not, the result in the mask-B is adopted, thereby making it feasible to draw the lowest number line closest to the line indicated by the intra-highway pointer.

FIG. 16 shows pipeline processing of the scheduling according to the second aspect of the present invention.

The high-speed retrieving method has been shown in FIG. 15. In the case of a region in which the number-of-lines N is extemely large and applying a low-speed device, however, it is difficult to perform the scheduling for a whole number of lines within a certain unit time (e.g., a 1-cell time).

In such a case, to be specific, a plurality of scheduling processing units 4 based on the operational principles (1) and (2) are prepared and contrived to independently execute the processes.

Namely, according to the scheduling method based on the operational principles (1) and (2), the scheduling process completes per line, and hence, if it can be only known which line was selected, more precisely, what the inter-highway pointer was about in the last scheduling process, the scheduling of a next cycle may be carried out without waiting for results of scheduling for other lines. FIG. 16, however, shows a case where the scheduling processes for totally 8 lines are executed by use of the four scheduling processing units each capable of scheduling for two lines within a certain unit time.

The scheduling cycle terminates at a 4-unit time. A next scheduling cycle starts after one unit time (a 1-cell transfer time), and the scheduling is executed in sequence (1st, 2nd, 3rd, 4th, . . . ) in FIG. 16, whereby the result of scheduling, though an initial fixed delay might occur, is obtained per unit time.

Referring to FIG. 16, the letters a, b, c, d . . . h designate line numbers. The first scheduling starts from T1 indicating the 1-cell transfer time and terminates at T4. The second scheduling starts from T2 and terminates at T5. The reason why the second scheduling starts from "b" is that the inter-highway pointer described above is updated at every scheduling cycle.

FIG. 17 shows a structure of principle (an operational principle (3)) according to a twenty fourth aspect of the present invention.

The request information management unit 1 manages per input line a forwarding request to an output line desired by each input line, wherein the existence or non-existence of the forwarding request is represented by "0" or "1".

A priority pattern PP1 indicates a priority when determining which output line the forwarding right is given to, and has the priorities different between the input lines. A priority pointer (Ppri) indicates which pattern among N-pieces of priority patterns a retrieval begins from, and all the patterns are retrieved in sequence from the pattern indicated by the priority pointer.

The scheduling processing unit confirms whether or not each input line has the forwarding request for the output line indicated by the priority pattern, and, if there is the request and the output line thereof is not used by other input line, a scheduling result SR3 is given with that line serving as a forwarding line.

FIGS. 18–20 show examples of the scheduling process based on the operational principle (3) which uses the priority pattern PP1.

The scheduling processing unit confirms whether or not the input line has the forwarding request for the output line indicated by the priority pattern, and, if there is the forwarding request, imparts the forwarding right to that line. There are N-pieces of priority patterns, and the scheduling is performed by confirming all the N-patterns starting from the pattern indicated by the priority pointer.

The first pattern (1st) in this example implies that the forwarding right is given in a case where the input line #1 has the forwarding request for the output line #1, the input line #2 has the forwarding request for the output line #4, the input line #3 has the forwarding request for the output line #3, and the input line #4 has the forwarding request for the output line #2.

To start with, the first scheduling process in FIG. 18 will be exemplified with reference to a flowchart in FIG. 20.

(a) STEP0

It is presumed that the input line #1 has the request for the output line #3, the input line #2 has the request for the output lines #1, #2, the input line #3 has the request for the output lines #1, #2, #4, and the input line #4 has the request for the output lines #2, #3.

It is also assumed that the priority pointer (Ppri) be set such as an initial value=1 (S10 in FIG. 20).

(b) STEP1

The scheduling processing unit confirms whether or not each input line has the request for the output line indicated by the priority pattern 1st (S11). In this example, since the input line #4 has the request for the output line #2 (S12), the input line #4 is given the forwarding right to the output line #2.

(c) STEP2

The scheduling processing unit confirms whether or not each input line has the request for the output line indicated by a priority pattern 2nd. In this example, each of the input lines #1, #2, #3 has the request for the output line indicated by the priority 2nd. The output line #2 requested by the input line #2 is, however, already ensured for the input line #4, and therefore the forwarding right can not be given thereto. Accordingly, the input line #1 is given only the forwarding right to the output line #3, and the input line #3 is given only the forwarding right to the output line #1.

(d) STEP3

The scheduling processing unit confirms whether or not each input line has the request for the output line indicated by a priority pattern 3rd. In this example, the input line #2 has the request for the output line indicated by the priority 3rd but is already ensured for the input line #3, and therefore the forwarding right can not be imparted thereto.

(e) STEP4

The scheduling processing unit confirms whether or not each input line has the request for the output line indicated by a priority pattern 4th. In this example, even when making the confirmation as to each input line, there is no input line having the request for the output line shown by the priority pattern 4th.

Thereafter, the confirmations as to all the output lines are made (S13), and the priority pattern number is updated (S14). Only when over the maximum priority pattern number, the input line number is returned to #1 (S15), and the confirmations about all the patterns are made (S16).

(f) STEP5

Just when finishing the N-processes of scheduling, the priority pointer is updated (S17).

Namely, Ppri=2.

The following results are obtained by the scheduling process described above.

Input Line #1→Output Line #3
Input Line #2→No Line
Input Line #3→Output Line #1
Input Line #4→Output Line #2

At the next second scheduling cycle, as shown in FIGS. 19(a)–19(f), the operations (STEP0~STEP5) exemplified in FIG. 18 are similarly executed. The priority pointer indicates 2, and therefore, in the second scheduling, the retrieval is effected in sequence such as the priority patterns 2, 3, 4, 1.

Supposing that the request information is the same as that of the first time, the results of the scheduling are as follows:

Input Line #1→Output Line #3
Input Line #2→Output Line #2
Input Line #3→Output Line #4
Input Line #4→No Line FIG. 21 is a diagram showing a structure of principle (an operational principle (4)) according to a twenty fifth aspect of the present invention. FIGS. 22 and 23 show examples of the scheduling process based on the operational principle (4).

Herein, the priorities of the priority patterns are allocated in such a way as to give the priorities of selecting from a plurality of input lines receiving the requests.

That is, the request information management unit manages per output line the forwarding request given from each input route with respect to the output line, wherein the existence or non-existence of the forwarding request is represented by "0" or "1".

The priority pattern PP2 represents a priority when determining which input line the forwarding right for the output line is given to, and has priorities different between the output lines. The priority pointer (Ppri) indicates which pattern among the N-pieces of priority patterns the retrieval begins from, and all the patterns are retrieved in sequence from the pattern indicated by the priority pointer.

The scheduling processing unit confirms whether or not each output line has the forwarding request from the input line indicated by the priority pattern, and, if there is the request and the input line thereof is not used by other output line, a scheduling result SR4 is given with that line serving as a forwarding line.

In this case, the priority pattern (1st) implies that the forwarding right is given in a case where the output line #1 receives the forwarding request from the input line #1, the output line #2 receives the forwarding request from the input line #4, the output line #3 receives the forwarding request from the input line #3, and the output line #4 receives the forwarding request from the input line #2.

Fundamentally, the way of allocating the priorities is completely different between the input lines and between the output lines, and therefore, though the scheduling results remain the same as those based on the operational principle (3), the scheduling procedure differs.

To start with, the first scheduling process will be exemplified with reference to a flowchart in FIG. 22.

(a) STEP0

It is presumed that the output line #1 has the forwarding request from the input line #2, the output line #2 has the request from the input lines #2, #3, #4, the output line #3 has the request from the input lines #1, #4, and the output line #4 has the request from the input line #3.

Then, it is also assumed that the priority pointer (Ppri) be set such as an initial value=1.

(b) STEP1

The scheduling processing unit confirms per output line whether or not the request is given from the input line indicated by the priority pattern 1st. In this example, the output line #2 receives the request from the input line (#4) indicated by the priority pattern 1st, and the forwarding right to the output line #2 is given to the input line #4.

(c) STEP2

The scheduling processing unit confirms per output line whether or not the request is given from the input line indicated by the priority pattern 2nd. In this example, the output lines #1, #2 receive the requests from the input lines (#3, #4) indicated by the priority pattern 2nd, and the input line #3 is given the forwarding right to the output line #1, and the input line #4 is given the forwarding right to the output line #2.

(d) STEP3

The scheduling processing unit confirms per output line whether or not the request is given from the input line indicated by the priority pattern 3rd. In this example, the output line #4 receives the request from the input line (#3) indicated by the priority pattern 3rd, however, the input line #3 requesting to the output line #4 is already ensured by the output line #1 and is not therefore given the forwarding right.

(e) STEP4

The scheduling processing unit confirms per output line whether or not the request comes to the input line indicated by the priority pattern 4th. In this example, even when making the confirmations as to all the output lines, there is no request from the input line shown by the priority pattern 4th.

(f) STEP5

Just when finishing the N-processes of scheduling, the priority pointer is updated.

Namely, Ppri=2.

The following results are obtained by the scheduling process described above.

Input Line #1→Output Line #3
Input Line #2→No Line
Input Line #3→Output Line #1
Input Line #4→Output Line #2

At the next second scheduling cycle, as shown in FIGS. 23(a)–23(f), the operations (STEP0~STEP5) exemplified in FIG. 22 are similarly executed. The priority pointer indicates 2, and therefore, in the second scheduling, the retrieval is effected in sequence such as the priority patterns 2, 3, 4, 1.

Supposing that the request information is the same as that of the first time, the results of the scheduling are as follows:

Input Line #1→Output Line #3
Input Line #2→Output Line #2
Input Line #3→Output Line #4
Input Line #4→No Line Note that the priority pointer (Ppri) is updated at every scheduling cycle, and the priority is changed per scheduling cycle, and the selection priorities are equally allocated to the respective lines.

Next, a contrivance for actualizing the creation of the priority patterns according to a twenty sixth aspect of the present invention, will be explained.

For example, permutation priorities created by shifting a permutation pattern (1, 2, 3, 4 . . . ) as shown in FIG. 24(1), are so given as to be different between the respective lines, and equally allocated to the respective lines.

When emphasizing upon the input lines #0 and #1, however, three input lines #0 among four lines have higher priorities to be selected (a mark ○ indicates a higher priority in FIG. 24).

For avoiding this, the permutation pattern is expressed in the binary notation, wherein values obtained by inverting MSB and LSB thereof as shown in FIG. 24(2) serve as a priority pattern as shown in FIG. 24 (3).

In the case of this LSB/MSB inverted pattern, the priorities are equally given as viewed from between whichever lines, and more equal scheduling can be attained by providing a random characteristic (the line #1 has two higher priorities, and the line #2 also has two higher priorities).

In the discussion made so far, LSB/MSB inverted random pattern is used. However, a simple permutation pattern may also be used, and a pattern having a variety of priorities may also be set.

Next, a contrivance for extending the scheduling control system according to the first through eleventh aspects of the present invention, will be described.

FIG. 25 shows an example of extension to 4×4 switches by use of 2×2 scheduling processing units A~D. The scheduling processing unit A performs the scheduling relative to outputs #1, #2 of the input lines #1, #2, the scheduling processing unit B implements the scheduling relative to outputs #3, #4 of the input lines #1, #2, the scheduling processing unit C performs the scheduling relative to outputs #1, #2 of the input lines #3, #4, and the scheduling processing unit D executes the scheduling relative to outputs #3, #4 of the input lines #3, #4. Then, eventually a final forwarding line is determined from forwarding candidate line obtained by the respective scheduling processing units.

An example of specific operation is shown in FIG. 26.

○ Forwarding Request

It is assumed that the input line #1 has the forwarding request for the output lines #1, #3, the input line #2 has the forwarding request for the output line #2, the input line #3 has the forwarding request for the output line #3, and the input line #4 has the forwarding request for the output line #3.

Input Line #1→Output Lines #1, #3
Input Line #2→Output Line #2
Input Line #3→Output Line #3
Input Line #4→Output Line. #3

○ Selection of Tentative Candidate Line in Each Scheduling Processing Unit

Each scheduling processing unit selects a forwarding candidate line within the scheduling processing unit itself.

By the same contrivance based on the operational principles (3) and (4), the scheduling processing unit A gives the input line #1 a tentative forwarding right with respect to the output line #1, and gives the input line #2 the tentative forwarding right with respect to the output line #2. The scheduling processing unit B gives the input line #1 the tentative forwarding right with respect to the output line #3. The scheduling processing unit D gives the input line #3 the tentative forwarding right with respect to the output line #3 (the input line #3 as a higher priority than that of the input line #4 in the scheduling processing unit D).

The followings are the tentative forwarding candidate lines in the respective scheduling processing units.

The scheduling Processing Unit A:
Input Line #1→
Output line #1
Input Line #2→
Output line #2
The scheduling Processing Unit B:
Input Line #1→
Output line #3
The scheduling Processing Unit C:
Nothing is Done Because of No Forwarding Request
The scheduling Processing Unit D:
Input Line #3→
Output line #3

○ Scheduling Result

Final scheduling result may be determined by the whole priorities.

FIG. 27 shows an example of final scheduling arrangement.

The input lines #1 and #3 mutually have the tentative forwarding right for the output line #3. However, the input line #1 has a third priority, while the input line #3 has a first priority, and therefore the input line #3 eventually obtains the forwarding right.

The following results are obtained by the scheduling described above.

Input Line #1→Output Line #1
Input Line #2→Output Line #2
Input Line #3→Output Line #3
Input Line #4→No Line Next, a contrivance for creating the priority patterns in an extended configuration according to a twenty seventh aspect of the present invention.

A priority synchronous pattern creation in the case of an extension to 8×8 scheduling processing units by use of 4×4 scheduling processing units, will be shown by way of one example. A basic concept is the LSB/MSB inverted random pattern as in the case of FIGS. 25–27. In this case, however, the basis is the 4×4 scheduling processing units, and hence, as shown in FIG. 28(1), only low-order 2 bits are inverted.

Then, a random pattern created by the inversion is shifted, thus creating a pattern shown in FIG. 28(2). It can be understood that this pattern is, as viewed in four groups A~D (corresponding to the above-described scheduling processing units A~D), an equal pattern within each group and also appears equal when viewed in the whole 8×8 configuration.

Further, in the operational principles (3) and (4) described above, the start number of the priority pattern is updated at every scheduling cycle. In the extended configuration, however, as shown in FIG. 29, it is feasible to actualize the equal allocation by rotating the priority pattern through between the respective groups at every scheduling cycle.

According to the first through ninth aspects of the present invention, the scheduling starts from the line indicated by the inter-highway pointer, and the scheduling process in each line involves selecting the line unused by other line. Hence, it is possible to avoid a futile scheduling process and execute the scheduling at a high efficiency (with a less number of free lines).

Moreover, the input (or output) line from which to start the scheduling and the output (or input) line for starting the scheduling process within that input (or output) line, are changed at every scheduling cycle, and therefore the forwarding rights can be equally given to the respective lines. Furthermore, if the line indicated by the intra-highway pointer is already scheduled for other line, more equal scheduling can be attained by updating no intra-highway pointer.

Moreover, the scheduling process completes per line, and hence the pipeline processing can be attained by providing a plurality of scheduling processing units (in which the processing speed does not depend upon the number-of-lines N).

Further, according to a tenth aspect of the present invention, the pipeline is configured giving a time difference in the scheduling process with respect to one single line, whereby the number of scheduling processes may be 2 at the maximum which is enough within one packet, and the scheduling can be attained without any application of a high-speed device. Further, with the intra- and inter-highway pointers being provided per pipeline processing, the intra- and inter-highway pointers round equally in one single pipeline sequence, thereby attaining the equal scheduling.

Further, according to tenth to fourteenth aspects of the present invention, a load observation is conducted at a fixed cycle, and this load is reflected in the scheduling at the next cycle. This makes it possible to perform the scheduling corresponding to the load, and to attain the equal and efficient scheduling in an unequal load.

According to an eleventh aspect of the present invention, the maximum number of forwarding packets at a next cycle is restricted to the number of arrived packets at a previous cycle by use of the number of arrived packets within the fixed cycle. With this restriction, a small number of packets can be forward via the lines with a less load, and a large number of packets can be forwarded via the lines with a high load.

According to twelfth and thirteenth aspects of the present invention, a rate of the top priority output lines at the next cycle is determined corresponding to the load by use of the number of arrived packets at the fixed cycle, whereby the packets corresponding to the number of arrived packets at the previous cycle can be forward with the top priority. Further, since the number of forwarding permission packets is not limited by the number of arrived packets, the packets over the number of packets arrived at the previous cycle can be forwarded, and the efficient scheduling can be attained.

According to a fourteenth aspect of the present invention, the scheduling can be performed corresponding to a more precise load not by clearing at every fixed cycle the data of the number of arrived packets which is obtained by the load observation, but by carrying over, to the next scheduling, the data of the number of packets left without forwarding the packets corresponding to the number of arrived packets within the fixed cycle.

According to a fifteenth aspect of the present invention, the rate of the output line at the next cycle is determined by use of a queue length per fixed cycle, and the scheduling corresponding to the load can be performed.

According to a sixteenth aspect of the present invention, blocks for executing the scheduling for the single input line are disposed in dispersion at input ports (input buffers) of the switch, whereby dispersive processing of the scheduling can be done.

At that time, a plurality of adjacent scheduling blocks are connected in ring, thus structuring one group. This group includes a selector for switching an external group and an internal ring, and, when a new group is added, the selector functions to switch over to the external group side. Further, a system structure is that a self-slot position on a timetable in the pipeline processing remains unchanged before and after the extension by delaying the data sent from the self-group in a delay block.

The blocks are thus extended in the lengthwise direction, whereby the extension can be effected online without re-configuring the connection link between the respective schedulers.

According to seventeenth to twenty first aspects of the present invention, the request for forwarding the arrived packets is managed per QoS class, and the scheduling is conducted in consideration of a QoS band and a QoS delay in the scheduler. Alternatively, the scheduler determines only the output line, and a band control unit on the input buffer side determines which QoS class the packet to be forwarded in the output line belongs to, considering a band characteristic and a delay characteristic as well. Another option is that delay control is executed on the scheduler side, and band control is implemented on the input buffer side, thereby making it possible to assure the delay and the band within the whole packet switch and one single line.

According to twenty second and twenty third aspects of the present invention, there are provided a representative counter per line and an LB counter for individual QoS. Only the line selected by the scheduler is used in the LB counter, and the representative counter counts per line an elapsed time since the line has been selected last time. Then, the elapsed times are counted up batchwise in control by the LB counter, whereby multi-line QoS control can be effected. In that case, if a cross-bar type in the prior art as shown in FIG. 4 is taken, there are needed I/Os between LSIs or packages, of which the number is four times the number of cell highways, and the number of I/Os becomes a bottleneck. On the other hand, in the case of a batcher sorter type (FIG. 5), there may suffice the I/Os of which the number is twice the number of cell highways. However, the configuration of each block is different, and a length of the I/O is also different. Hence, there arises a necessity for structuring plural types of LSIs or packages.

According to twenty fourth to twenty eighth aspects of the present invention, the priority patterns of the priorities different between the respective lines are provided, the forwarding lines are scheduled based on the priorities thereof. The scheduling processing unit selects the line unused by other line, and it is therefore feasible to avoid the futile scheduling process and perform the scheduling at a high efficiency (with a less number of free lines).

Further, because of having the priority patterns of the priorities being different between the respective lines and of the start pattern of the priority patterns being changed at every scheduling cycle, the forwarding rights of the lines can be determined with the uniformly equal priorities.

Moreover, the random pattern with inverted LSB/MSB of the permutation is applied to the priority pattern, thereby making uniform the priorities between the individual lines and giving the more equal priorities.

According to a twenty ninth aspect of the present invention, an N-input/N-output sorter network is configured on the whole by connecting $(2N/m-1) \times N/m$ pieces of unit sorters, and hence the large-scale sorter can be constructed of one type of unit sorters by connecting LSIs or packages. Therefore, the number of I/Os of each unit sorter may be twice the number of cell highways. Further, lines of the respective unit sorters can be unified excluding those disposed at both ends, and delay adjustment circuits involving a line length delay can be therefore reduced.

FIG. 30 is a diagram showing a principle according to the twenty ninth aspect of the present invention. Referring to FIG. 30, the cells inputted from m-lines of input lines per chip or package, are sorted out in a descent or ascent sequence based on output line information imparted to cell header fields, and N/m-pieces of unit sorters capable of outputting to the m-lines of output lines are arranged and connected to the input buffers on the N-route. Furthermore, m-lines of highways of the unit sorter concerned are divided into 2 and, as shown in FIG. 30, connected to the unit sorters at the next stage. In that case, excluding a dummy unit sorter for adjusting a line length delay, this stage has the unit sorters of which the number is less by one than at the first stage. Thus, the first and second stages are combined n groups or sorters are connected into one group, and N/I thereby configuring the N-input/N-output sorter network on the whole.

FIG. 31 is a diagram showing a principle according to a thirtieth aspect of the present invention. Herein, when the unit sorters are connected in matrix at multi-stages in X- and Y-directions, outputs of the respective unit sorters are inputted to the unit sorters positioned at the next stage in (+)X an (-)Y directions of the unit sorter.

Then, when extending the sorter group, the outputs of the respective unit sorters are inputted to the next-stage unit sorters positioned in the (+) X-direction of the unit sorter concerned.

Namely, this implies that the cells inputted from m-lines of input lines per chip or package are sorted out in the descent or ascent sequence on the basis of the output line information imparted to the header fields of the cells, and N/m pieces of the unit sorters capable of outputting to the m-lines of output lines are arranged and connected to the input buffers on the N-route. The m-lines of highways of the unit sorters are divided into 2, whereby the half of the highways are allocated for the operation, while the remaining half of the highways are allocated for the extension, and those highways are connected as shown in FIG. 31.

In the case of a conventional batcher sorter type and the configuration according to the twenty ninth aspect of the invention, when continuing to extend the switch scale, it is required that the paths be re-configured. On this point, according to the thirtieth aspect of the present invention, the paths before the extension are not required to be changed on the occasion of extending the switch scale, and an excellent extending characteristic can be exhibited.

Moreover, the cross-bar type (FIG. 4) involves the use of $N/m \times N/m$ pieces of unit sorters. By contrast, according to the thirtieth aspect of the invention, the system can be constructed with $N/m \times (N/m+1)/2$ pieces of unit sorters, and the number of unit sorters can be reduced by a quantity of $N/m \times (N/m-1)/2$.

FIG. 32 is a diagram showing a principle according to a thirty first aspect of the present invention. After the output line numbers of the valid cells transferred via the respective input lines have been determined by the scheduling described above, the output line numbers for idle cells are allocated to the respective input lines with the output line numbers undetermined in sequence from a lower numbers excluding the valid cell established output line numbers, and transferred to the sorter network together with the valid cells to which the output line numbers have previously been allocated.

FIG. 33 is a diagram showing a principle according to a thirty second aspect of the present invention. The priorities are allocated beforehand to all the input and output lines so that the priority for the same input line or the same output line are different, and, based on those priorities, the scheduling for determining the output line numbers for the respective input lines is sequentially carried out. In this scheduling process, when scheduling for a priority 1 defined as the top priority, the input line with the data existing in the queue is established as a readout line for the valid cell. The input line with no data existing in the queue is also, however, established as a tentatively established line for the idle cell.

Next, when scheduling for a priority 2, when the data exists in the queue corresponding to the priority 2 and when the same input or output line has already been established for the valid cell, the valid cell with the priority 2 is not established. If the same input or output line is established for the idle cell, however, the valid cell with the priority 2 is established.

In that case, if the idle cell is tentatively established with respect to the priority 2 and the priority 2 of the same input or output line, the tentative establishment is ruled out.

Thereafter, if neither the valid cell nor the idle cell is established for the same input or output line with respect to what no data exists in the queue corresponding to the priority 2, it is assumed that the priority concerned be tentatively established.

The same processes are executed for all the priorities, and what has finally been established for the valid cell or what has tentatively been established for the idle cell, is to be finally established.

Thus, according to the thirty first and thirty second aspects of the present invention, the output line numbers of the cells inputted to the sorter network all take different values without being overlapped, and therefore the sorter unit may simply sort out, and there is eliminated a necessity for adding a Banyan network as illustrated in FIG. 6.

According to the thirty second aspect of the present invention, though the control become somewhat complicated, the output line numbers for the valid cells and for the idle cells can be simultaneously allocated, thereby speeding up the processing.

FIGS. 34 and 35 are diagrams showing a principle according to a thirty third aspect of the present invention. When necessary for phase synchronization at a cell level as in the case of an extension of the switch and an initial state of the system, the scheduler forwards sequentially to the respective input buffers such a synchronization cell pattern as to increment the output route number and the sequence number.

On this occasion, the cell sequence numbers from the input lines adjacent to each other are made coincident, and the output route numbers are shifted one by one. Thus, for the input cell, a phase difference $\Delta SN - \Delta T$ (where $\Delta SN$ is given by subtracting a sequence number of the cell arrived via an input line #K+1 from the sequence number of the cell arrived via an input line #K, and $\Delta T$ is given by subtracting the arrival time of the cell via the input line #K+1 from an arrival time of the cell via the input line #K) between the cells for synchronization on the same output route wich are arrived via the input liens adjacent to each other, is calculated in the unit switch at each lattice point. Then, the input buffer corresponding to the input line #K+1 is notified of the observed phase difference. In the input buffer #K+1, a cell insertion timing is shifted based on the received phase difference, thereby synchronizing the cells arrived via the input line #K and the input line #K+1.

According to the thirty third aspect of the present invention, the phase can be synchronized between the packages, and hence a quantity of the phase adjusting buffers can be reduced. Further, coding of the output lines of the normal cells and coding of the output line numbers of the cells for synchronizing the phase, are the same, and the normal cell processing can be used in common with respect to routing of the cells within the switch.

FIG. 36 is a diagram showing a principle according to a thirty fourth aspect of the present invention. When necessary for the phase synchronization at the cell level as in the case of the extension of the switch and the initial state of the system, the scheduler gives to the each input buffer an output route number (e.g., a maximum value of the output route number plus 1) unused in the normal cell, thereby giving an indication of being broadcast cell. Further, each scheduler gives a sequence number of the cell to be inputted, and the cells inserted at the same timing are forwarded while sequentially incrementing this sequence number by making it coincident in all the input lines. In the respective unit switch receiving the broadcast cells, the broadcast cells are transferred to all the output routes, and a difference $\Delta SN$ between the sequence numbers transferred via the input lines adjacent to each other is calculated. When $\Delta SN \neq 0$, as in the thirty third aspect of the present invention, the input buffer is notified of the phase difference $\Delta SN$, and the forwarding timing is shifted based on the received phase difference, thereby synchronizing the cells arrived.

Thus, according to the thirty fourth aspect of the present invention, the phases can be synchronized between the packages, and hence the quantity of the phase adjusting buffers can be decreased. As compared with the thirty third aspect of the invention, though needed for adding a function of transferring the broadcast cells to all the output routes, the broadcast cells always flow to the all the unit switches, whereby the sequence numbers can be compared at an arbitrary timing, and the phase adjusting process can be executed at a higher speed.

FIG. 37 is a diagram showing a principle according to a thirty fifth aspect of the present invention. The buffer for absorbing the phase difference is provided at each lattice point, and serves to absorb the phase difference at the cell level.

Thus, according to the thirty fifth aspect of the invention, the synchronization is not needed, so that the circuits for the synchronization can be reduced. It is also possible to decrease a time needed for the synchronizing process when starting up the system and an extension thereof. Note that the construction of providing the buffer at each lattice point is the same as that of the switch on the side of the cross-point buffer. On the input buffer side, however, since the band for transferring to each output line from each lattice point is ensured, only the buffer for absorbing the delay between the packages may suffice, with the result that an extremely small quantity of buffers may suffice.

BRIEF DESCRIPTION OF THE DRAWINGS

Other objects and advantages of the present invention will become apparent during the following discussion in conjunction with the accompanying drawings, in which:

FIG. 1 is a diagram showing a basic principle of the present invention;

FIG. 9 is a diagram showing an operational principle (1) of the present invention (First time);

FIG. 10 is a diagram showing an operational principle (1) of the present invention (Second time);

FIG. 12 is a diagram showing a basic principle (2) of the present invention;

FIG. 13 is a diagram showing an operational principle (2) of the present invention (First time);

FIG. 14 is a diagram showing the operational principle (2) of the present invention (Second time);

FIG. 18 is a diagram showing a processing example based on the operational principle (3) (First time);

FIG. 19 is a diagram showing a processing example based on the operational principle (3) (Second time);

FIG. 22 is a diagram showing a processing example based on the operational principle (4) (First time);

FIG. 23 is a diagram showing a processing example based on the operational principle (4) (Second time);

FIG. 26 is a diagram showing an example of selecting a candidate line and an example of an arrangement of a final forwarding line in the whole priorities;

FIG. 33 is a diagram showing an example of scheduling in an embodiment 17;

FIG. 35 is an explanatory diagram showing a process in the embodiment 18;

FIG. 50 is a processing flowchart in the embodiment 4;

FIG. 51 is an explanatory diagram showing a process in an embodiment 5;

FIG. 54 is a processing flowchart in the embodiment 6;

FIG. 55 is an explanatory diagram showing setting in the embodiment 6;

FIG. 58 is an explanatory diagram showing a method of extending schedulers in the embodiment 7;

FIG. 59 is a diagram showing a configuration of extending the schedulers in the embodiment 7;

FIG. 74 is an explanatory diagram showing cycle monitoring in the embodiment 13;

FIG. 77 is a chart showing priorities in a scheduling sequence in a pointer process;

FIG. 78 is a chart (1) showing selection priorities between respective lines in the embodiment 1;

FIG. 79 is a chart showing the priority pattern in the embodiment 1; and

FIG. 80 is a chart (2) showing the selection priorities between the respective lines in the embodiment 1.

DESCRIPTION OF THE PREFERRED EMBODIMENTS

Embodiment 1

Figure 2:
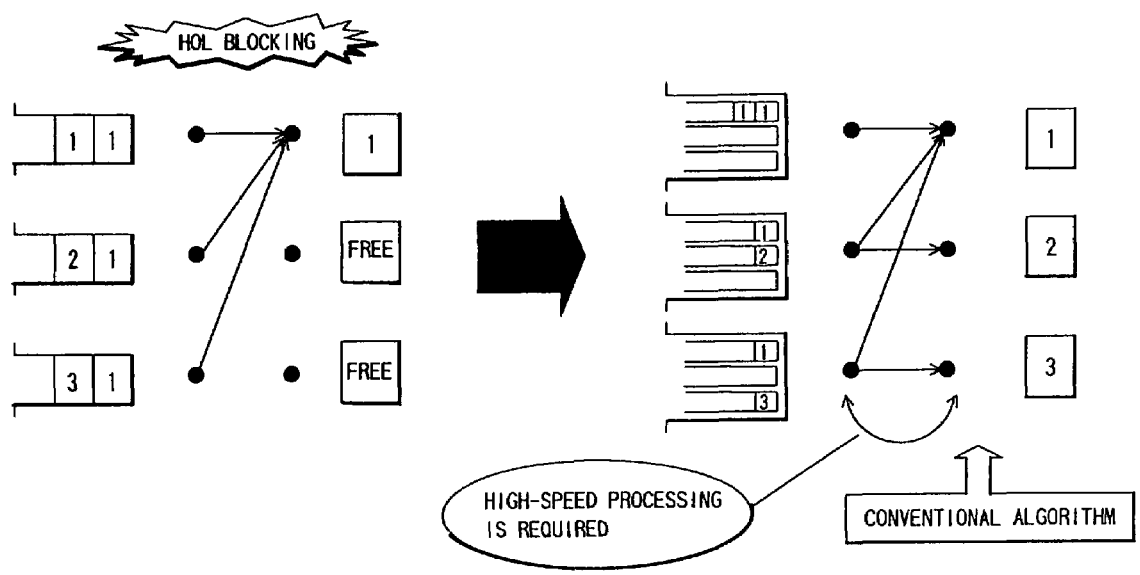
FIG. 2 is an explanatory diagram showing a problem inherent in a buffer type switch in the prior art.
Figure 3:
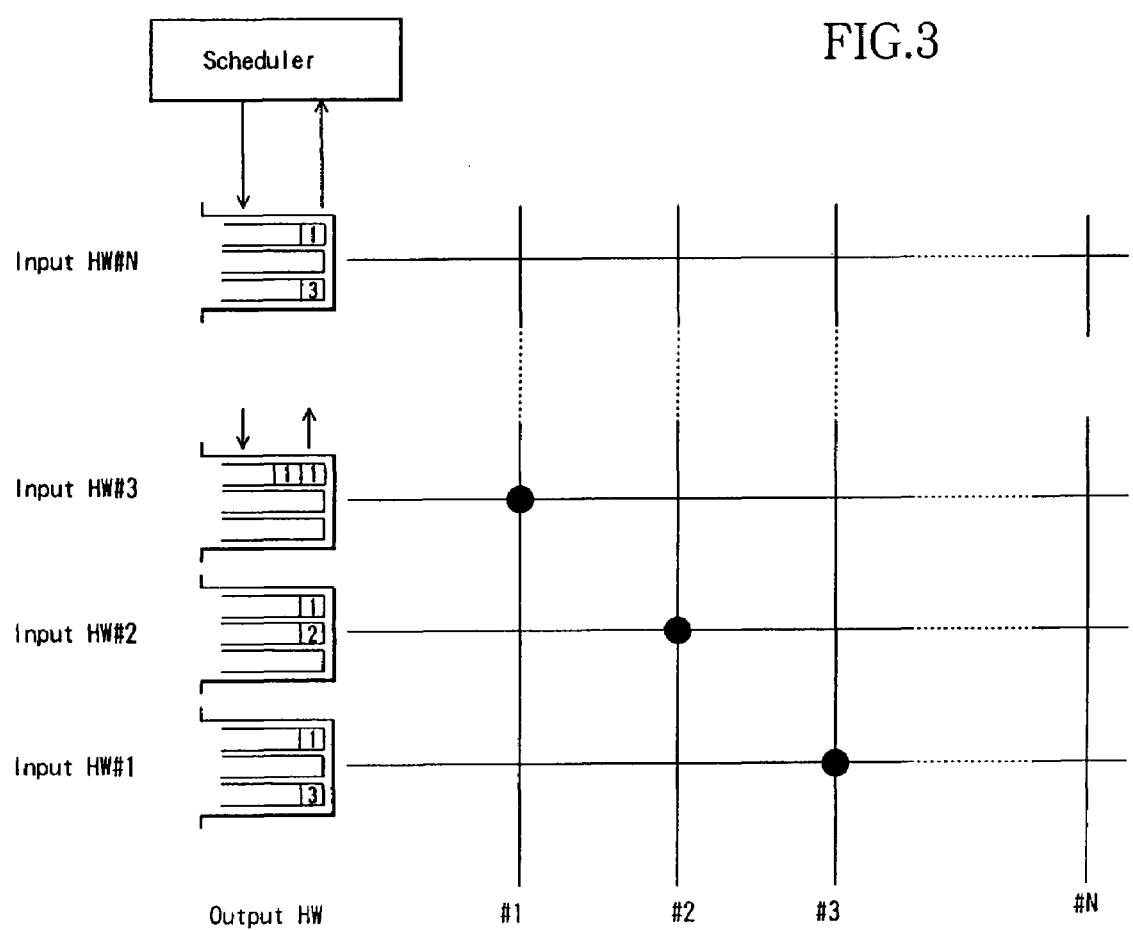
FIG. 3 is a diagram showing a construction of the buffer type switch in the prior art.
Figure 4:
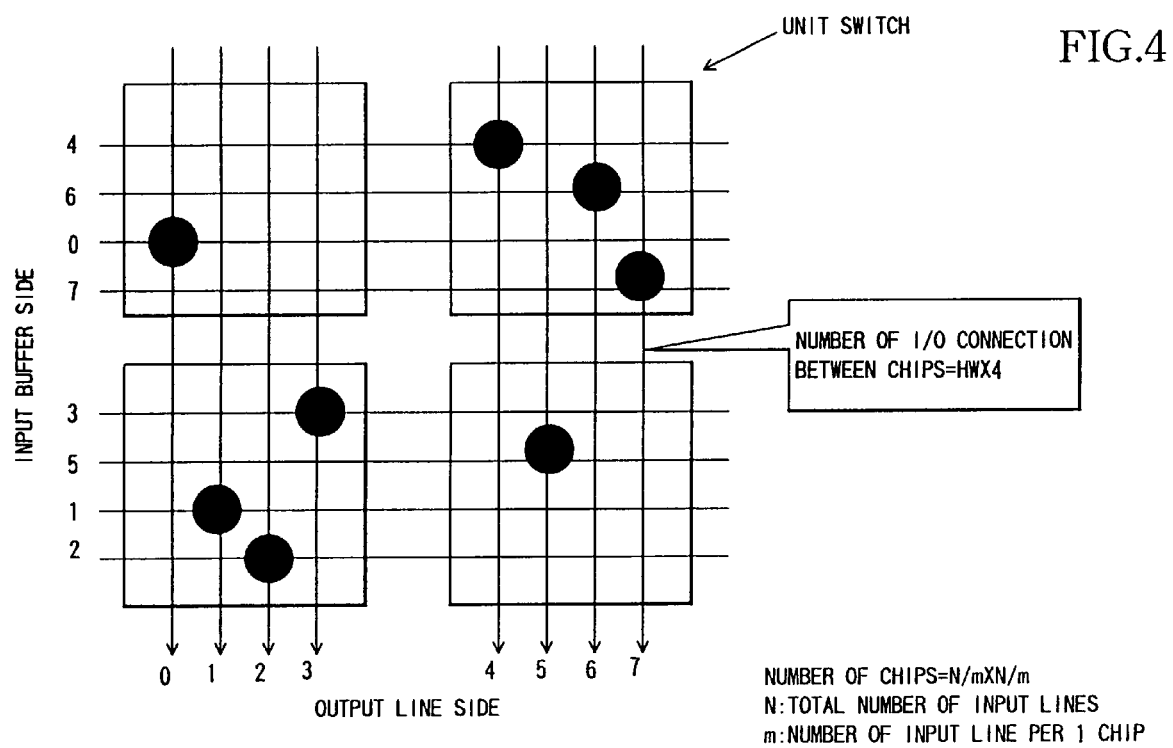
FIG. 4 is an explanatory diagram showing a cross-bar type in the prior art.
Figure 5:
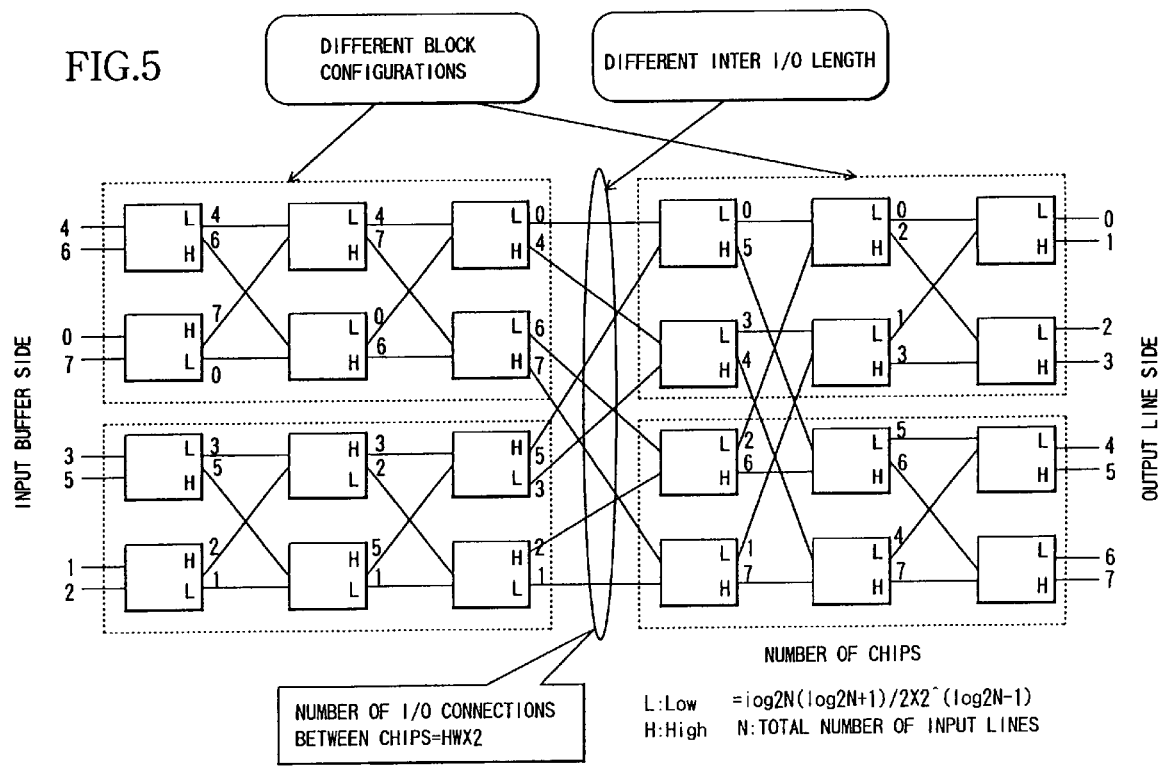
FIG. 5 is an explanatory diagram showing a buffer sorter type in the prior art.
Figure 6:
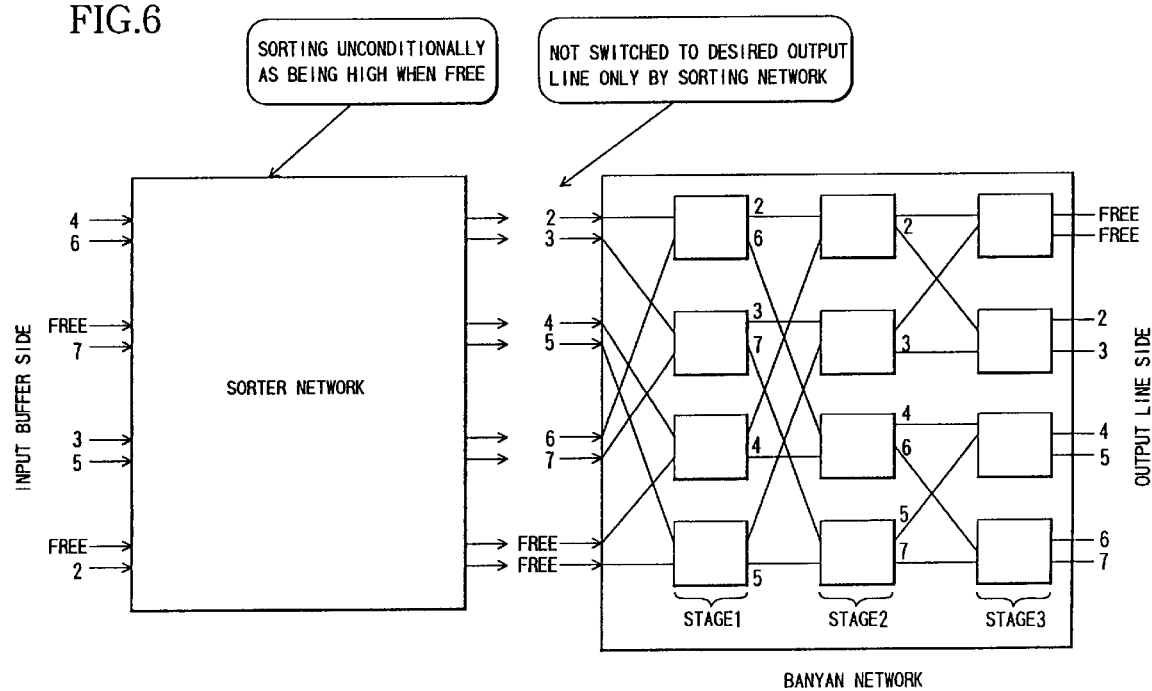
FIG. 6 is an explanatory diagram showing a Banyan network in the prior art.
Figure 7:
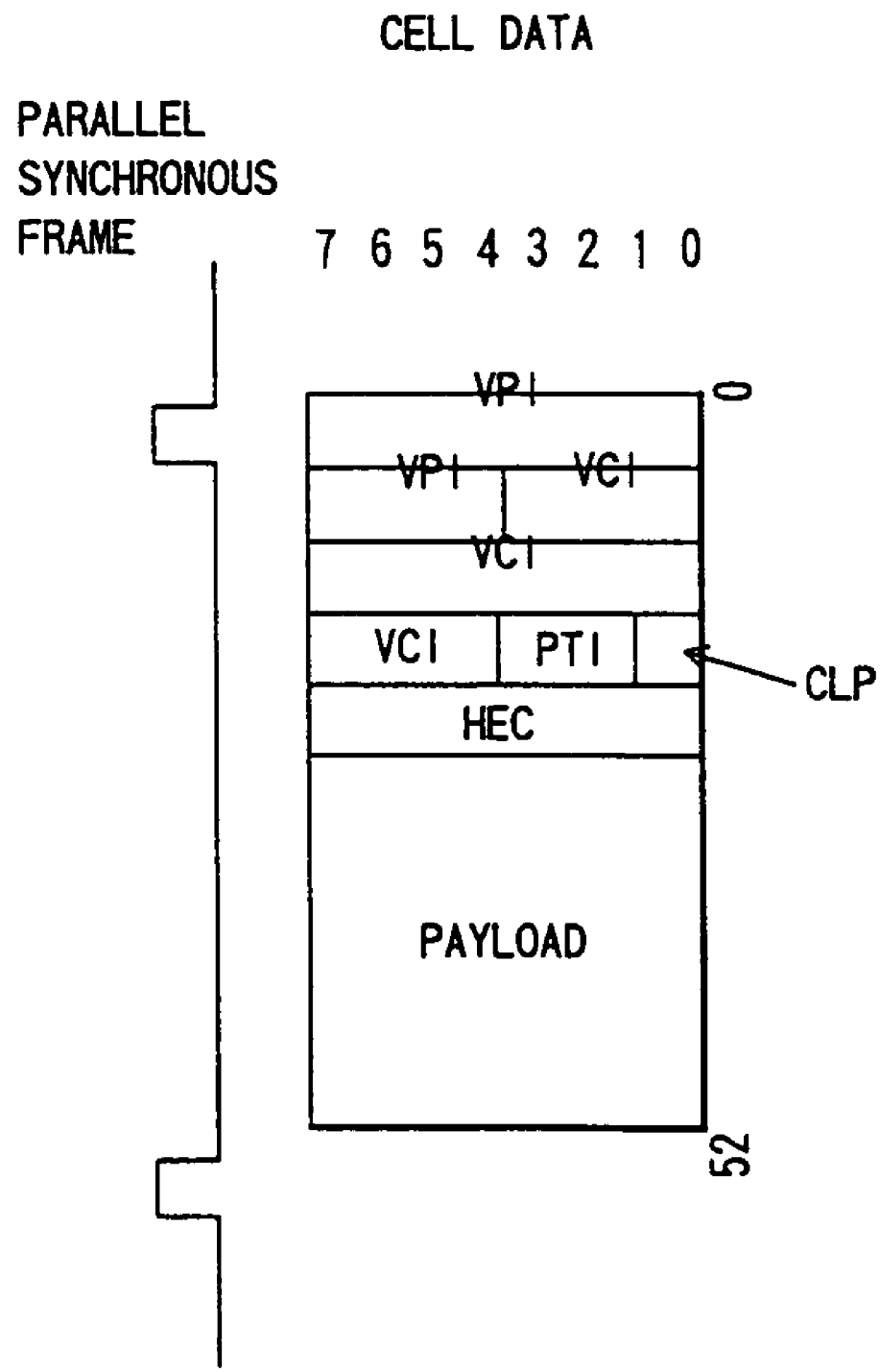
FIG. 7 is an explanatory diagram showing a technology for synchronizing a cell with a frame pulse in the prior art.
Figure 8:
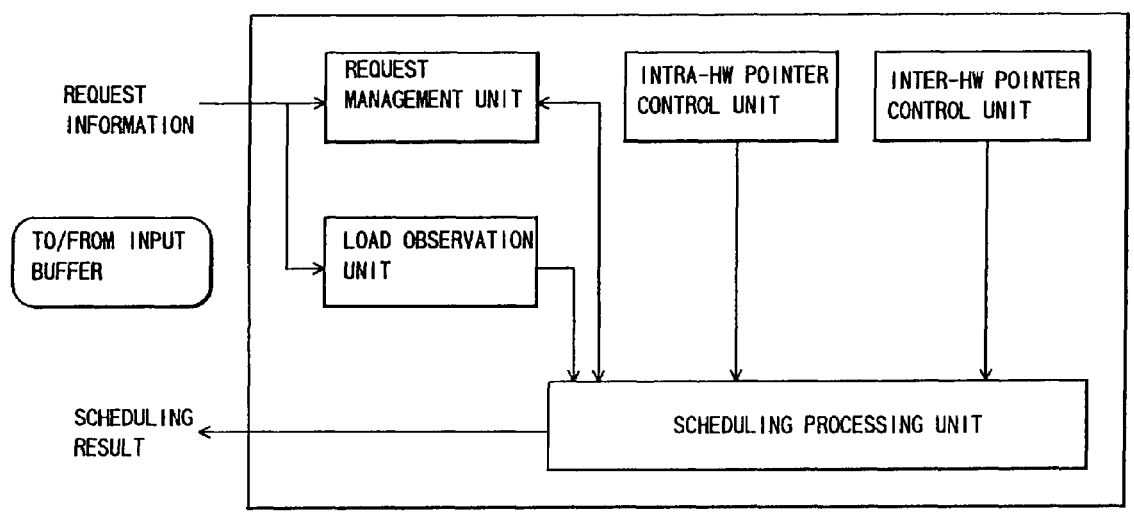
FIG. 8 is a diagram showing a configuration of a scheduler according to the present invention.
Figure 11:
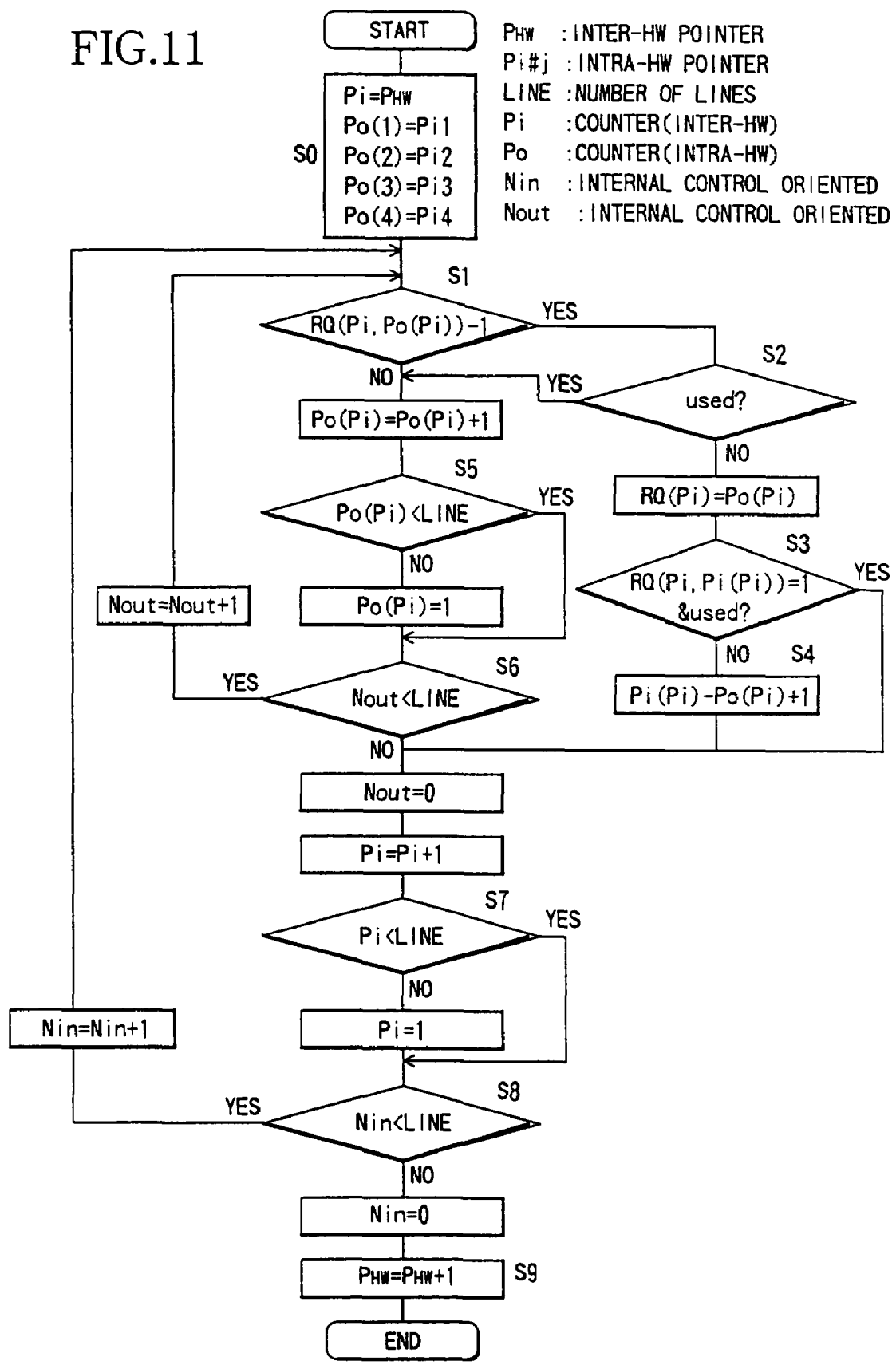
FIG. 11 is a processing flowchart showing the operational principle (1)
Figure 15:
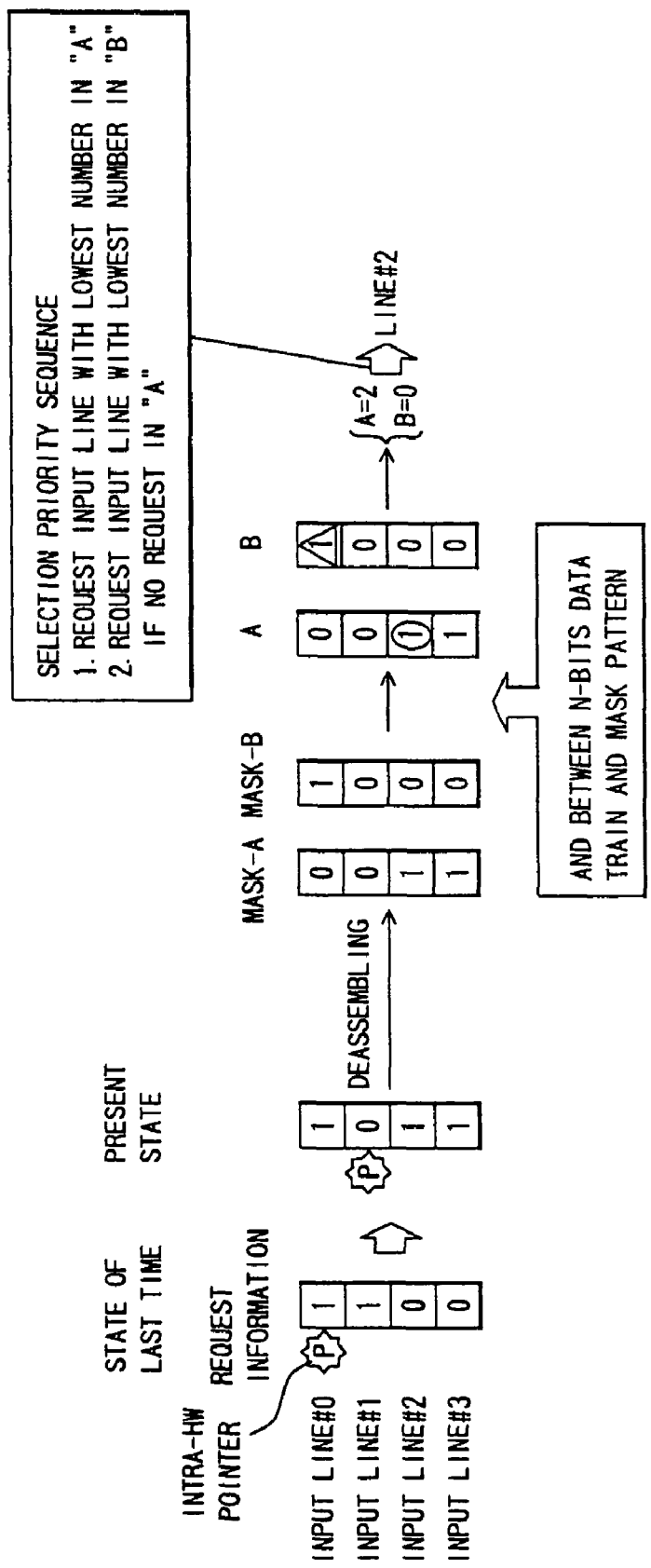
FIG. 15 is a diagram showing a principle for retrieving a line with a lowest number.
Figure 16:
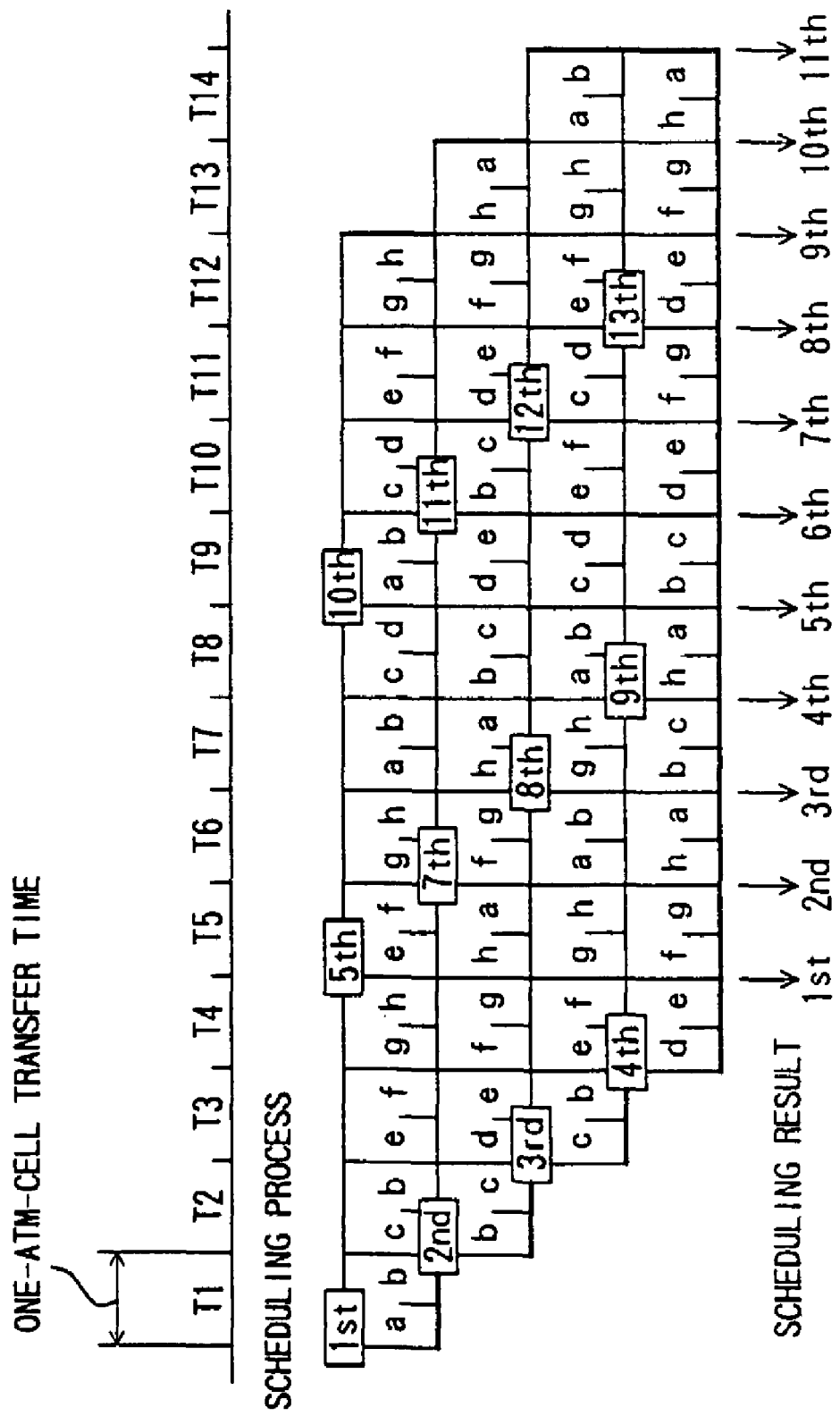
FIG. 16 is a diagram showing a principle of a pipeline scheduling process.
Figure 17:
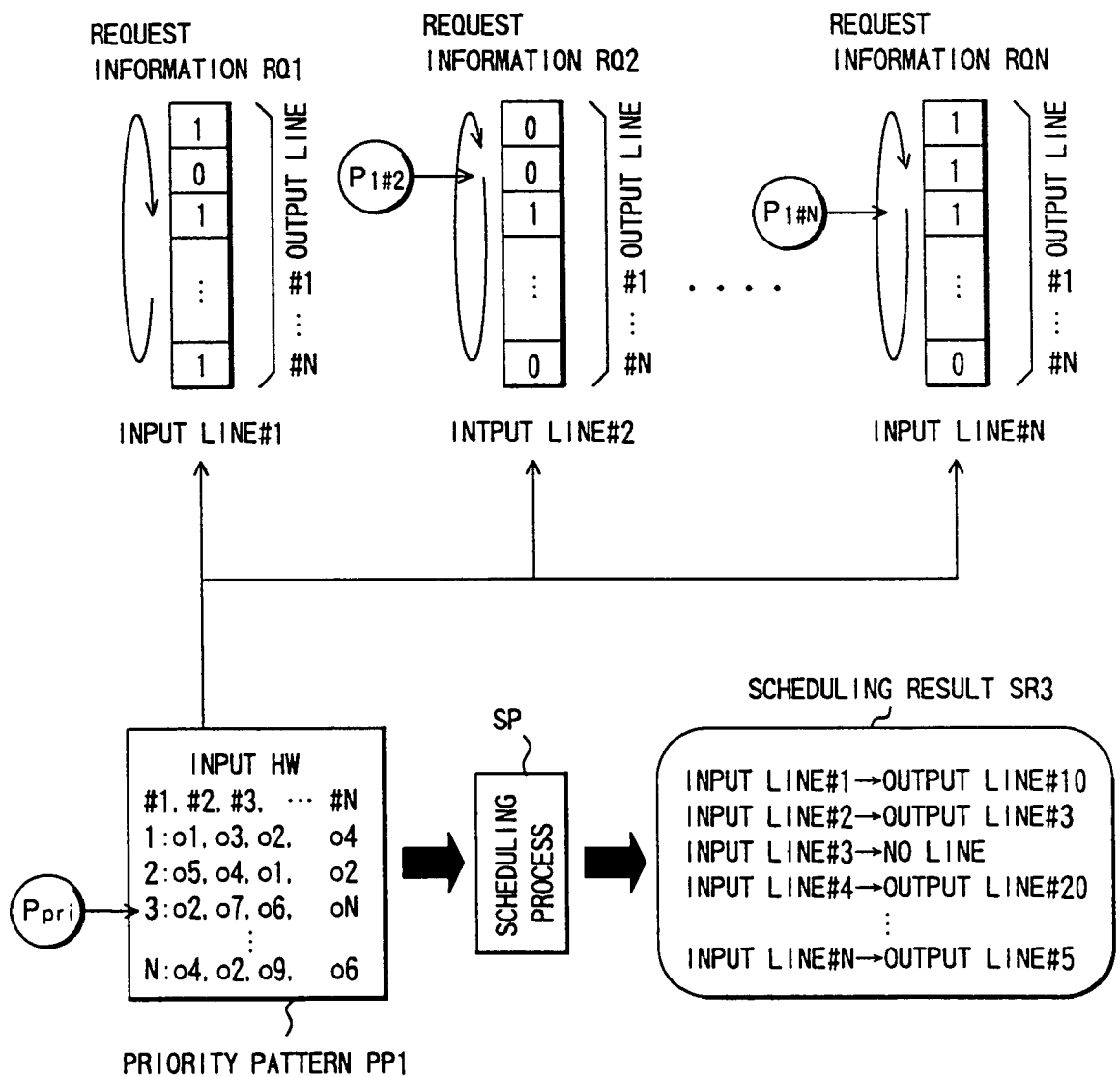
FIG. 17 is a diagram showing an operational principle (3) of the present invention.
Figure 20:
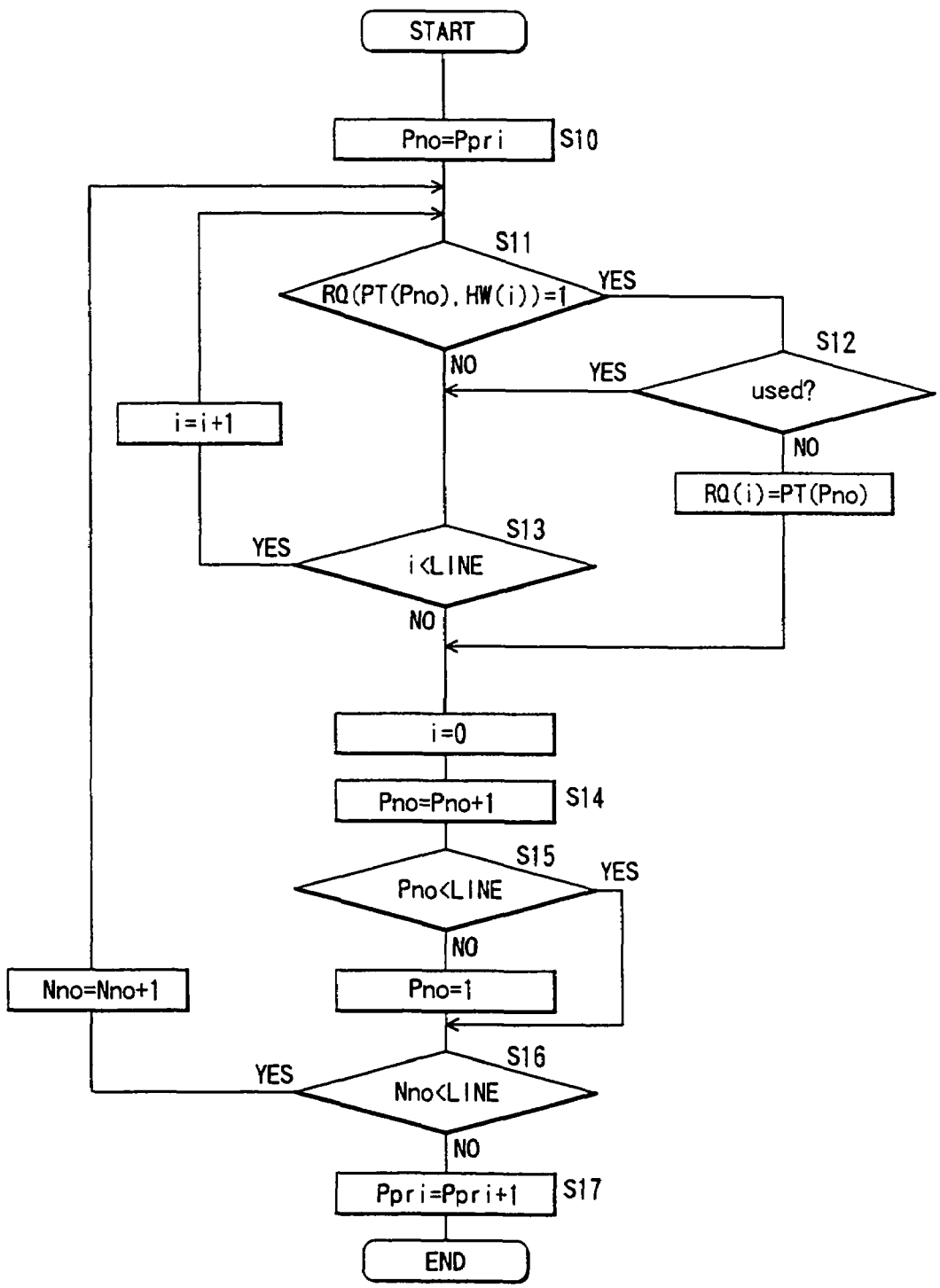
FIG. 20 is a flowchart showing the scheduling process using a priority pattern.
Figure 21:
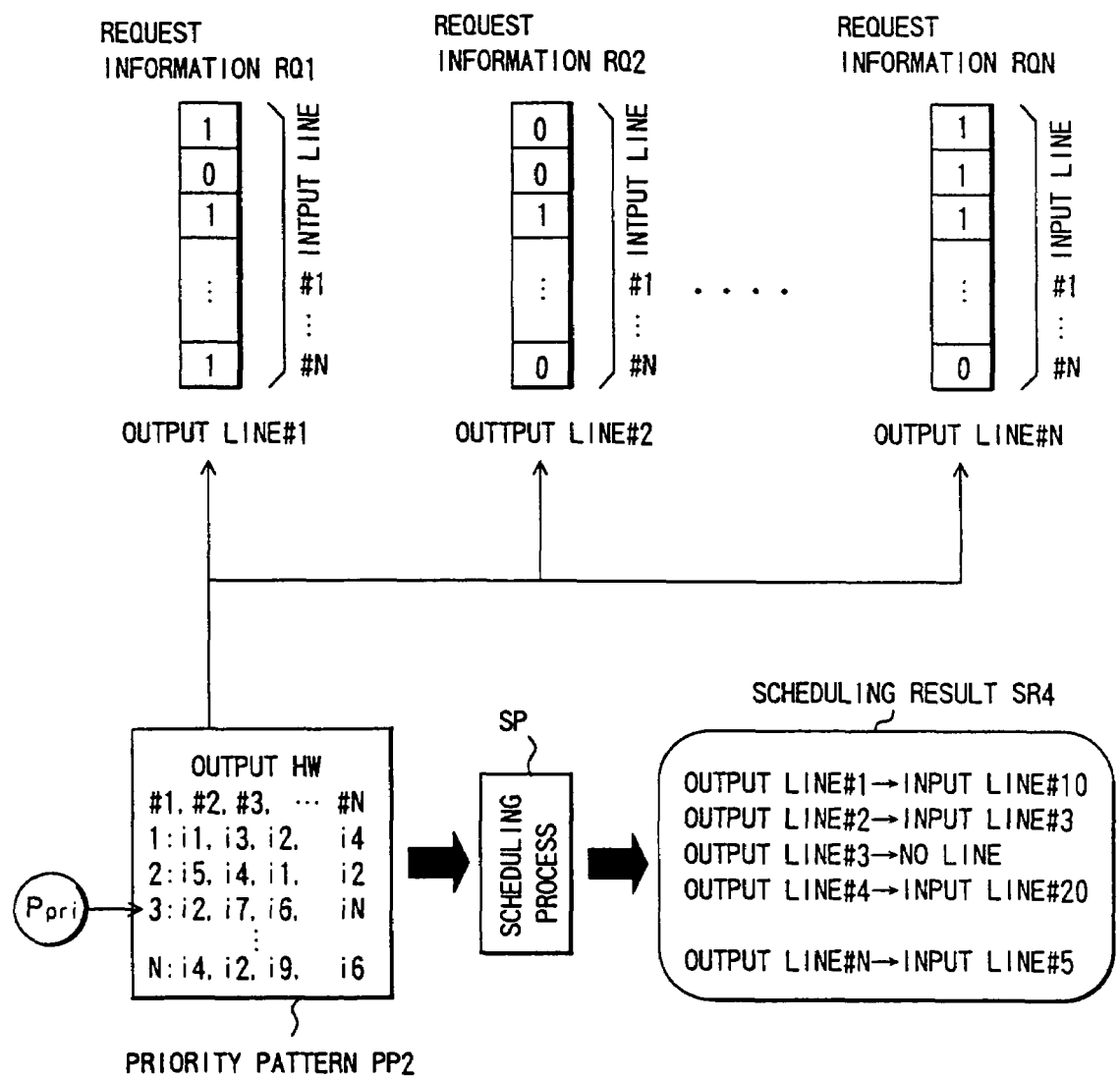
FIG. 21 is a diagram showing an operational principle (4) of the present invention.
Figure 38:
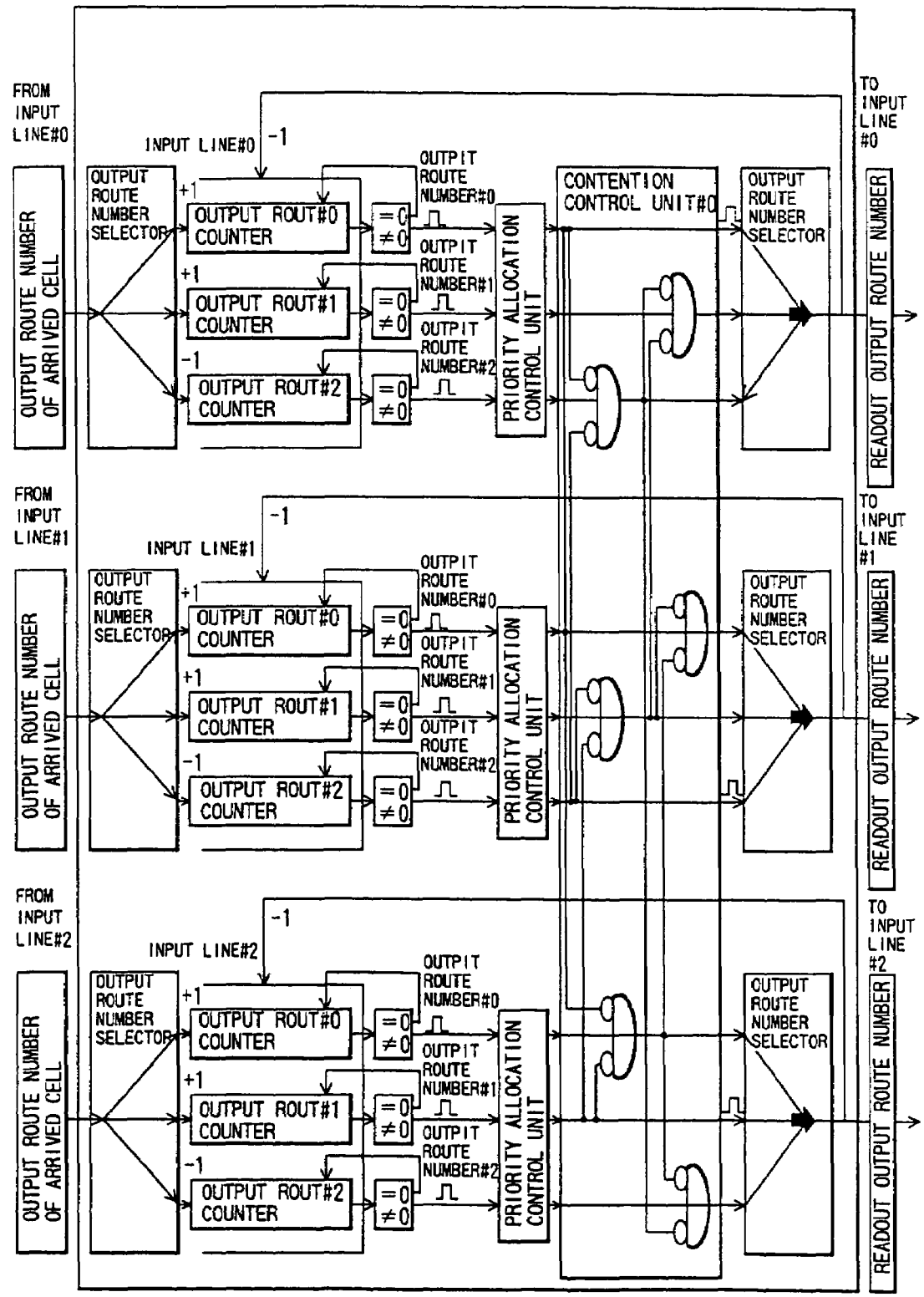
FIG. 38 is a diagram showing a construction of the scheduling processing unit in an embodiment 1.

FIG. 38 shows one embodiment of a lowest number selection circuit illustrated in FIG. 15, wherein a white block indicates a selector circuit, and a screened block is constructed of two pieces of logic circuits for giving the following outputs X, Y with respect to inputs A, B.

X=A or B

Y=(A xor B) and B

This implies that X takes a logical sum of the two inputs, and Y is a logic for selecting a lower-numbered input, having "1", of the two inputs. The following is one example of a table of truth value of the lower number selection logic.

| Input (A) | Input (B) | Output (Y) |
|---|---|---|
| 0 | 0 | 0 |
| 0 | 1 | 1 |
| 1 | 0 | 0 |
| 1 | 1 | 0 |

One example of an operation of the lower number selection logic will be explained with reference to the circuit in FIG. 38.

In this embodiment, the mask-A (after an inter-highway pointer) described above is obtained in an upper half in the Figure, while the mask-B (before an intra-highway pointer) is obtained in a lower half in the Figure.

In the mask-A, a line number is obtained in the form of "101". Similarly, in the mask-B, a result such as "001" is obtained. In this embodiment, "1" exists in A, and hence a selector disposed at the last stage selects the A-side. Finally, it is sought that a value such as "101"=5, i.e., the lowest number closest from the intra-highway pointer is an input line [#5].

This circuit does not involve the use of a clock synchronous device such as a flip-flop etc, and is therefore capable of obtaining the line with the lowest number at a high speed. Further, the bits after and before the intra-highway pointer are processed in parallel, and hence, supposing that the bits after the intra-highway pointer do not contain "1", there is not necessity for executing the reprocessing before the intra-highway pointer.

As a matter of course, other than the embodiment discussed above, there may be given an example of using a circuit for retrieving a location where "1" is outputted at first by use of a shift register that shifts N-bits bitmap information per clock.

Figure 24:
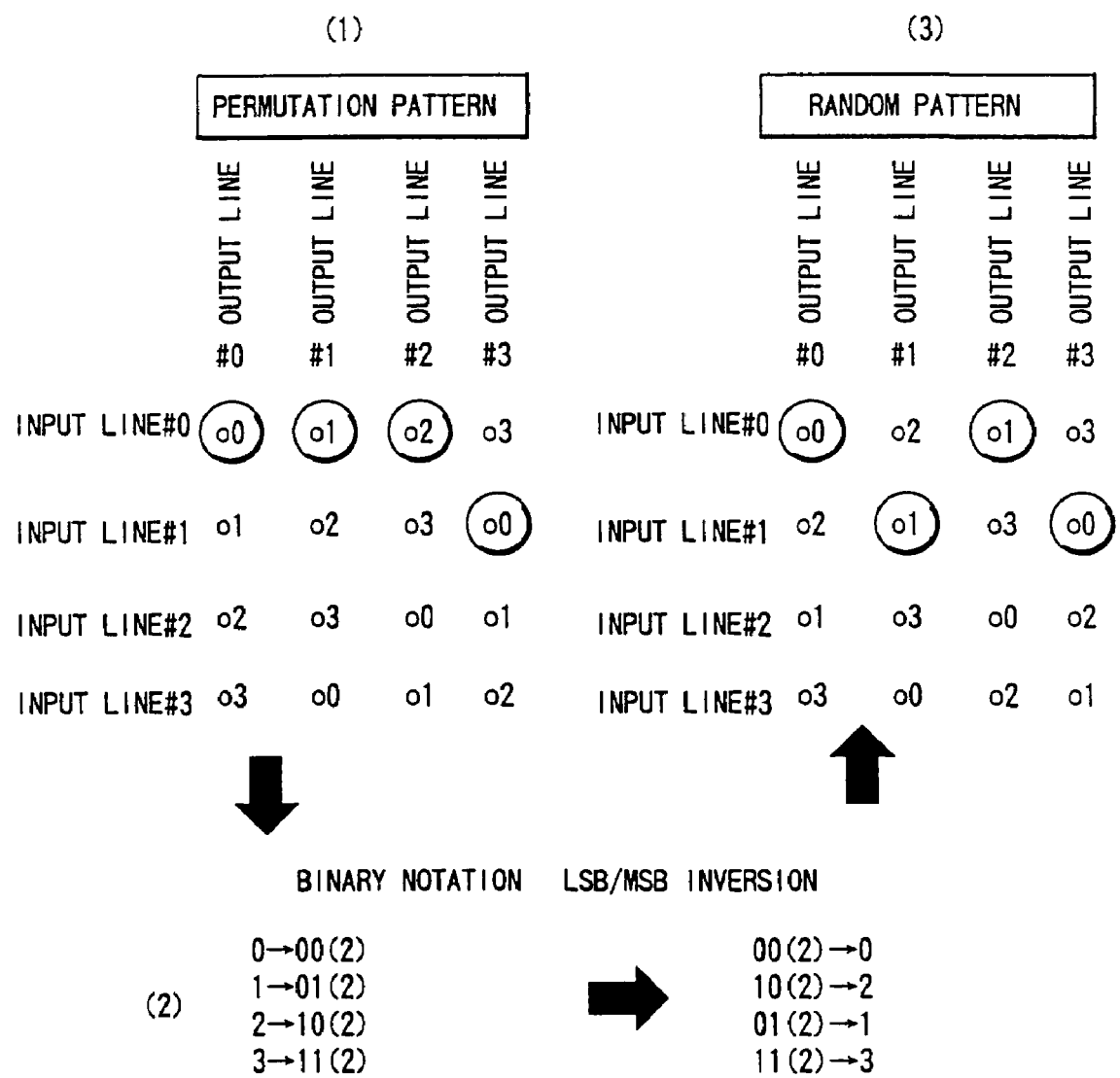
FIG. 24 is a diagram showing an example of creating a random pattern and an example of variations in degrees of priority.
Figure 25:
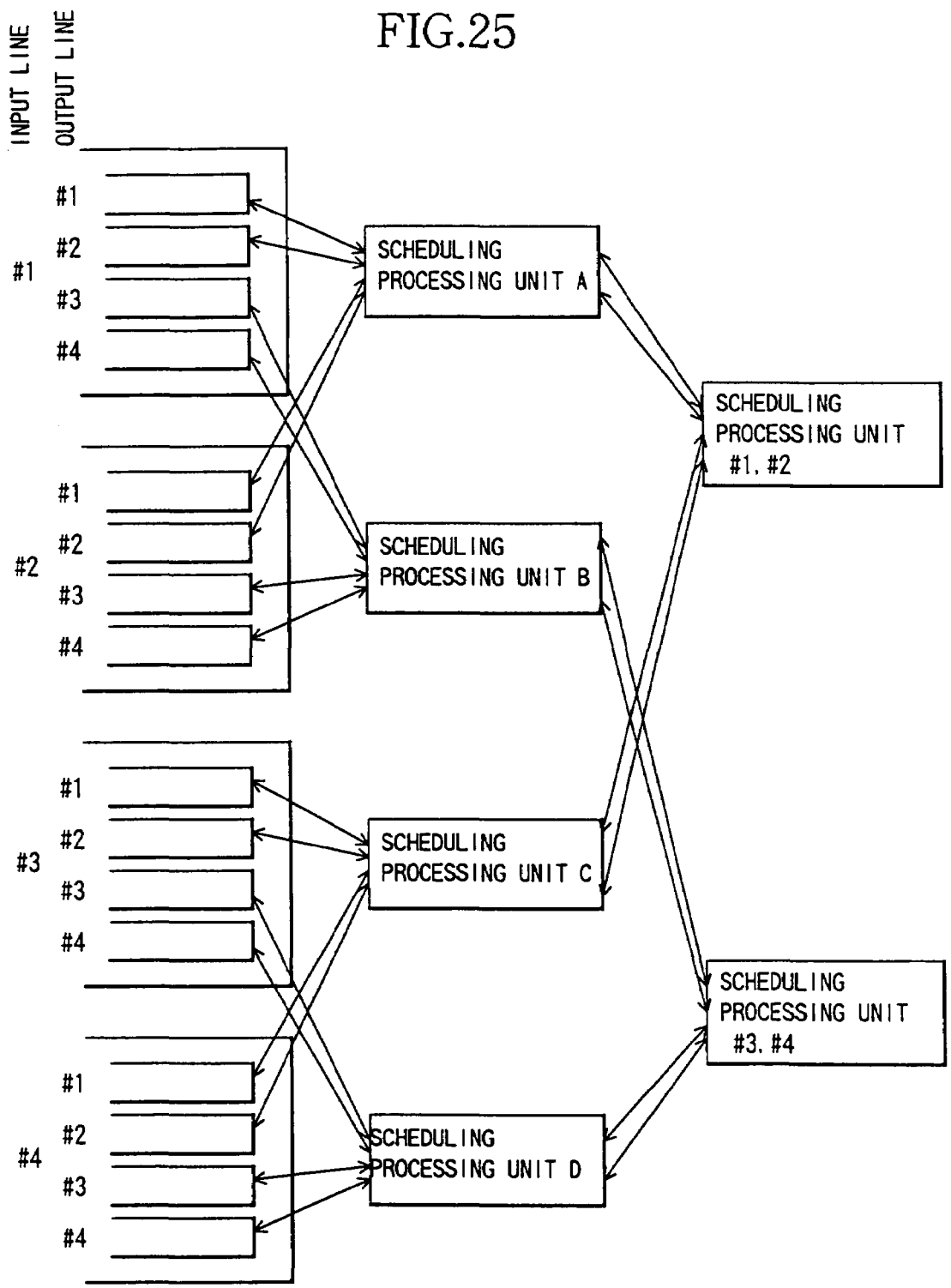
FIG. 25 is a diagram showing a structure of an extension principle of a scheduling processing unit.
Figure 27:
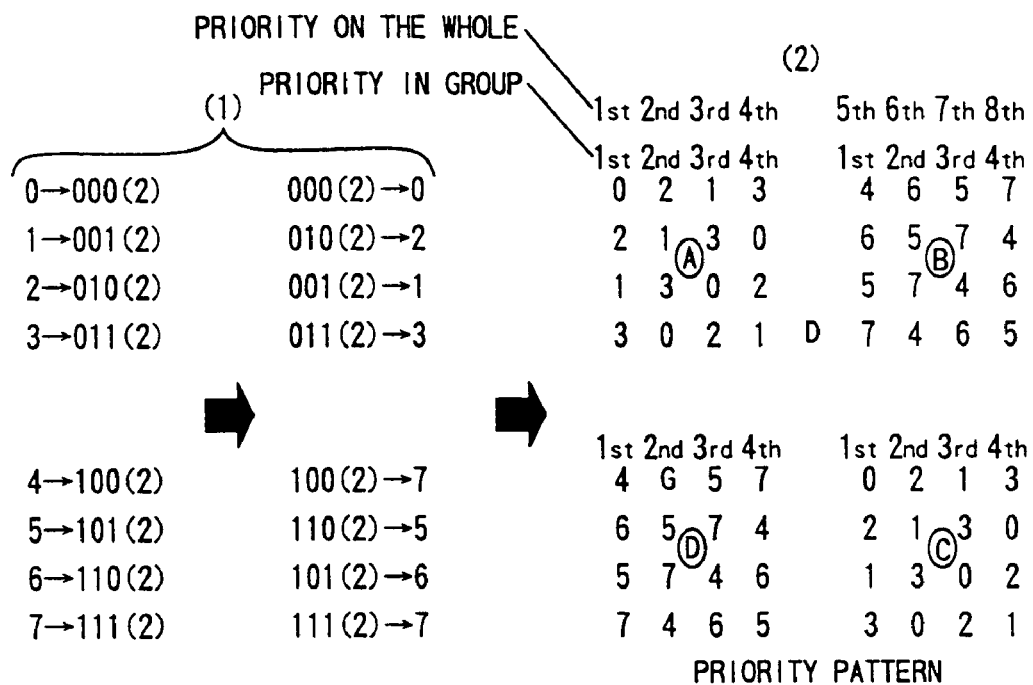
FIG. 27 is a diagram showing an example of creating the priority pattern in a extension configuration.
Figure 28:
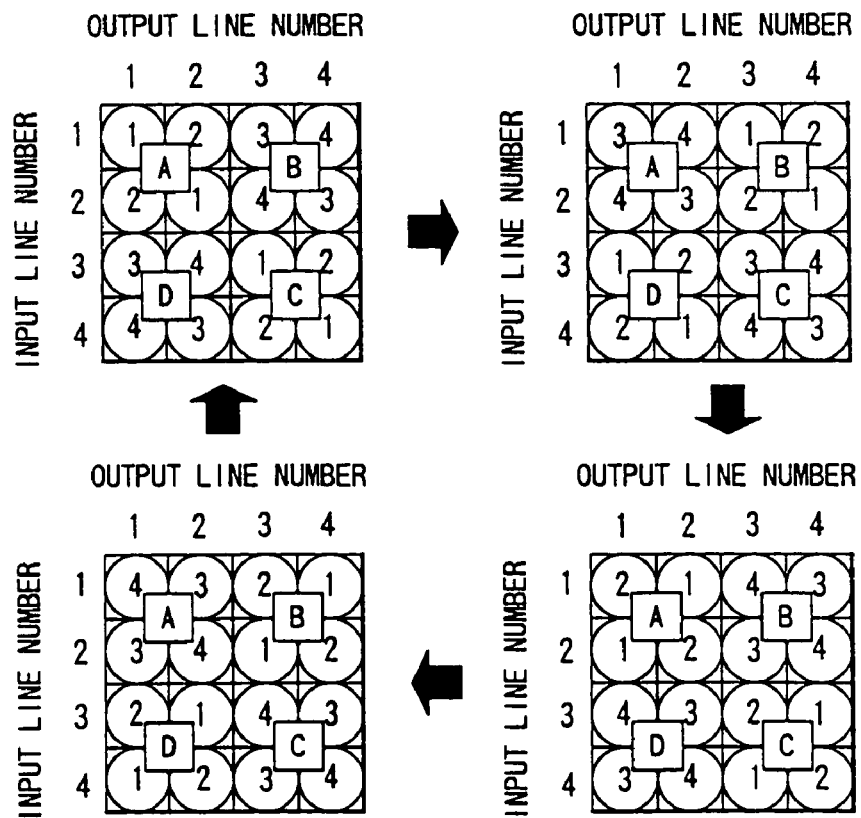
FIG. 28 is a diagram showing an example of updating the priority pattern.
Figure 29:
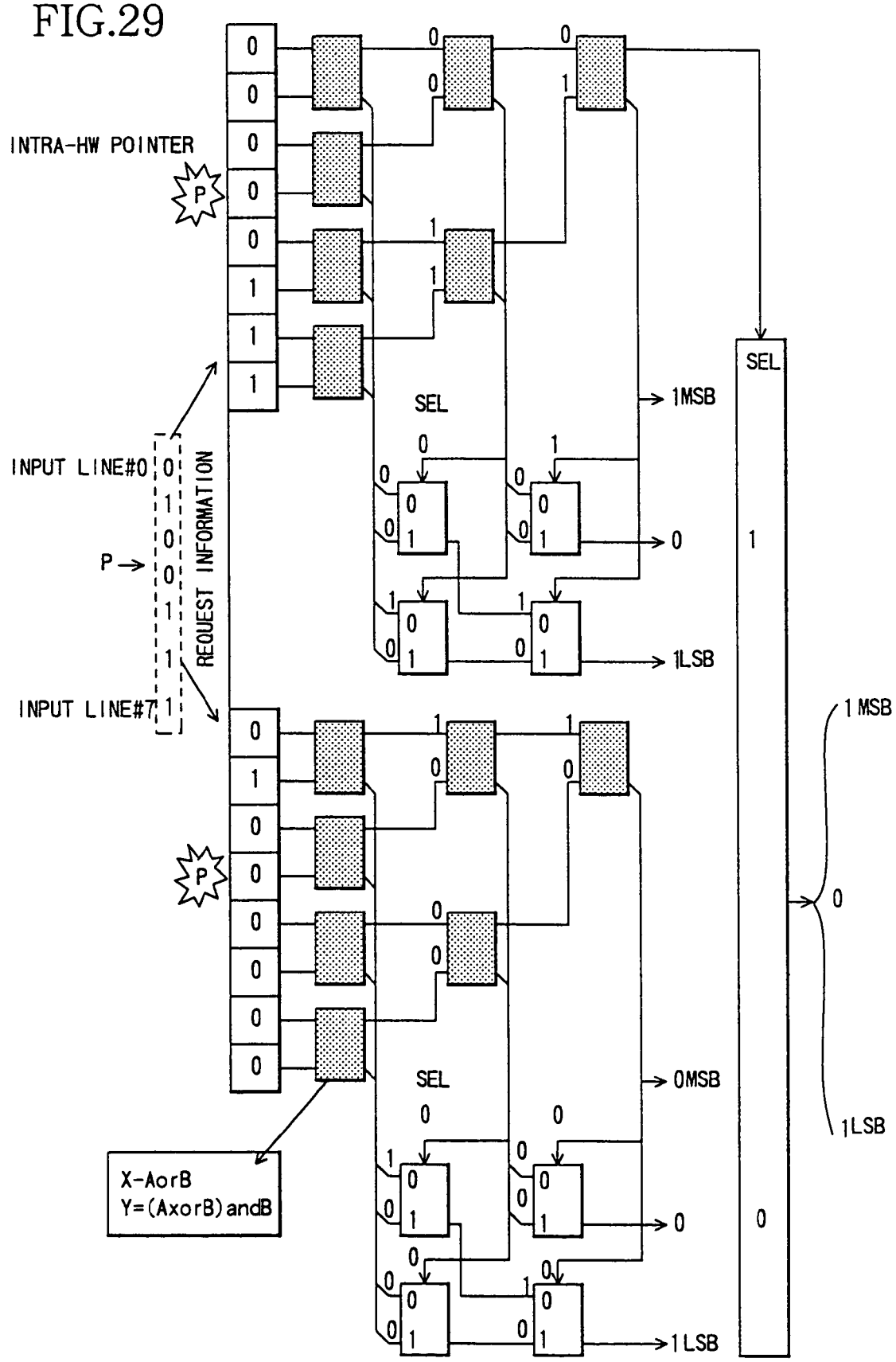
FIG. 29 is a diagram showing an example of a lowest number selection circuit.

Next, one embodiment of a scheduling processing unit for updating a priority pattern shown in FIG. 24, will be explained.

The scheduling processing unit using the priority pattern is, as explained so far, though it may be checked with respect to patterns 1~N whether or not there is a line request indicated by the pattern shown in a table in FIG. 79, capable of seeking this by taking logics which follow.

FIG. 79
Priority pattern

|  | 1st | 2nd | 3rd |
|---|---|---|---|
| Input line #0 | Output line #0 | Output line #2 | Output line #1 |
| Input line #1 | Output line #2 | Output line #1 | Output line #0 |
| Input line #2 | Output line #1 | Output line #0 | Output line #2 |

The priority pattern in FIG. 79 is rearranged as shown in FIG. 80.

FIG. 80
Priorities of scheduling sequence

|  | Output line #0 | Output line #1 | Output line #2 |
|---|---|---|---|
| Input line #0 | 1 | 2 | 3 |
| Input line #1 | 3 | 1 | 2 |
| Input line #2 | 2 | 3 | 1 |

Numerals in the table in FIG. 80 indicate priorities of selection logic. Namely, the following is a combination given a first priority.

Input#0-Output#0
Input#1-Output#1
Input#2-Output#2

For instance, a condition for enabling the input #0 to be forwarded to the output #2 is that the input #0 can be, it may be judged, forwarded if there are not requests for input#0-output#0 and input#1-output#1. This judgement is made by a contention control unit 45.

The scheduling processing unit is required to make a rotation of the priority pattern per scheduling cycle, and to change, similarly when viewed in terms of the priority, the way of giving the priority per scheduling.

A priority allocation control unit is needed for allocating the priorities and executing the rotation process.

Figure 39:
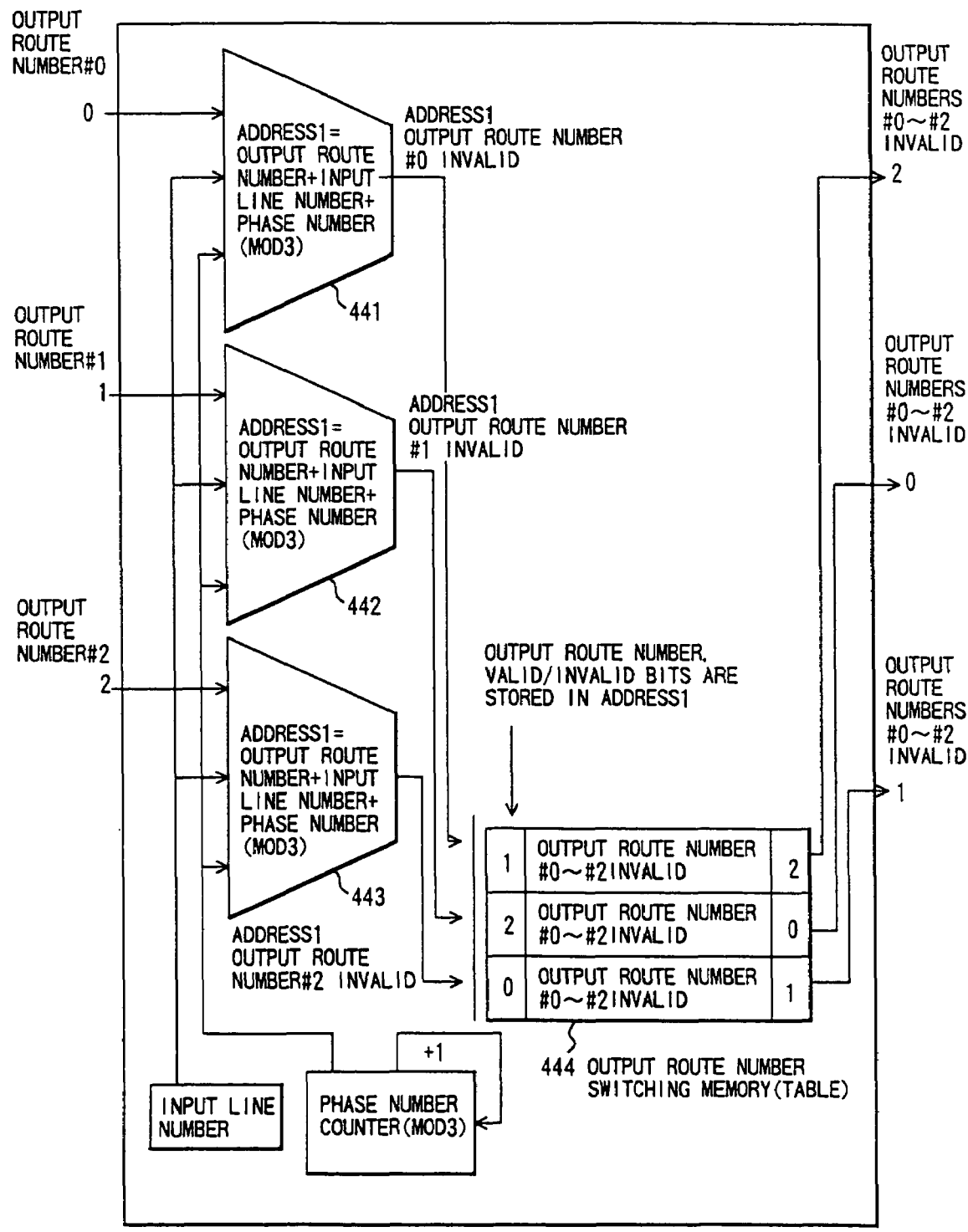
FIG. 39 is a diagram showing a construction of a priority allocation control unit in the embodiment 1.

FIG. 39 shows an embodiment when a 3×3 switch of the scheduling processing unit incorporating a priority synchronous algorithm is applied.

In this embodiment, the scheduling processing unit is constructed of output route number selectors 41 connected to the respective input lines, counters 42 connected by threes to each selector, counter output judging units 43, priority allocation control units 44 for inputting counter outputs by threes, a contention control unit 45 connected to all the priority allocation control units 44, and selectors 46 for giving output route numbers to the respective input lines.

Now, when a cell arrives at an input buffer, an output route number of the arrived cell for each of input lines #0~#2 is received, and the output route number selector 41 increments by +1 a counter value of the corresponding output route counter 42, thereby holding the number of cells arrived at the respective output routes per input line.

On the other hand, as a process of determining a reading sequence of the cells arrived at the input buffer, the judging unit 43 judges whether a number-of-cells counter value corresponding to each output route per input line is "0" or a valid number. If other than "0", the priority allocation control unit 44 is notified of the output route line number of the counter 42 concerned. If the counter value is "0", the value of the output route counter 42 remains to be "0", and the priority allocation control unit 44 is notified of the fact that the output route is invalid instead of the output route number by use of a flag or a value unallocated as an output route number.

Figure 40:
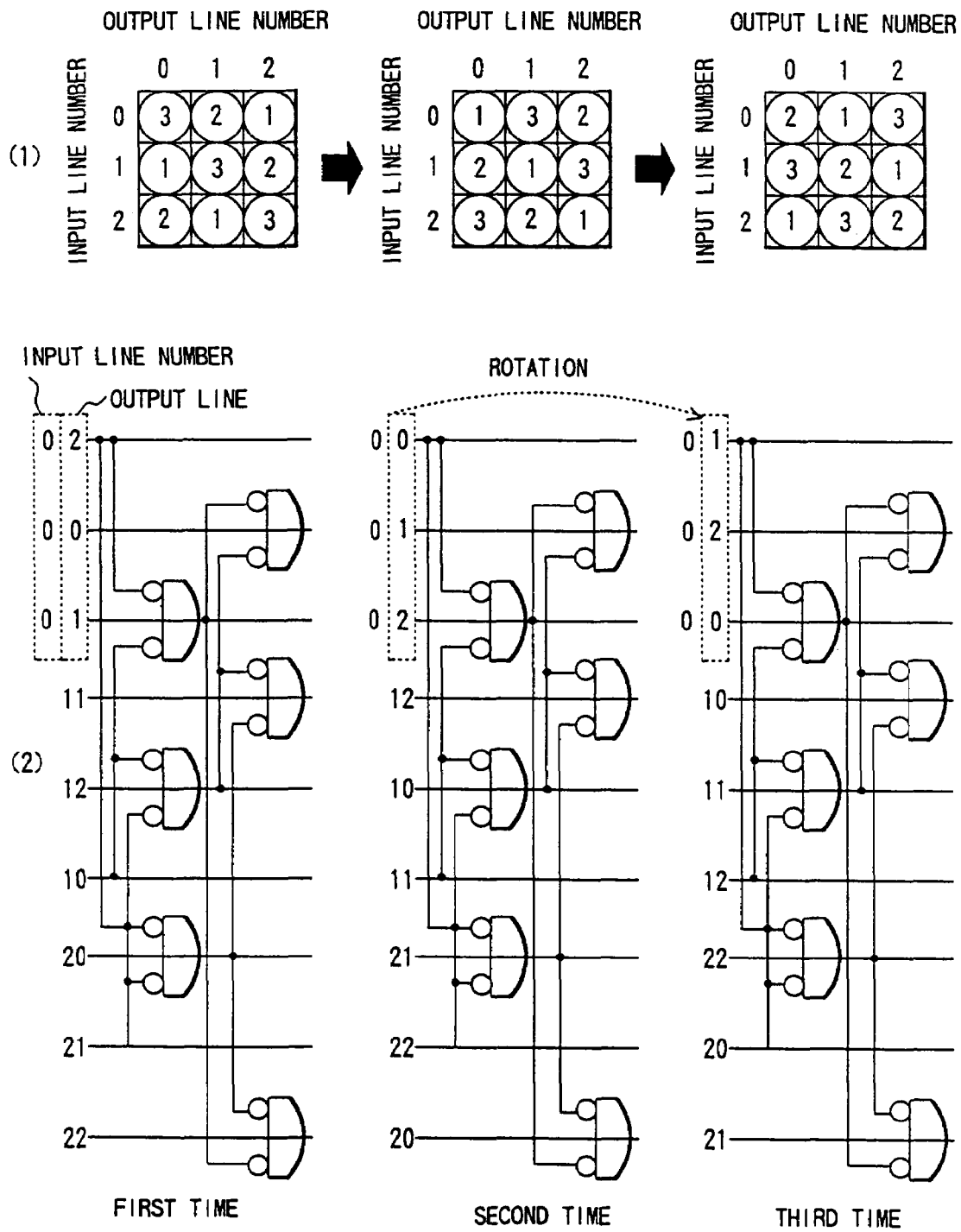
FIG. 40 is an explanatory diagram showing a rotation of the priority pattern in the embodiment 1.

FIG. 40 shows a detailed embodiment of the priority allocation control unit 44 constructed of adder units 441~443 and an output route number switching memory (table) 444.

In the priority allocation control unit 44, the adder units 441~443 add the output route numbers, the input line numbers and phase numbers which are read by the output route counter 42, and respectively calculates a Modulo 3, thereby creating a unique Address1 per output route.

Herein, since the phase number increments cell by cell, the Address 1 is a value between 0~2 rotated cell by cell. Further, the phase number is contrived to have a different value with respect to the same output route and the same phase per input line.

Next, the output route number is, based on Address1' obtained by performing an LSB/MSB inversion of Address1, written to the output route number switching memory 444. Further, if there is no cell corresponding to the output route number, the fact that the output route number concerned is invalid is written to the output route number switching memory 444 by use of the flag or an unused value, and the contention control unit 45 disposed posterior thereto is informed of this fact.

Thus, the priority allocation control unit 44 informs the contention control unit 45 posterior thereto of a corresponding output line number or invalid information, corresponding to a cell-by-cell priority change.

Herein, an operation of the priority allocation control unit 44 described above will hereinafter be specifically explained.

A bit indicating whether or not a forwarding request is given from the judging unit 43 and a desired output line number, are inputted to the priority allocation control unit 44.

Then, pieces of request information are randomized and rotated by executing processes (1)~(3) which follow.

(1) Creation of Address1

Now, the following is a method of creating Address1 when there are requests for, e.g., input line #0→output lines #0, #1, #2 and input line #1→output lines #1, #2.

Adress1=Output Line Number+Input Line Number+Phase Number=modN (N is the number of lines)

Note that the phase number is a repetitive number of 0~N−1 such as a first time=0, a second time=1, a third time=2, a fourth time=0, and a fifth time=1.

☆ Scheduling Process of the First Time (The phase number is 0 because of being the first time.)

○ Address1 Creation of Input Line #0

Address1#0+1+0+0=1mod3=1

Address1#1=2+0+0=2mod3=2

Address1#2=3+0+0=3mod3=0

○ Address1 Creation of Input Line #1

Address1#0=1+1+0=2mod3=2

Address1#1=2+1+0=3mod3=0

Address1#2=3+1+0=4mod3=1

☆ Scheduling Process of the Second Time (The phase number is 1 because of being the second time.)

○ Address1 Creation of Input Line #0

Address1#0=1+0+1=2mod3=2

Address1#1=2+0+1=3mod3=0

Address1#2=3+0+1=4mod3=1

○Address1 Creation of Input Line #1

Address1#0=1+1+1=3mod3=0

Address1#1=2+1+1=4mod3=1

Address1#2=3+1+1=5mod3=2

Thus, Address1 is rotated per scheduling cycle by adding the phase numbers. Further, Address1 differing between the respective lines can be created by adding a self-line number per input line.

(2) Storage of Output Line Number and Valid/Invalid Bits

With Address1 created in the process (1) described above serving as an address of the output route number switching memory 444, an output line number and valid/invalid bits are stored in the memory 444. Now, the request information for the input line #0 and Address1 are as follows:

Output line #0, Address1#0=1

Output line #1, Address1#1=2

Output line #2, Address1#2=0

Hence, the memory 444 is stored as below with the line numbers and the valid/invalid bits in an address corresponding to Address1.

Memory Address #0←Output Line Number#2

Memory Address #1←Output Line Number#0

Memory Address #2←Output Line Number#1

(3) Read of Output Line Number and Valid/Invalid Bits

The output line number and the valid/invalid bits are read from the memory 444.

In the reading process, the information read from the memory address #0 is forwarded to a port #0, the information read from the memory address #1 is forwarded to a port #1, and the information read from the memory address #2 is forwarded to a port #2. Then, those ports are connected to the contention control unit 45.

In this example, the output port #0 is informed of the output line number #2, the output port #1 is informed of the output line number #0, and the output port #2 is informed of the output line number #1.

The line numbers inputted are randomized in sequence by executing the processes (1)~(3) described above, and further this pattern is rotated as below per scheduling cycle.

| Original Input Data | Randomization & Rotation |
|---|---|
| 0 → | 2 |
| 1 → | 0 |
| 2 → | 1 |

The processes (1)~(3) are sought per input line, thereby rearranging and rotating the output line numbers as shown in FIG. 40(2).

Figure 41:
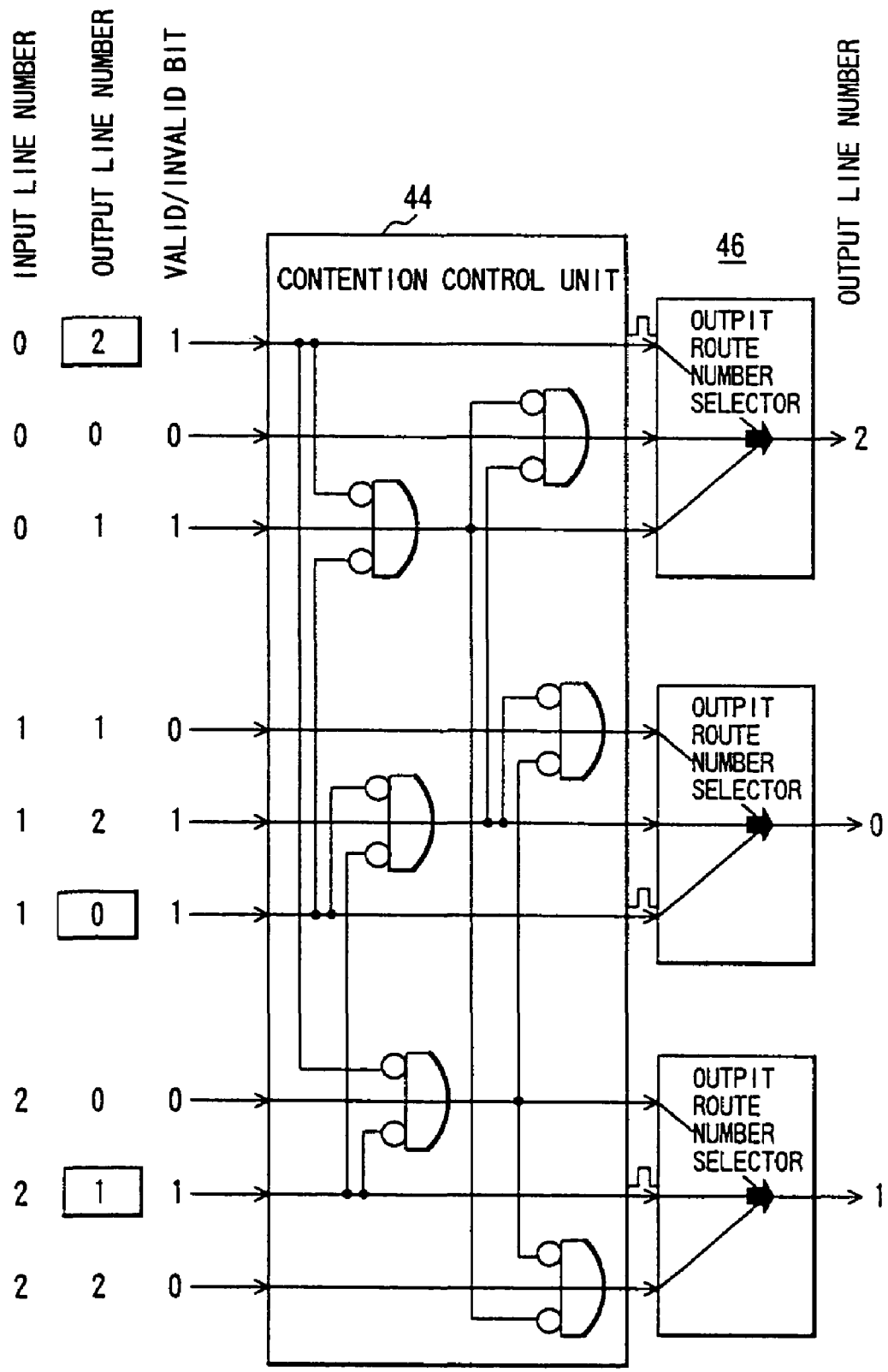
FIG. 41 is a diagram showing a construction of a contention control unit in the embodiment 1.

That is, the priority allocation with respect to the contention control unit 44 shown in FIG. 41 is rotated per scheduling cycle as shown in FIG. 40(1). FIG. 40(2) shows what this is structured by the actual circuit, and, as a matter of fact, the rotation of the priority is attained not by rotating the priority but by changing a position of a combination of pieces of request information with a contention logic being fixed.

Figure 42:
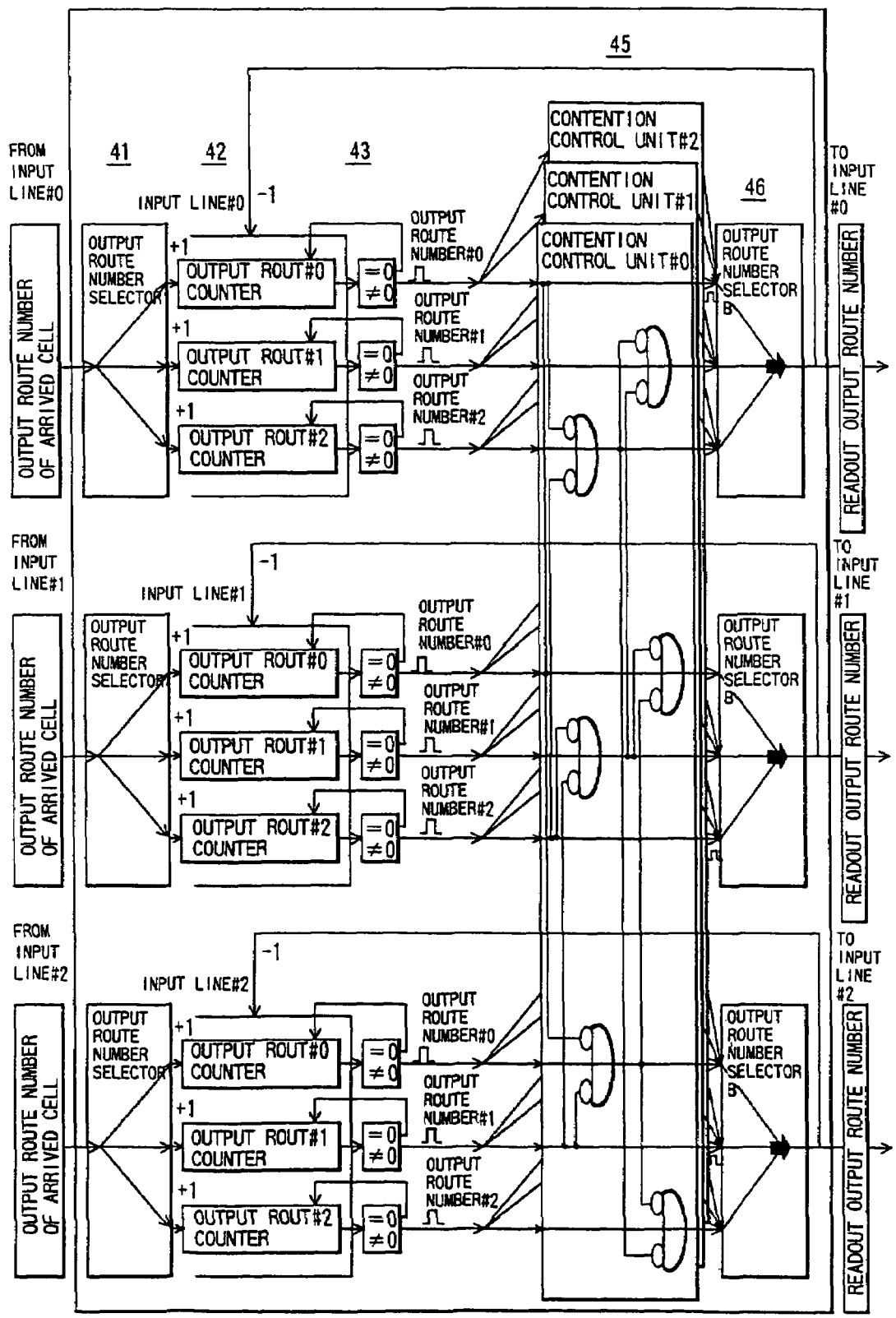
FIG. 42 is an explanatory diagram showing a case of rotating a contention selection logic in the embodiment 1.

Then, the contention control unit 45 performs contention control of the respective output route numbers and determines a final forwarding line by inputting, to six pieces of logic gates shown in the Figure, pieces of request information (the output line numbers and the invalid information) rearranged in the priority allocation control unit 44 as shown in FIG. 42.

More specifically, the operation of each logic gate becomes different depending on whether the output route number is "1" that is valid or "0" invalid. If valid, the output route number is to be outputted to the rear stage. Further, the priorities are allocated beforehand so that the priority for the respective output route numbers in the individual input lines are not coincident with each other, and hence the output route number selected per input line is only one at the maximum. That is, the selection logic circuit selects one of the ports in which the valid/invalid bits are set, and the output line number thereof is set as a final scheduling result.

Finally, the output route number selector 46 reads the output route number selected per input line from each input buffer, then notifies of this output route number, and decrements a corresponding output route counter value by −1.

In the example explained above, the output route number inputted to the contention control unit 45 from the priority allocation control unit 44, is inputted in rotation, thus carrying out this process by one single contention control unit. A contention selection logic may also be, however, rotated without inputting the output route number in rotation as in the embodiment shown in FIG. 42. Namely, there may be switched over the contention control units #0~#2 structured so that the priorities for the respective output lines are rotated with the priorities being previously synchronized between the respective input lines.

Note that the switch configuration is not particularly limited in the respective embodiments discussed above, however, a cross-bar switch or a sorting switch may also be available.

Further, the forwarding request information may be sent beforehand when the cell arrives, or may be notified per scheduling cycle.

Then, what the line numbers are coded may be notified as a format of the forwarding request information, or it may also be sent in the form of bitmap information.

Embodiment 2

Figure 43:
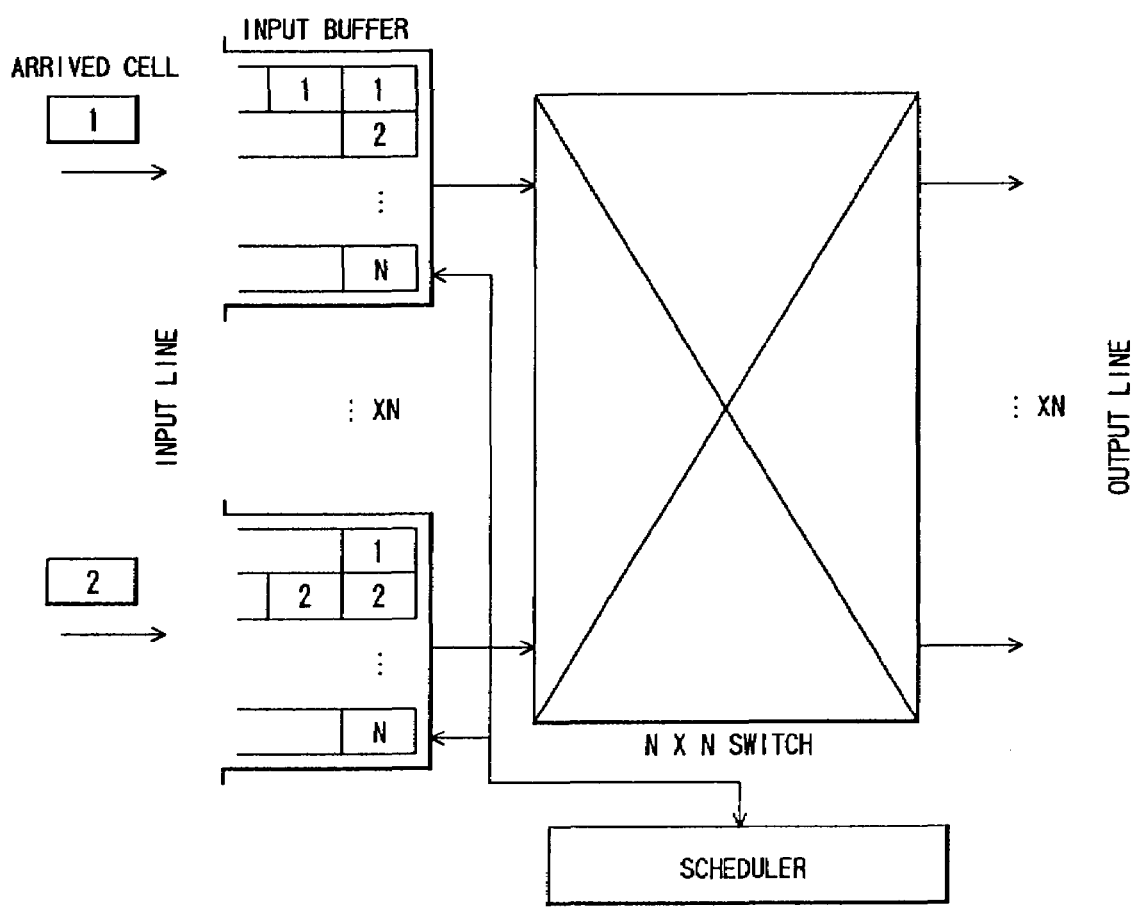
FIG. 43 is a diagram showing a system architecture in an embodiment 2.

FIG. 43 shows a whole architecture of the present system.

As illustrated in FIG. 43, in accordance with an embodiment 2, the cells arrived via the input lines are held by the input buffers, then inputted to an (N×N) configured switch by an indication given from the scheduler, and outputted from N-lines of output lines.

Figure 44:
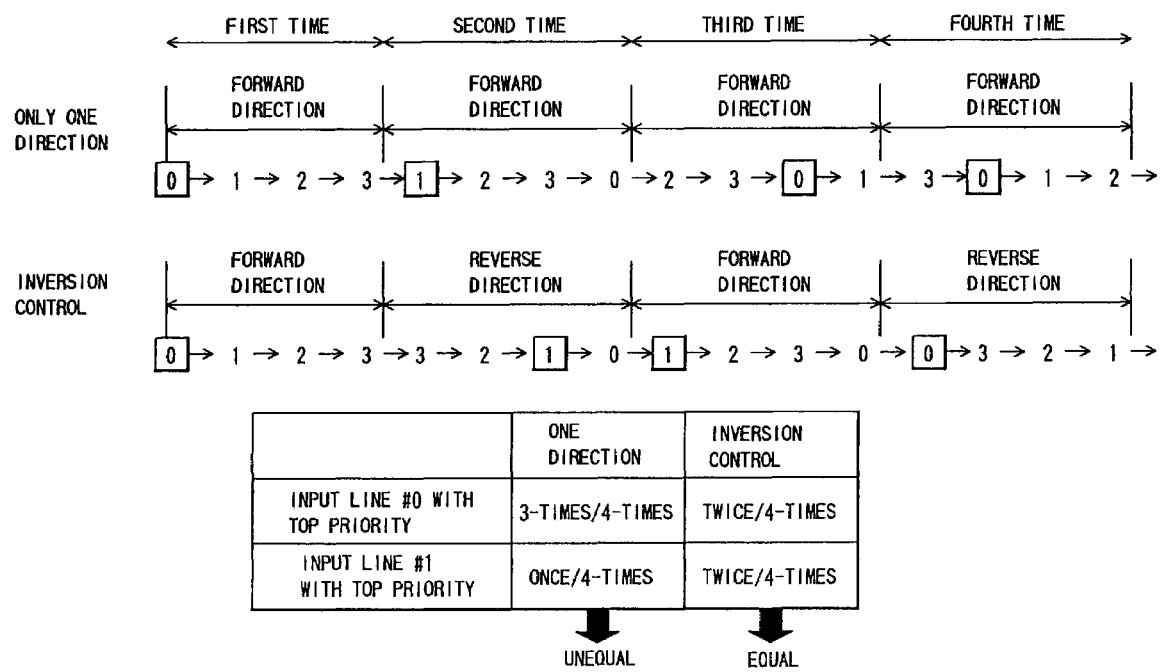
FIG. 44 is an explanatory diagram showing inversion control of a pointer in the embodiment 2.

Herein, inversion control of the inter-highway pointer will be explained referring to FIG. 44. A (4×4) configured switch is assumed in FIG. 44.

Referring again to FIG. 44, the scheduling of the first time starts with the input line #0 and is performed in sequence such as the input lines #0, #1, #2 and #3.

If the scheduling proceeds in the sequence in only one direction, the inter-highway pointer shifts second time in the forward direction, and the scheduling proceeds in sequence such as #2, #3, #0, #1 starting from the input line #2. Herein, when considering the scheduling sequence with an emphasis upon the input lines #0 and #1, a larger quantity of the input lines with lower numbers are scheduled earlier, resulting in ununiform scheduling. (The input lines scheduled earlier between the input lines #0 and #1 are squared in the Figure).

On the other hand, by contrast, in accordance with the embodiment 2, in the second scheduling when using the inversion control, the HW pointer works in a reverse direction under the inversion control, and the scheduling is performed in sequence of #3, #2, #1, #0 starting from the input line #3.

Thus, the inversion control is executed per scheduling cycle, whereby the scheduling sequence is replaced per scheduling cycle and, when scheming in a 2-cycle span, the uniform scheduling can be attained.

Embodiment 3

An embodiment of a pipeline processing system using the inversion control explained above, is hereinafter be described.

The configuration of the 4×4 switch has been exemplified in the embodiment 2, the four input lines may be scheduled within a 1-packet time. If accommodating a larger number of lines, however, it is difficult to finish the processing of all the lines within the 1-packet time.

Such being the case, the pipeline processing architecture is structured by shifting in time the scheduling start input line, thereby avoiding a problem in terms of a processing speed. This is how the present embodiment is.

Figure 45:
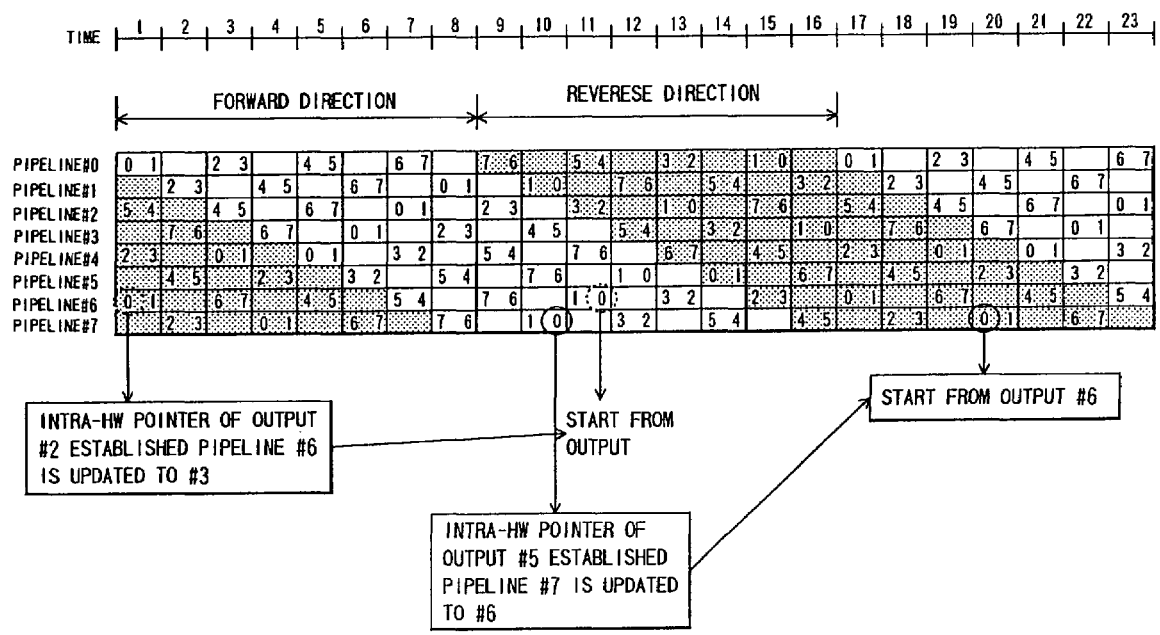
FIG. 45 is an explanatory diagram showing the pointer control in an embodiment 3.

FIG. 45 shows a pipeline sequence. A start number of each pipeline deviates in time, whereby a contention is hard to occur. The numerals in the Figure indicates the serial numbers of the scheduling target input lines. In this example, the scheduling of the two lines is executed within the 1-packet time. Then, the scheduling is structured so that the scheduling cycle of one time is completed in an 8-packet time.

In a pipeline #1, the scheduling of one cycle extends from Time1 to Time8. As discussed in the embodiment 2, the scheduling cycle at the inversion cycle corresponds to Time9~Time16 (the white area indicates the processing in the forward direction, while the black area indicates the processing in the reverse direction).

Though similar with respect to a pipeline #2, the scheduling start line is the input line #2 (Time=2). This is a value shifted by two from the start number of the pipeline process #1.

In this embodiment, the shift quantity is set to 2, however, that may be shifted by one therefrom. In accordance with the embodiment 3, the processing sequence within the 1-packet time is inverted after a pipeline process 4 instead of shifting by two.

Figure 46:
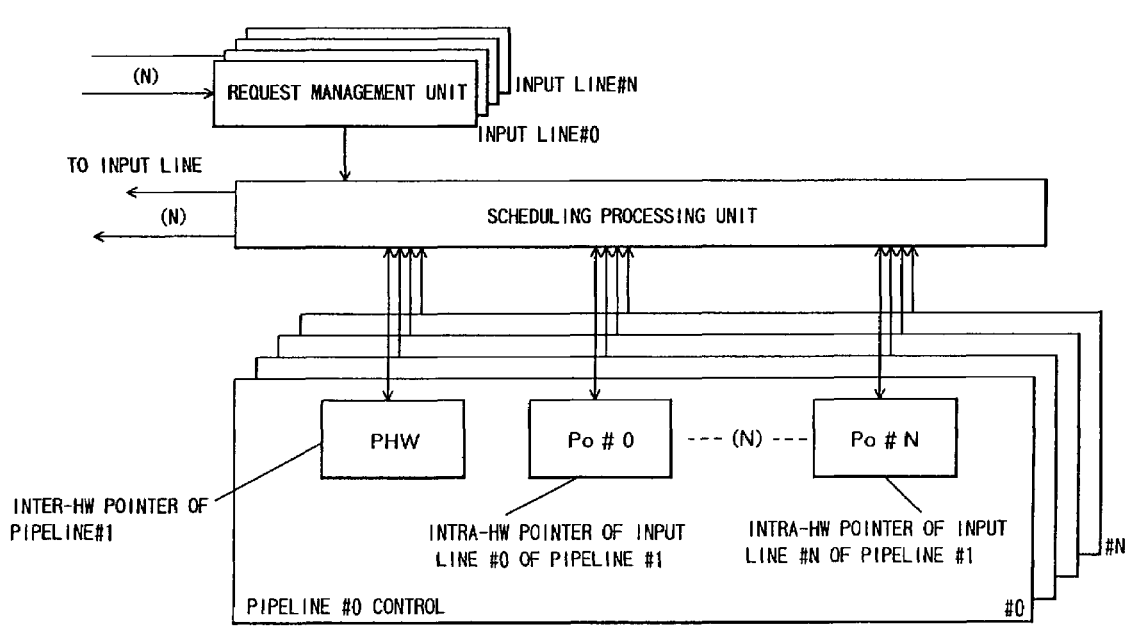
FIG. 46 is a functional block diagram (1) in the embodiment 3.
Figure 47:
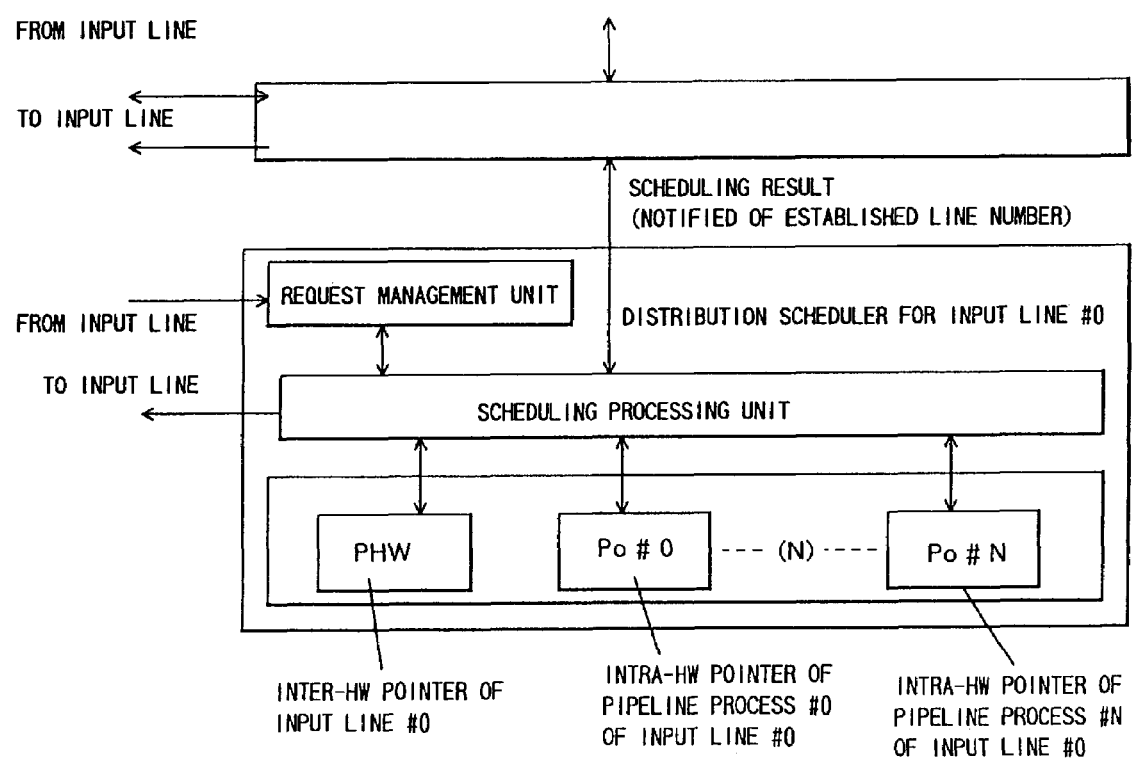
FIG. 47 is a functional block diagram (2) in the embodiment 3.

For performing the impartial scheduling in the pipeline process, the inter-highway pointer and the intra-highway pointer are provided respectively per pipeline process. Herein, a hardware architecture in this embodiment is shown in FIGS. 46 and 47. FIG. 46 gives an image when managing the scheduling unit in concentration, however, as shown in FIG. 47, the scheduling units may also be disposed in dispersion per input line.

Next, an operation of the inter-highway pointer will be explained.

For example, it is presumed that the output line is determined to be a line #2 in the scheduling of the input line #0 in a pipeline process #6 when Time=1. In that case, the intra-highway pointer (P HW#0_pipe#6) in the pipeline process #6 is updated to 3 so that the forwarding from the output line #2 is done with a low priority when scheduling the next input line #0.

When Time=3, there exists the scheduling of the input line #0 in the case of scheming on the whole, this pipeline #4 and the pipeline #6 described above operate completely independently, and the scheduling is conducted based on the intra-highway pointer of the pipeline #4 when Time=3.

Herein, the emphasis is put on the pipeline #6, the scheduling process of the next input line #0 exists when Time=11. A retrieval is effected from the output line #3 according to an intra-highway pointer value (=3) updated when Time=1.

When thus scheming in time-series, the forwarding pointer in each input line, it appears, does not equally turn round. The pointer, however, turns round equally in one single pipeline process, and, on the whole, the equal readout scheduling is executed.

The sequence of the time table in the pipeline process is not limited to the sequence given in the embodiment discussed above, whatever pattern may be adopted, and the start line number may be shifted one by one per pipeline process. Further, the scheduling of a plurality of input lines may be carried out within the 1-packet time, or the scheduling may not be executed at an interval of the 1-packet time within one scheduling cycle.

Embodiment 4

Next, an embodiment of a scheduling method in accordance with an input load will be explained.

Figure 48:
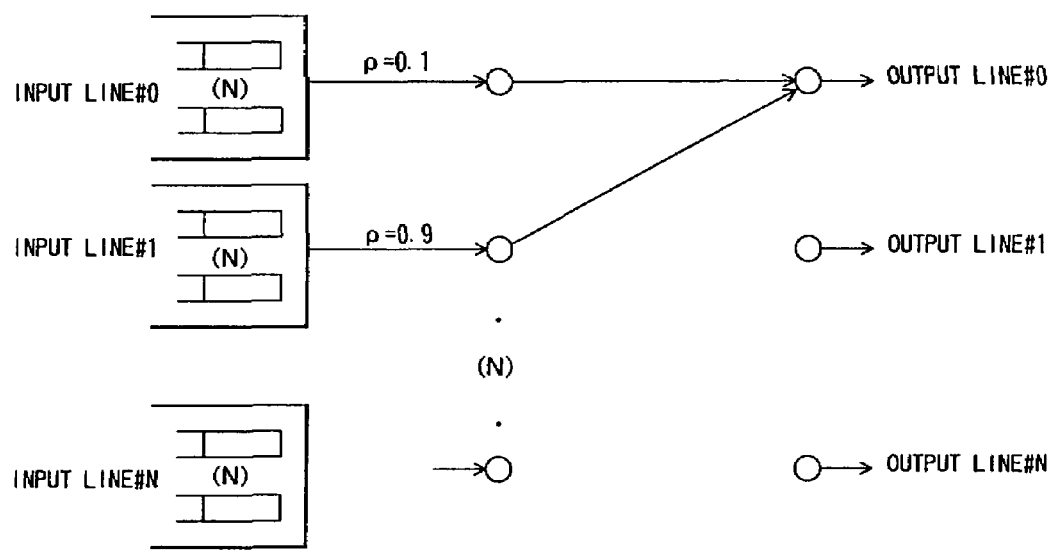
FIG. 48 is an explanatory diagram showing the situation in an unequal load in an embodiment 4.

FIG. 48 shows an example in an unequal load. It is presumed that an input traffic for an output #0 is inputted with a load of 0.1 from an input #0, and the input traffic for the output #0 is inputted with a load of 0.9 from the input #1.

For this example, in the case of performing the scheduling by use of round robin control, probabilities (readout probabilities) of the inputs #0 and #1 being selected are each 0.5, and, with a path #1–#0 having an input of 0.9, an input load is high for an output load, with the result that a queuing delay becomes large with an increase in the number of packets to be queued.

Figure 49:
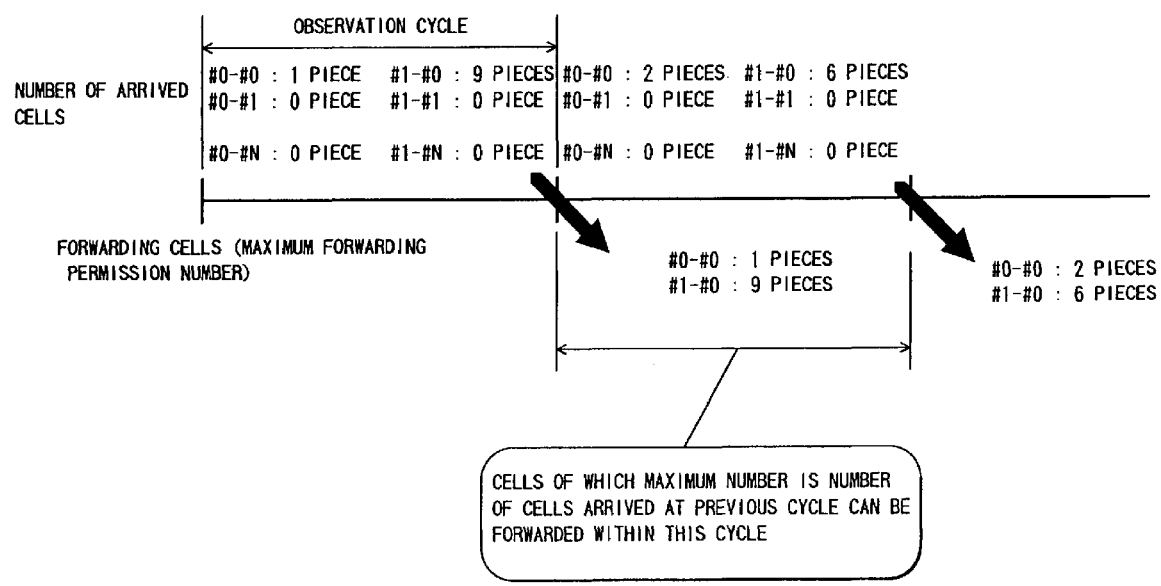
FIG. 49 is an explanatory diagram showing a process in the embodiment 4.

An embodiment for performing the scheduling based on a result of load observation so as to perform the scheduling equally for the load even in the unequal load as described above, will be discussed with reference to FIG. 49.

A scheduling system counts the number of arrived packets for each logical output queue at every fixed cycle. Herein, the load observation cycle is set to a 10-packets time by way of an example, and the numbers of arrived packets are, it is assumed, respectively given as follows:

Number of Packets Arrived at Input #0 and Having Forwarding Request to Output #0: 1 (Load: 0.1)

Number of Packets Arrived at Input #1 and Having Forwarding Request to Output #0: 9 (Load: 0.9)

At the next cycle (fixed), the scheduling is effected based on the number of the arrived packets.

The number of packets that can be forwarded at the fixed cycle is restricted to the number of arrived packets at the previous cycle, whereby it never happens that a delay of a high-load path becomes large even in the case of the unequal load. In this example, only one packet is allowed to be forwarded through a path #0-#0 for the 10-packet time no matter how large the number of forwarding requests may be. Then, nine pieces of packets at the maximum can be forwarded via a path #1-#0, and hence the queuing delay in the high-load path does not increase even in the unequal load.

Namely, the lines with small loads are regulated so as not to be read immensely.

An example of the actual operation will be described referring to a flowchart in FIG. 50.

When the packet (or the forwarding request information) arrives, a value of the load observation counter for the corresponding path is incremented, and the incremented value of the load observation counter is added per fixed cycle to a value of a number-of-arrived-packets work counter for work. This is a process for reading the number of remaining arrived packets by the scheduling of the next cycle, if there can not be completely forwarded all the packets of which the number corresponds to the number of packets having arrived at the previous cycle because of the contention control etc (FIG. 50(*a*)).

When the number of the load observation counter adding with making time shift to the work counter, the number of treatment of work counter can be reduced.

Next, an operation in the scheduling will be explained referring to FIG. 50(*b*)

In the scheduling, the number-of-arrived-packets work counter for the output line which is indicated by the intra-highway pointer, is checked, and, if over 1 and there is a forwarding request, a forwarding right is imparted to that line. In this case, as a matter of course, a requirement is that it is not ensured by other input lines. Then, the value of the number-of-arrived-packets work counter is incremented (by −1).

On the other hand, if the value of the number-of-arrived-packets work counter is 0, irrespective of whether or not there is the forwarding request, it is conceived that there is no forwarding request, and whether or not the packets can be forwarded to other input lines, is checked.

Thus, in the scheduling, the number of forwarding packets is restricted so as not to be over the input load by using the number-of-arrived-packets work counter.

Embodiment 5

The equal readout in the unequal load is actualized by restricting the number of forwarding packets corresponding to the number of arrived packets in accordance with the embodiment 4. A rate of the output lines may, however, be based on the number of arrived packets without restricting the number of forwarding packets. An operational example is shown as follows.

The counting of the number of arrived packets is done in the same way as in the embodiment 4, however, a difference is that the number of arrived packets is used for determining a rate of a top priority selection line at the next cycle.

It is presumed that, for example, there are the same number of arrived packets as in the embodiment discussed above.

Number of Packets Arrived at Input #0 and Having Forwarding Request to Output #0: 1 piece (Load: 0.1)

Number of Packets Arrived at Input #1 and Having Forwarding Request to Output #0: 9 pieces (Load: 0.9)

In that case, the top priority output line at the next cycle is that the path #0-#0: once, and the path #1-#0: nine times.

The top priority output line is determined corresponding to the number of arrived packets and indicated by a top priority pointer. The top priority pointer is ranked at a higher-order level than the intra-highway pointer, and the scheduler checks, to begin with, a top priority forwarding pointer when implementing the scheduling.

In that case, if there is a forwarding request for the determined to be the output line (on condition that there is the forwarding request and it is not used for other lines), and if not, the output line is determined by performing the scheduling as normally done in accordance with the intra-highway pointer.

Next, a difference from the embodiment 4 is exemplified with reference to FIG. 51.

Number of Arrived Packets at Previous Cycle
: Path Input #0-Output#0: 1 Piece
: Path Input #0-Output#1: 3 Pieces Number of Arrived Packets by Present Time at Present Cycle
: Path Input #0-Output#0: 2 Pieces
: Path Input #0-Output#1: 4 Pieces In the embodiment 4, the packets that can be forwarded at the present cycle are restricted to the number of arrived packets at the previous cycle, and hence the input #0=1 piece and the input #1=3 pieces at the maximum. Then, in that case, even when there are free lines at the present cycle, the packets over those numerical values are unable to be forwarded. Then, there can not be forwarded two pieces of packets and four pieces packets given such as the input #0=2 pieces and the input #1=4 pieces, which have arrived by the present time.

By contrast, in the embodiment 5, the packets given such as the input #0=1 piece and the input #1=3 pieces at the maximum, are forwarded with the top priority within the present cycle, however, the remaining packets are equally forwarded based on the HW pointer. Hence, if the line is free, the packets having arrived at the present cycle can be also forwarded.

The underlined numerical values (the path #0-#0: 2 pieces, and the path #1-#0: 4 pieces) in FIG. 51 are the numbers of the packets forwarded when free. The numbers of arrived packets at the present cycle at that time are given such as the path #0-#0: 2 pieces and the path #1-#0: 6 pieces.

In that case, the number of packets forwarded at the next cycle with the top priority is obtained by subtracting the number of packets forwarded other than the top priority from the number of arrived packets at the present cycle, and, when the following formula is applied, becomes as in the case of the path #0-#0 and the case of the path #1-#0.

(Number of Arrived Packets at Present Cycle)−(Number of Packets forwarded Other Than Top Priority at Previous Cycle)=Number of Packets with Top Priority at next Cycle Path #0-#0: 2−2=0

Path #1-#0: 6−4=2

Figure 52:
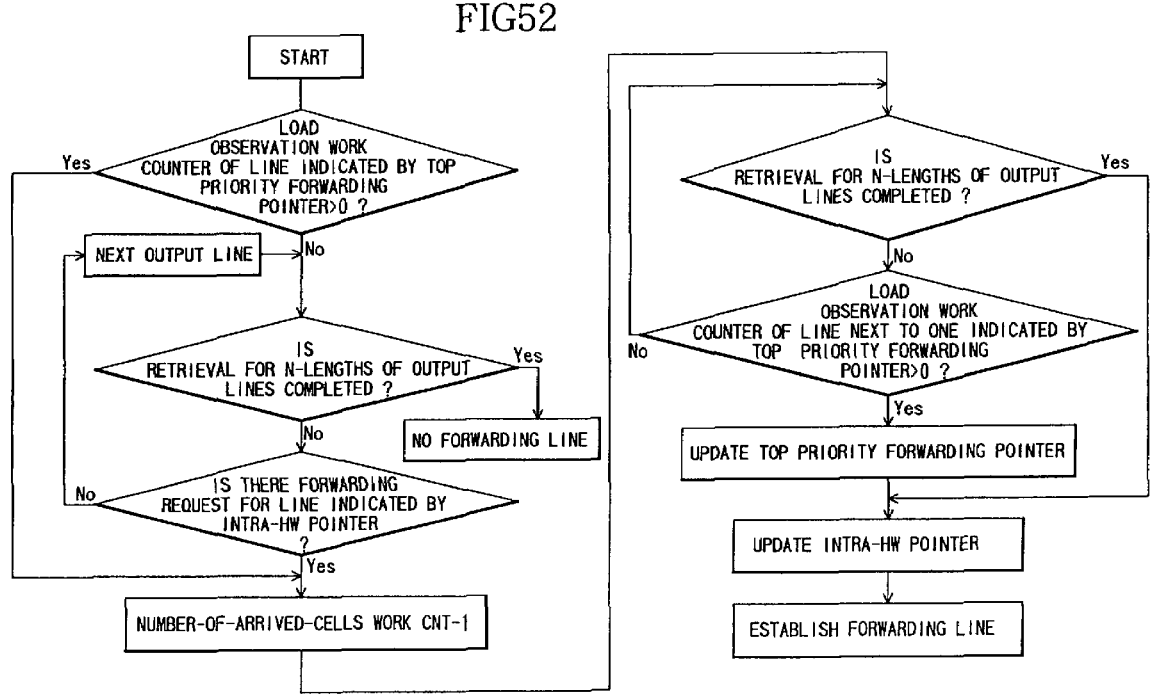
FIG. 52 is a processing flowchart in the embodiment 5.

FIG. 52 shows a scheduling flow when using the top priority forwarding pointer.

At first, when there is the forwarding request in the line indicated by the top priority pointer (common in pipeline), it is established that the packets are forwarded. If there is no request in the line indicated by the top priority pointer, or if the number-of-arrived-packets work counter shows "0", the scheduling is carried out based on the intra-highway pointer.

After the output line has been determined, a value of the number-of-arrived-packets work counter is decremented, thus updating the pointer (a flowchart on the right side in FIG. 52).

When the top priority pointer is updated and when the forwarding from the line indicated by the top priority pointer is established, the value of the number-of-arrived-packets work counter is decremented (by −1), and the top priority pointer is updated to a line with a value over "1" in the number-of-arrived-packets work counter, the line being found next that indicated by the present top priority pointer.

For instance, if the line indicated by the top priority pointer is #1 and the forwarding established line is also #1, and if the number-of-arrived-packets work counter shows the following numerical values, the line, which is to be found next, with a value over "0" as a counter value is the output line #4, and hence the top priority pointer is updated to 4.

Output Line #0 Work Counter: 4
Output Line #1 Work Counter: 3
Output Line #2 Work Counter: 0
Output Line #3 Work Counter: 0
Output Line #4 Work Counter: 5
Output Line #5 Work Counter: 3

Note that the intra-highway pointer is updated to the line next to the output line as usually done, i.e., to the line #2.

To sort out the operations of the top priority pointer, if the work counter indicates the following values, the top priority pointer might change per scheduling cycle as shown in the following chart.

Input Line #3 Work Counter: 4 pieces
Input Line #1 Work Counter: 2 pieces
Top Priority Pointer Value: #3 (first time)→#5 (second time)→#3 (third time)→#5 (fourth time)→#3 (fifth time)→#3 (sixth time)→#3 (seventh time)→#3 (eighth time)→#3 (ninth time)

In the above chart, the underlined top priority pointer is #3, however, since the work counter indicates 0, the scheduling is performed according to the normal intra-highway pointer.

Embodiment 6

Figure 53:
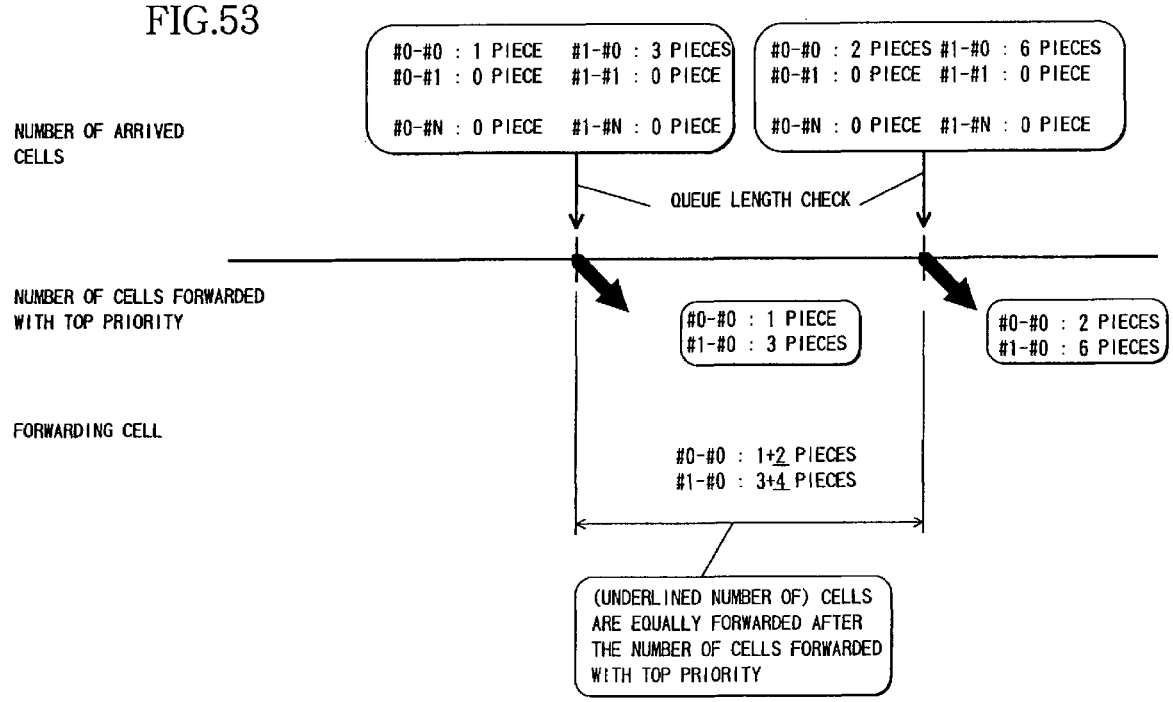
FIG. 53 is an explanatory diagram showing a process in an embodiment 6.

In the embodiment discussed above, the scheduling of the next cycle is executed based on the number of cells having arrived within the fixed cycle. The scheduling of the next cycle may also be, however, implemented per fixed cycle with a quantity of the packets accumulated in the input buffer, i.e., with a queue length. FIG. 53 shows a processing example.

Shown herein is a method of checking a queue length of the input buffer unit per fixed cycle, and determining the top priority output line in accordance with this queue length. If a queue length of the input line #0—the output line #0 is equal to 10 pieces and a queue length of the input line #1—the output line #0 is equal to 5 pieces, these values are set in the number-of-arrived-packets work counter (which is herein used not as the number-of-arrived-packets work counter but as a queue length work counter) in the embodiment based on the number of arrived packets.

Then, this work counter is checked when determining the top priority pointer, and the line with a value over "0" in the queue length work counter is set in the top priority pointer.

FIG. 54(*a*) shows a work counter determination flow. FIG. 55(*a*) shows a work counter setting example.

As another method, the queue length work counter of the next cycle may be determined from a rate of the queue length. FIGS. 54(*b*) and 54(*c*) show flowcharts.

Shown therein is a method of determining the work counter value of the next cycle, based on an occupying rate of a self-queue length to the entire queue lengths (a sum of the queue lengths on the same output route).

Referring to FIG. 55(*b*), the fixed cycle is set to a 20-packet time, and, for example, set values of the work counter for the input line #0 are given such as the self-queue length=10 packets, the entire queue length=27, and the rate is on the order of 0.37 . . .

Then, the rate within the next cycle is obtained by: 0.37×20=7.4, and thus "7" is given as a rounded value. The decimals may be omitted or raised to the next whole number. Similarly, the work counter value of the next cycle is determined for all the input lines.

Further, the work counter value of the next cycle may also be determined based on a relationship in magnitude between the self-queue lengths. Herein, it is presumed that a rate of 0.05 be given to the queue lengths 0~3, a rate of 0.1 be given to the queue lengths 3~10, and a rate of 0.2 be given to the queue lengths 10~20. Then, the fixed cycle is set to the 20-packets time.

Subsequently, the queue length is checked per fixed cycle, and it is confirmed which range the present queue length falls into, thereby obtaining a rate corresponding to the queue length. For instance, with respect to the input line #0 in FIG. 55(*c*), the present queue length=10, and a rate of 0.1 is obtained because of the range 3~10. Then, a rate at the next cycle is given by 0.1×20, and the result is "2".

The ranges and the rates thereof in the embodiment described above may be arbitrarily set or may be determined corresponding to real traffics, or may be set under a certain traffic condition so that the rates are properly allocated.

Figure 56:
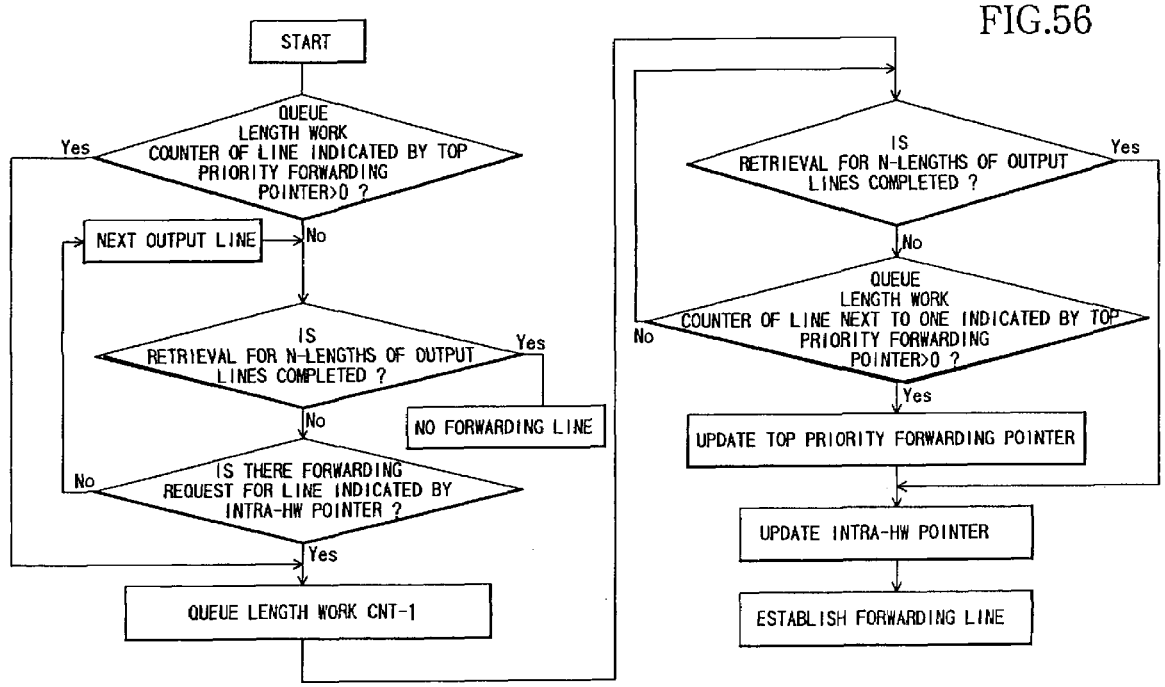
FIG. 56 is a processing flowchart in the embodiment 6.

After the queue length work counter has been determined, as in the embodiment 5, the top priority pointer is updated. FIG. 56 shows a flowchart. The operation is absolutely the same as that in the embodiment 5.

Embodiment 7

Next, a method of dispersing and extending the schedulers will be explained.

Figure 57:
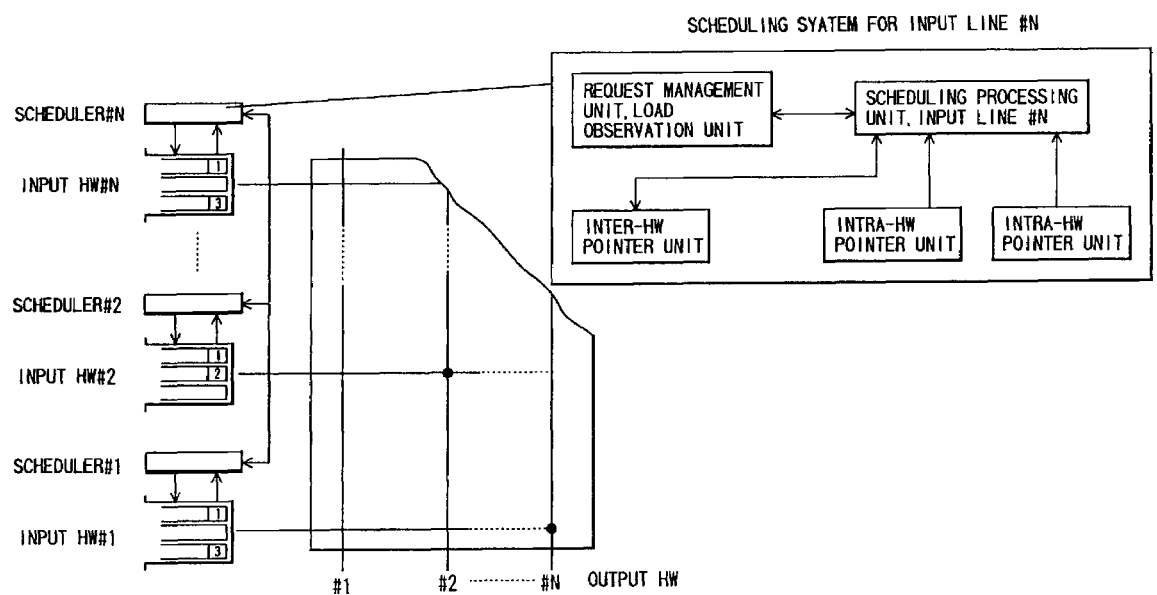
FIG. 57 is a diagram showing a buffer switch in an embodiment 7.

The scheduling systems described so far may be disposed in dispersion per input line as illustrated in FIG. 57. The scheduler for every input line includes a self-line request information managing unit, an inter-highway pointer for the self-line, and an intra-highway pointer per pipeline process, and performs the scheduling of the self-line.

Herein, if the schedulers are disposed in concentration (as in the case shown in FIG. 46), the inter-highway pointer is needed for determining which input line is to be scheduled next. If disposed in dispersion, however, the value of the inter-highway pointer is always for the self-line and is not used as a pointer. Instead, it is judged based on a predetermined self-slot position of a predetermined timetable when the scheduling of the self-line should be performed.

As discussed above, in the case of being disposed in dispersion, it is required that the information be received and transferred between the schedulers in order to know whether or not the output line having the forwarding request has already been established by use of other input lines on the occasion of the scheduling.

FIG. 58 shows an example of an architecture of connection when disposed in dispersion. A ring type connection in FIG. 58(a) is such that a string of the schedulers are connected in a loop. In this case, a propagation distance between the lowest-order scheduler and the highest-order scheduler becomes large. Further, each time an extension of the scheduler is made, it is required that an information transmission link between the schedulers be re-configured. On the other hand, as shown in FIG. 58(b), if the schedulers are disposed equally in a shape of information transmission ring, propagation delays between the respective schedulers are equalized, and further the schedulers can be extended online without the re-configuration thereof.

The connection between the schedulers will hereinafter be described in details.

FIG. 59 illustrates a construction of an extension unit consisting of a plurality of schedulers, and its extension method as well.

FIG. 59 shows the method of extending the (4×4) configured switch to a (12×12) configuration from an (8×8) configuration.

The extension is conducted per extension unit structured as a congregate of the plurality of schedulers. In this example, one single extension unit includes four pieces of schedulers on a (4×4) extension basis (the schedulers for two lines are expressed as one block in the Figure, and therefore the number of schedulers is 2 as a block but 4 in a logical sense).

The extension unit has an external interface with other extension units, which serves to make a ring-connection between those schedulers, and a selector for switching over the external interface and an internal ring. Further, a delay block for delaying the transmission of the information between the schedulers is provided on the internal ring. For example, referring to the diagram on the left side in FIG. 59, since there is provided one single extension unit, the selector is structured to select the internal ring side at all times. Then, the line sequence for performing the scheduling is: the line #0→the line #1→the line #2→the line #3. A delay control block is provided between the line #1 and the line #2, and a result of the scheduling of the line #1 is delayed for a fixed time by the delay block and transferred to the scheduler for the line #2.

Next, there is exemplified a case of configuring the (8×8) switch by extending the extension unit into two units.

When the extension unit is extended, clock/frame signals start flowing to the external interface, with those signals being detected, the selector of each extension unit comes to select the external interface side. Then, the originally existing delay block of the extension unit comes to a state of being unused, and, instead, there works the delay block of the extension unit newly extended. The scheduling is implemented in sequence such as: the line #0→the line #1→the line #4→the line #5→the line #6→the line #7→the line #2→ the line #3. The delay block is used between the line #5 and the line #6.

The extension to the (12×12) switch is attained in the same procedure. Thus, the schedulers can be extended online without re-configuring the information link between the schedulers.

Next, an actual operation of the delay block will be explained.

Figure 60:
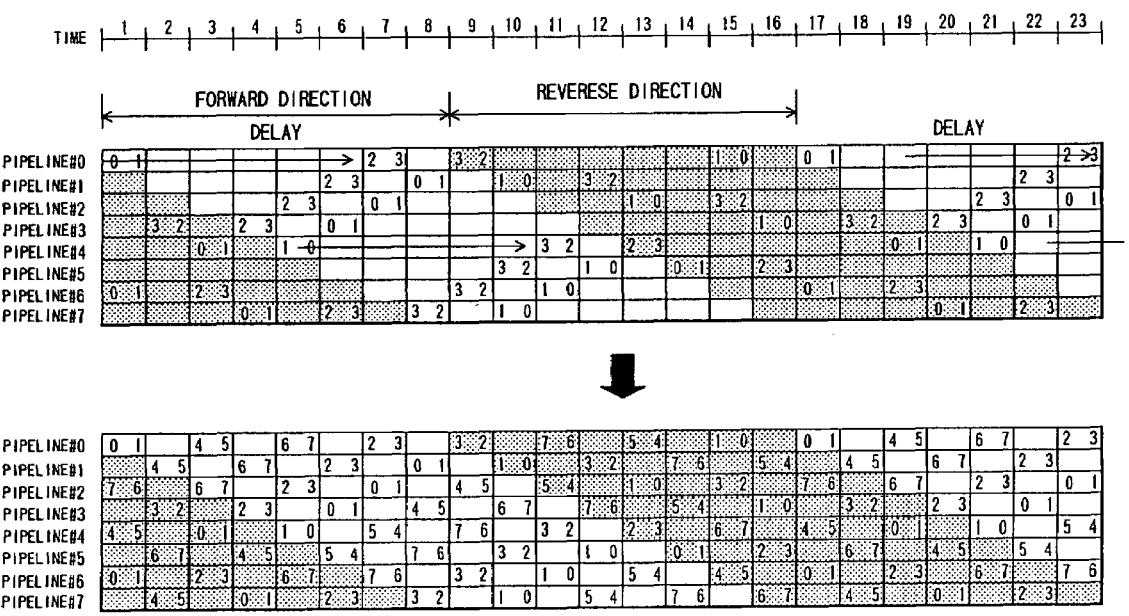
FIG. 60 is an explanatory diagram showing an operation of a delay block in the embodiment 7.

FIG. 60 shows a function of the delay block. Herein, there is given an example where the switch configuration is assumed to be actualized by 8×8 at the maximum.

To start with, the pipeline sequence is to be structured as shown in a lower chart in FIG. 60 on the assumption of the maximum configuration. The distributed schedulers per input route each perform the scheduling operation in a slot with the self-line number of this pipeline sequence.

A self-time slot is changed each time the number of connection lines varies due to an increase in the number of lines, which makes complicated the process when in switching in the case of being extended online as well as making the hardware hard to construct. Such being the case, the self-time slot is always fixed by delaying the data transfer between the schedulers when the number of lines is small in accordance with the scheduling sequence in the case of the maximum configuration.

An upper chart in FIG. 60 shows a pipeline sequence when configured by 4×4. The scheduling sequence is such as the line #0→the line #1→the line #2→the line #3, however, a piece of information on a result of the scheduling of the line #1 is delayed by a 4-packet time and thus transmitted to the line #2. With this operation, a position of the self-time slot can be fixed. Referring again to FIG. 60, the pipelines #1, #2, #3, #5, #6, #7 do not delay the scheduling information. This is because the scheduler disposed one before the delay block corresponds to the last line of the scheduling cycle, and it is therefore not required that the lines posterior thereto are notified of the information.

Relations between the respective pipelines and the delays are given as follows:

4×4    01 . . . . . . . . . . . . . . . . . . >23 (Delay: 8)
8×8 01 45 . . . . . . . . . . . . . . . >67 23 (Delay: 4)
12×12 01 45 89 10 11 67 23 (Delay: 0)

Embodiment 8

One embodiment where QoS (Quality of Service) control is conducted by both of the input buffer and the scheduler, will be explained.

Figure 61:
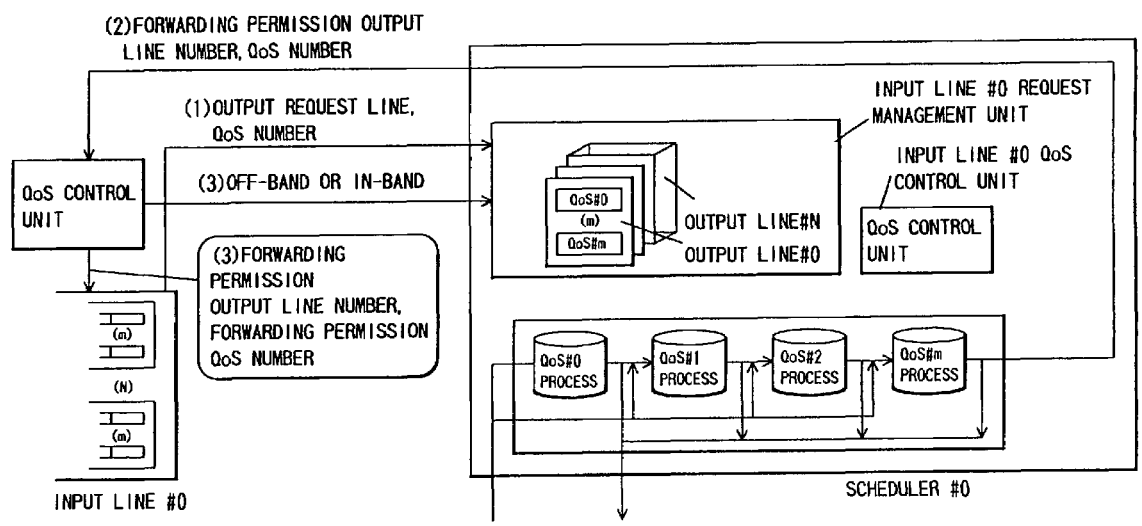
FIG. 61 is a functional block diagram showing QoS control in an embodiment 8.

FIG. 61 shows a relationship between the input buffer unit and the scheduler unit. The input buffer unit manages the arrived packets per logical output queue on an N-route and per QoS class among m-pieces of QoS classes. Then, the scheduler unit is notified of the forwarding request information (a desired output route number) and the QoS class.

A request management unit of the scheduler manages the information per logical output queue and per QoS class.

The scheduler unit performs the scheduling from the forwarding request having a high-priority class in consideration of only a delay characteristic of the QoS class. The scheduler unit, if there is no forwarding target in the high-priority class, judges whether or not the next forwarding of the high-priority class can be done, and executes the scheduling in sequence from the high-priority class.

The following is an actual processing sequence.

For instance, it is presumed that there are requests for a QoS class #3 of the output line #1 and a QoS class #0 of the output line #2. Then, the intra-highway pointer is assumed to indicate #0 (the QoS class #0 is the highest priority class).

To begin with, the scheduling with respect to the high-priority class is carried out. In this example, the line having the request for the QoS class #0 is only the output line #2, and hence a tentative forwarding permission output line is determined to be #2. In this case, if other lines also similarly have the request for the QoS class #0, the lines are retrieved in sequence from the line #1 in accordance with the inter-highway pointer, and the line found first is allowed to be a tentative forwarding permission output line.

Then, the input buffer unit is notified of the tentative forwarding permission output line together with the QoS class.

The input buffer unit, based on the information received, executes band control of the QoS class of the tentative output line, and checks whether it is possible to output in a desired band or not. If within the band, a read indication is given to the buffer unit. Herein, if judged to be out of the band, the packet is not forwarded from the buffer, and the scheduler unit is informed of being out of the band.

The scheduler unit receiving the notice of being out of the band performs the scheduling of the next priority class. In this example, there are no requests for the QoS classes #1 and #2, and hence the scheduling of the next QoS class #3 is to be effected.

It is only the input line #1 that has a request for the QoS class #3. Accordingly, the input buffer unit is again notified of the tentative output line number and the QoS class, and the processes described above are repeated.

With a series of those processes, the scheduler unit is capable of ensuring the delay characteristic, and the input buffer unit is capable of ensuring the band characteristic.

Figure 62:
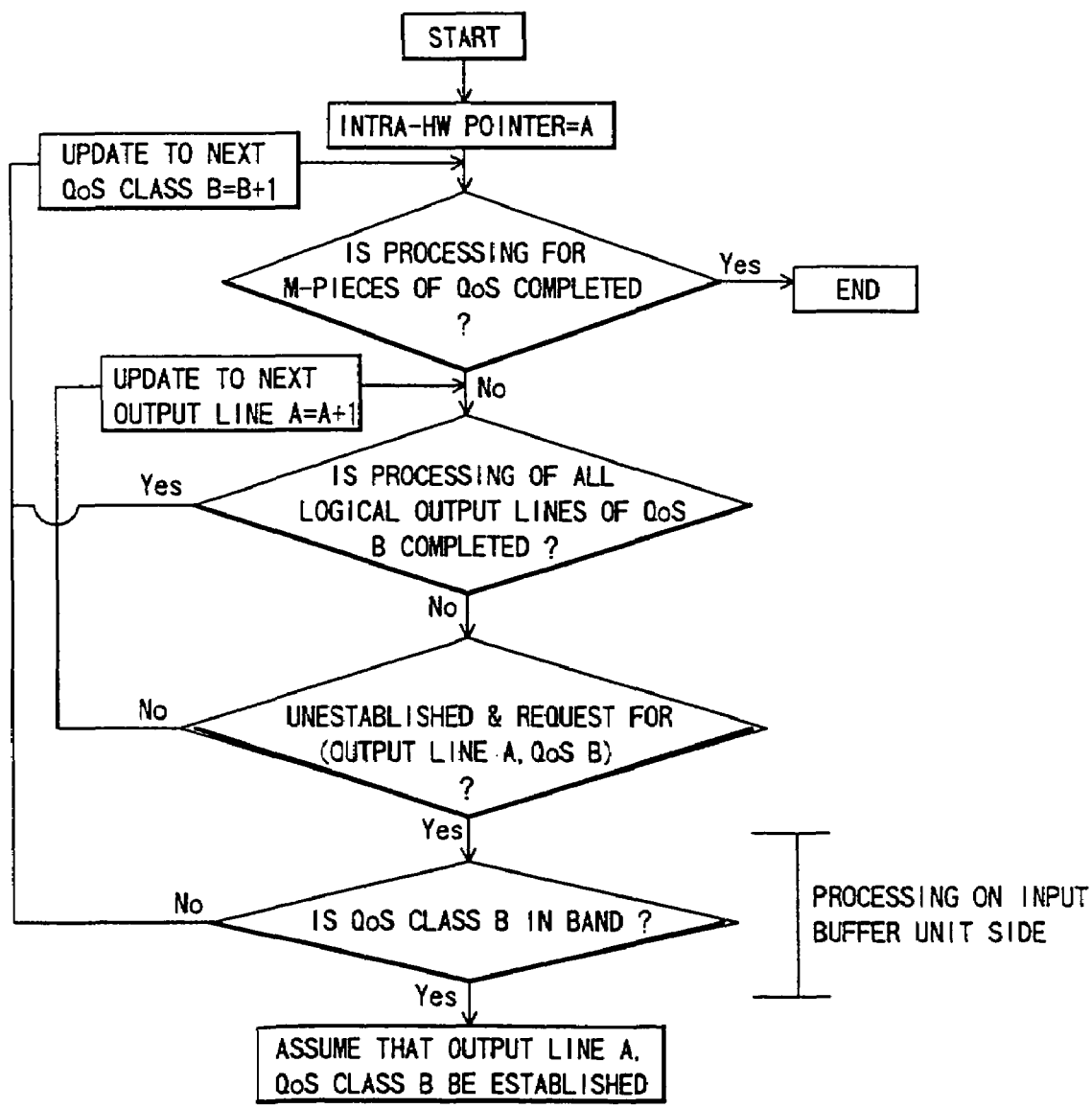
FIG. 62 is a processing flowchart in the embodiment 8.

FIG. 62 shows this operation flow.

Embodiment 9

In the embodiment discussed above, the scheduling is conducted in sequence from the top priority class among the QoS classes, and the processes are repeatedly executed until the output line is established. A method which follows, however, may also be taken.

The input buffer unit notifies the scheduler unit of the forwarding request information and the QoS class, and the scheduler unit maps the information per QoS class to K-pieces of groups.

For instance, of six QoS classes, the information on the QoS classes #0~#4 is mapped to a group #0, and the information on the QoS class #5 is mapped to a group #1.

The request management unit manages the arrived request information per output line and per group.

Then, the scheduler implements the scheduling from the top priority group among those groups, and, if the output liens are not established in the high-order groups, does the control so as to schedule a low-order group next thereto. Then, the scheduler informs the input buffer unit of the established forwarding permission output line number and group number as well.

A QoS control unit of the input buffer effects the band control in sequence from the top priority class among the QoS classes in that group, and, if within the band, a read indication is given to the buffer.

Figure 63:
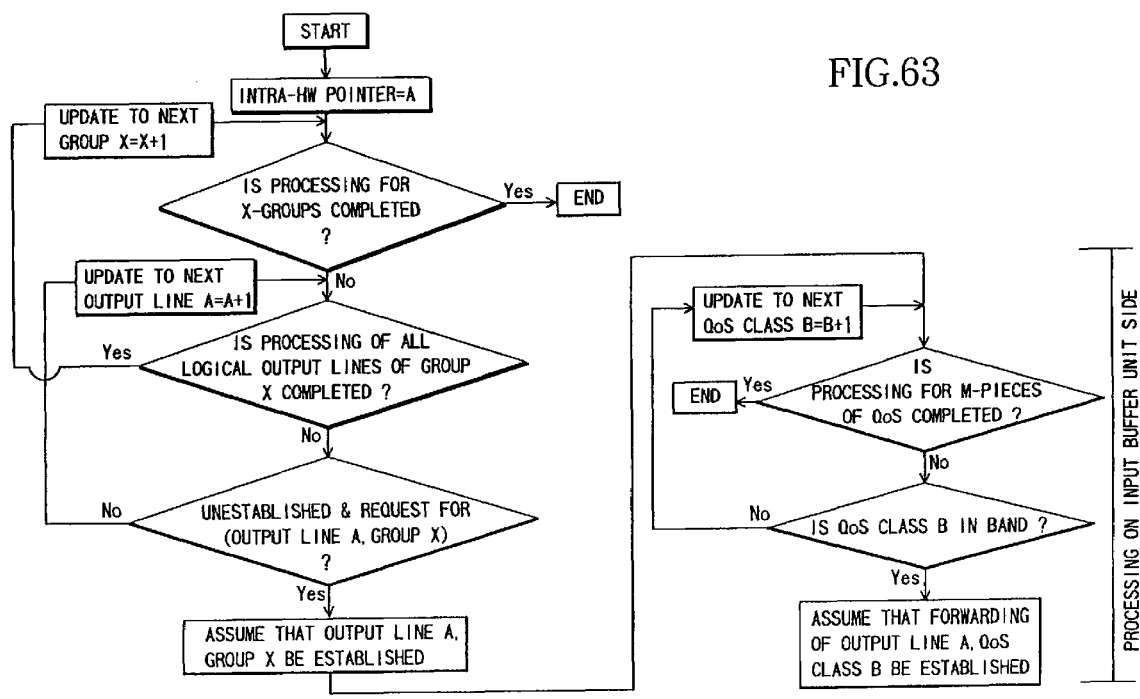
FIG. 63 is a processing flowchart in an embodiment 9.

FIG. 63 shows this processing flow.

In the embodiment discussed above, after the output line has completely been established, the forwarding permission line number is sent back to the input buffer. If the number of groups is small, however, as in the embodiment 7, the input buffer unit is temporarily notified of the tentative forwarding permission line number, and, if out of the band, the scheduling of the next group may also be performed.

Further, the number of groups and the combination of QoS to be mapped are not limited to those shown in the above embodiment, and the QoS class information may arbitrarily be mapped to 1~N pieces of groups.

Embodiment 10

Next, one embodiment of another QoS control method will be explained.

Figure 64:
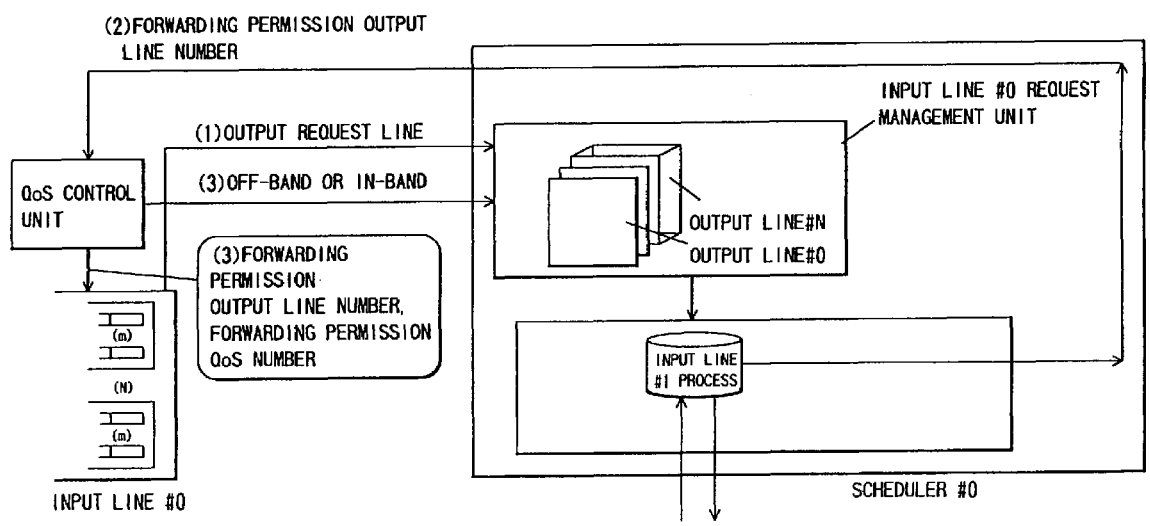
FIG. 64 is a functional block diagram in an embodiment 10.

FIG. 64 shows a relationship between the input buffer unit and the scheduler unit. The input buffer unit manages the arrived packets per logical output queue on the N-route and per QoS class among m-pieces of QoS classes. Then, the scheduler unit is notified of only the forwarding request information (a desired output route number).

The request management unit of the scheduler manages the information per logical output queue.

The scheduler unit carries out the scheduling in accordance with the request output line without considering the QoS class, and notifies the input buffer of the forwarding permission output line number.

The input buffer unit receiving the forwarding permission line selects the classes within a predetermined band among high delay classes in the QoS control unit in order to determine which QoS class in the output line the packets to be forwarded belong to, and forwards the packets belonging to this selected class from the buffer.

Herein, if all the classes are out of the predetermined band, the packets are not forwarded from the buffer, and the scheduler unit is notified of the classes being out of the band.

If out of the band, the control is effected so as not to decrement the number of pieces of request information of the request management unit of the scheduler unit.

Figure 65:
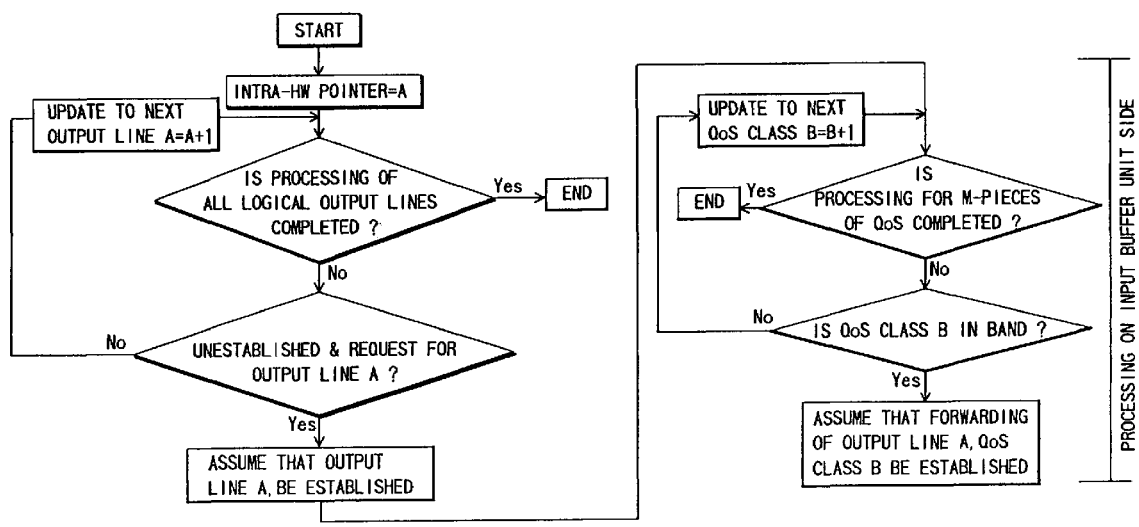
FIG. 65 is a processing flowchart in the embodiment 10.

FIG. 65 shows an operation flow based on the present QoS control method.

This operation flow covers processes from a start of the scheduling to a determination of the output line by the scheduler unit.

Embodiment 11

Next, an embodiment in which the schedulers perform the QoS control en bloc will be explained.

Figure 66:
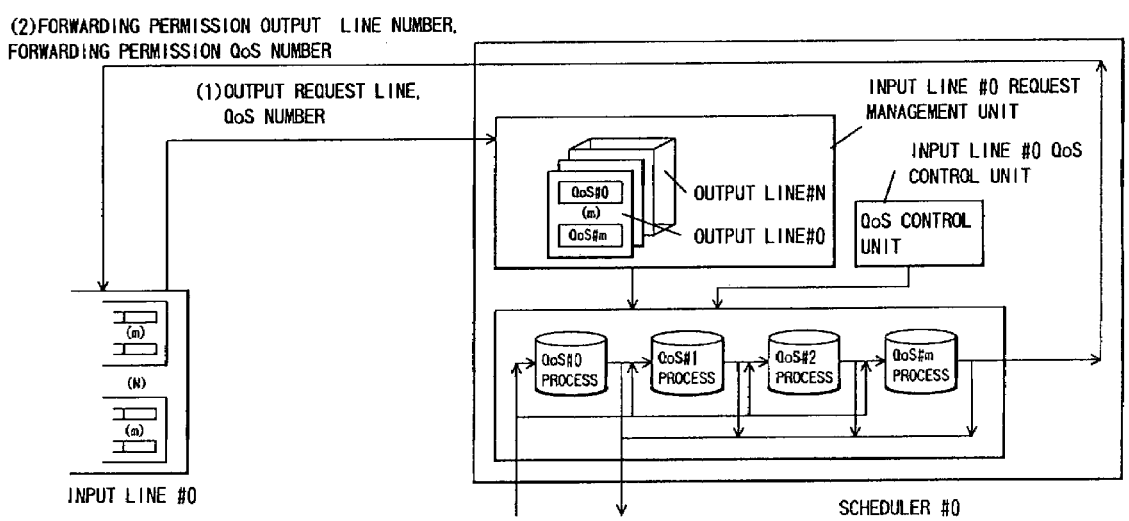
FIG. 66 is a functional block diagram in an embodiment 11.

FIG. 66 shows a relationship between the input buffer and the scheduler.

The input buffer notifies the scheduler of the forwarding request information of the arrived packet and of the QoS class, and the scheduler manages the arrived packet per logical output and per QoS class.

Then, the QoS control unit of the scheduler executes the band control in sequence from the higher-priority QoS class, and selects the QoS classes within the predetermined band. Then, the scheduler implements the scheduling based on the information thereof, and notifies the input buffer of the established output line number and QoS class. The input buffer forwards the packets from the buffer in accordance with the received information.

Figure 67:
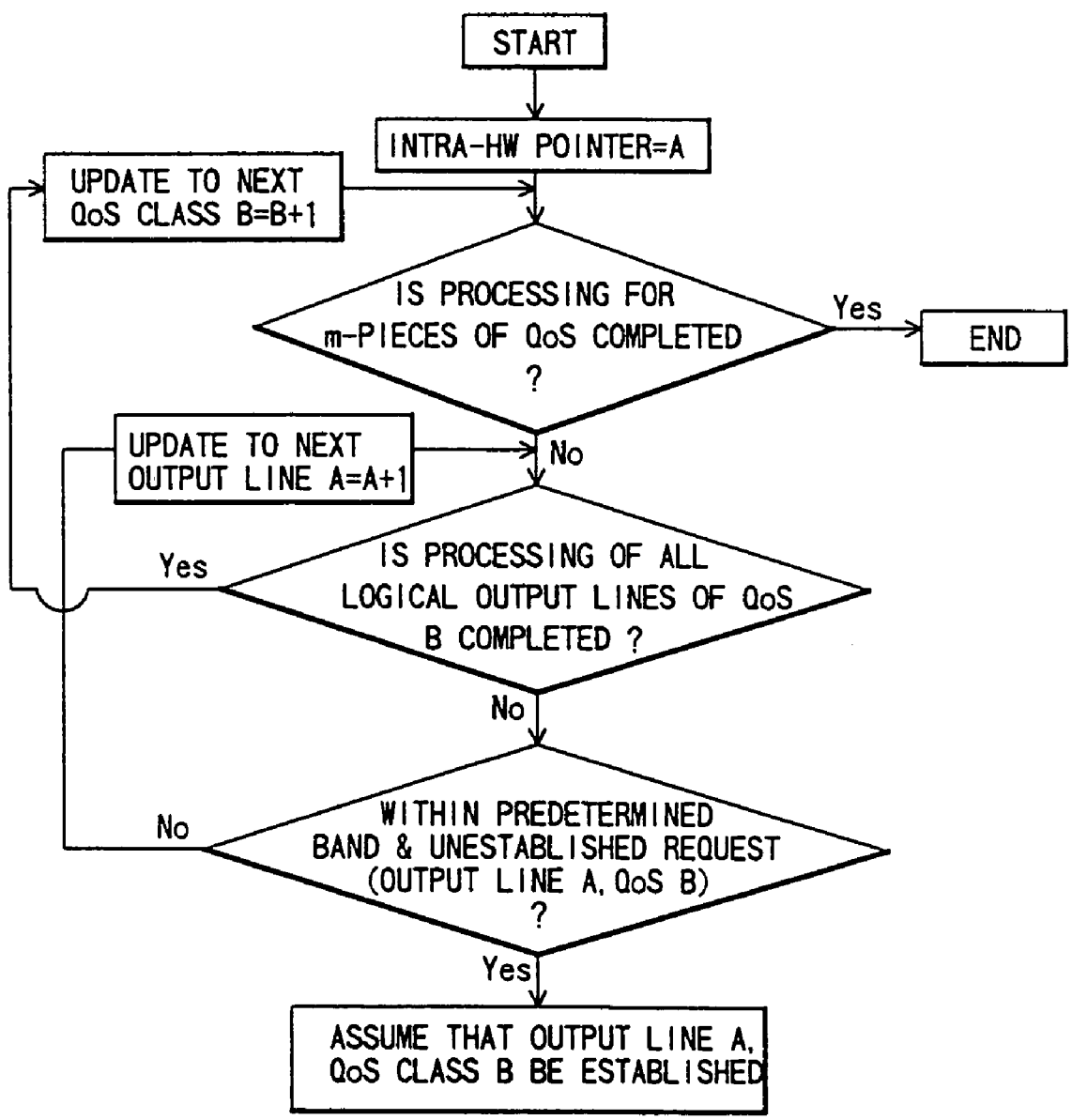
FIG. 67 is a processing flowchart in the embodiment 11.

FIG. 67 shows this operation flow.

Embodiment 12

In the embodiments 8~11, the band control unit is unable to forward the packets even when there is the forwarding request if it is out of the band. Therefore, if all the classes are out of band in the band control of all the QoS classes, the packets can not be forwarded at all.

This being the case, when the forwarding of all the QoS classes is not established, though out of the band, if there is the forwarding request for the preset QoS class, a forwarding right may be given to this class.

The right of the forwarding may be given to all the classes or to only a specified QoS class. Further, if there are a plurality of set classes, the scheduling may also be performed in sequence from the top priority class, or may be conducted based on priorities prescribed otherwise.

Figure 68:
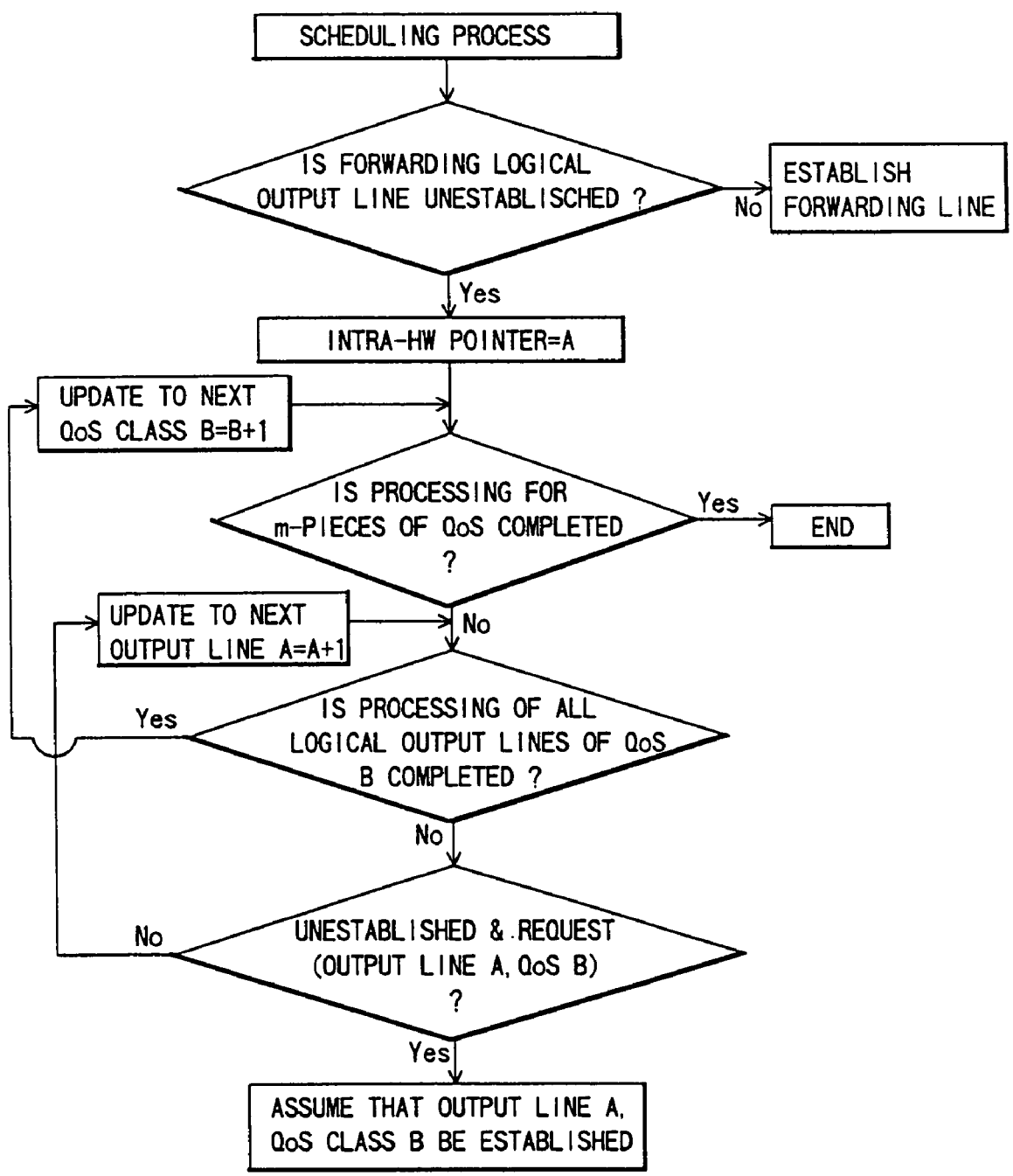
FIG. 68 is a processing flowchart in an embodiment 12.

FIG. 68 shows this operation flow.

Embodiment 13

Figure 69:
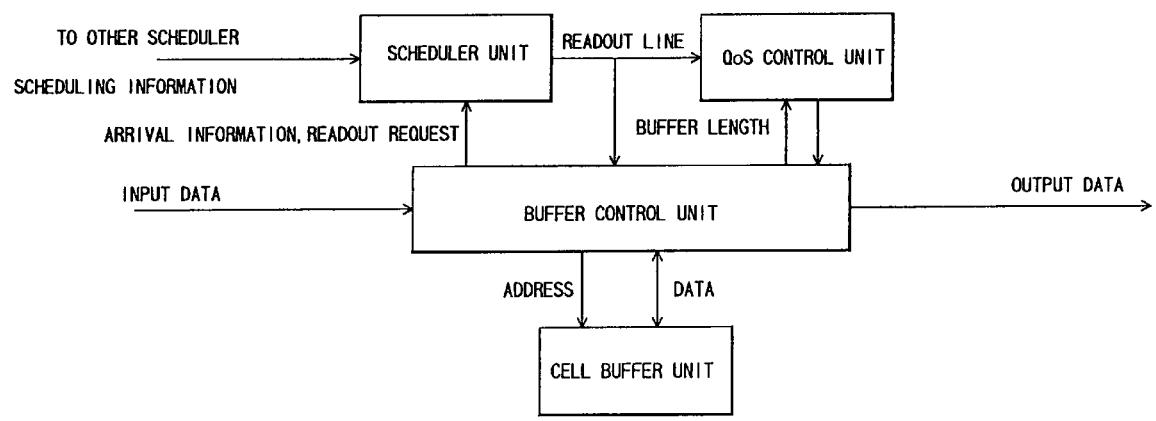
FIG. 69 is a diagram showing a configuration of an input buffer in an embodiment 13.
Figure 70:
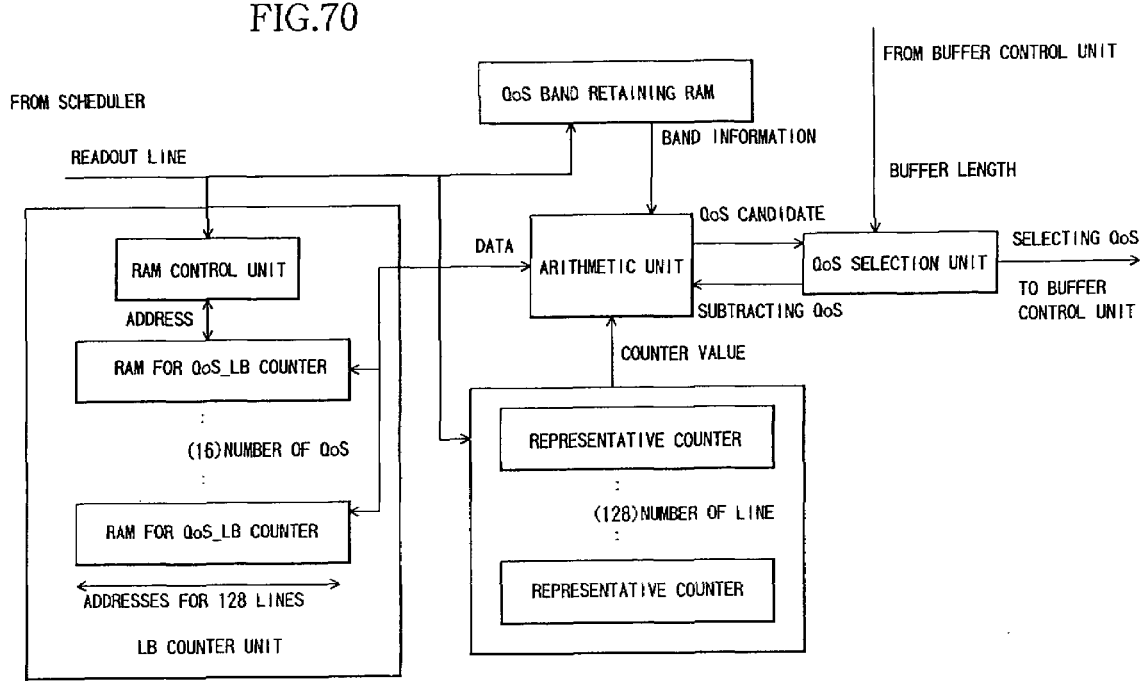
FIG. 70 is a functional block diagram (1) in the embodiment 13.

FIG. 69 shows a structure of the input buffer unit. FIG. 70 is a block diagram of the QoS control unit.

The QoS control unit includes a representative counter per output line, and a leaky bucket (LB) counter per output-line/Qos. Only the line selected by the scheduler is used for the LB counter, and the representative counter counts per line a time elapsed since the line has been selected last time. The LB counters, when controlled, implement batchwise the count-up processes of the elapsed periods of time, with the result that a smaller number of processes may suffice for the multi-line QoS control.

Figure 71:
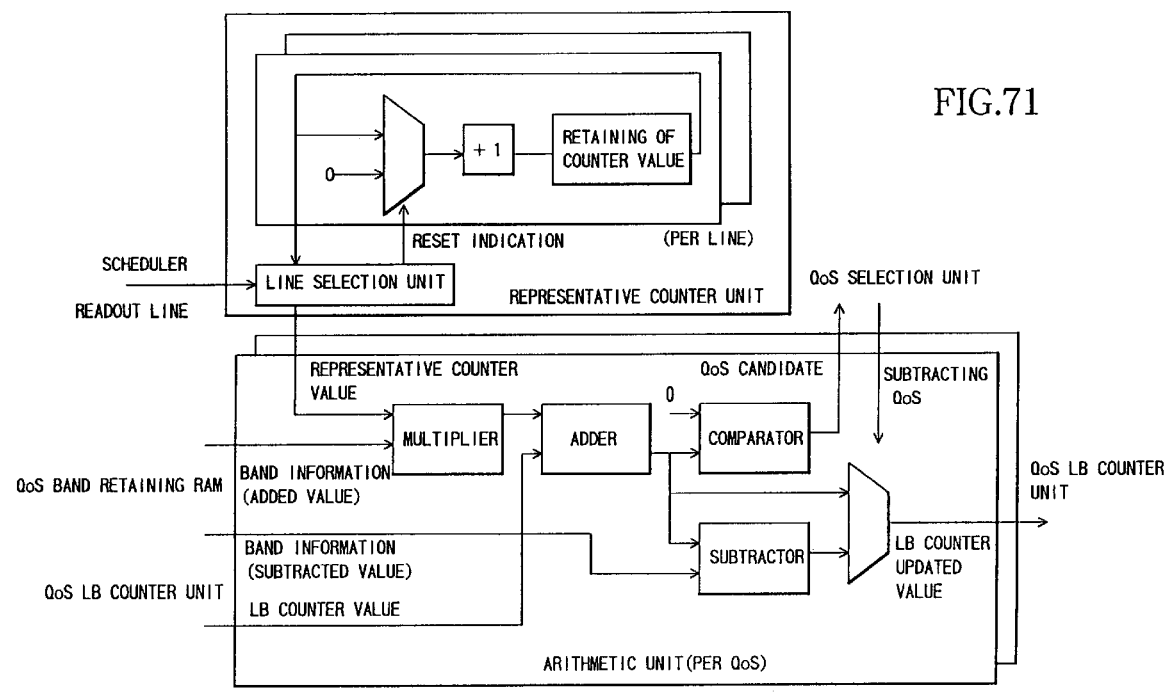
FIG. 71 is a functional block diagram (2) in the embodiment 13.

FIG. 71 shows an example of constructions of the representative counter unit and an arithmetic unit. The representative counter unit has a counter for holding the elapsed time per line, wherein all the counters count up one by one at an interval of the 1-packet time. The scheduler determines the readout line and notifies the representative counter unit of the determined line, at which time the representative counter picks up a representative counter value of the determined line and notifies the arithmetic unit of this picked-up value. Simultaneously, the representative counter of that line is reset to 1. The representative counter per line is thereby capable of measuring the elapsed time since the line has been selected last time.

The arithmetic unit is prepared per QoS. To start with, an added value among pieces of band data is multiplied by the representative counter value notified, and this multiplied value is added to an LB counter value, thus adding the elapsed time values en bloc. When this arithmetic result is 0 or more, the readout request is issued to a QoS selection unit as a readout candidate.

The QoS selection unit, based on the readout request given from the QoS arithmetic unit, determines a readout QoS, and notifies the arithmetic unit of, as a subtraction target, the determined readout QoS, or QoS with the buffer being free irrespective of the readout request being made. The QoS arithmetic unit given an indication of the subtraction subtracts a value of the LB counter, and notifies an LB counter unit of this subtracted result as an LB counter update value.

Figure 72:
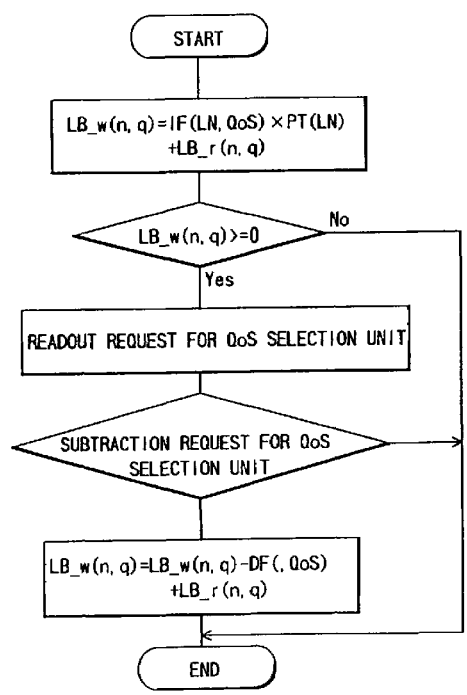
FIG. 72 is a processing flowchart in the embodiment 13.

The LB counter processes for the elapsed time can be thereby executed batchwise in the 1-packet time. FIG. 72 shows an algorithm of this arithmetic unit. Note that the subtraction process is executed upon QoS with the readout request and the buffer being free in this example, however, the subtraction may not be implemented in terms of a system policy, or a process of stopping the counter and so forth may also be executed.

Herein, if the elapsed time counter is, when its value exceeds a MAX value, reset to 0, there might be a possibility of being judged to be out of band because of the added value becoming small in spite of a sufficient elapse of time. The value of the elapsed time counter exceeds the MAX value, which implies an assumption of such a case that there is not the input packet in the meantime, and hence, though a delay of the readout judgement may be allowed, when trying to prevent this delay, it is feasible to cope with this by stopping the counter up to the MAX value.

Figure 73:
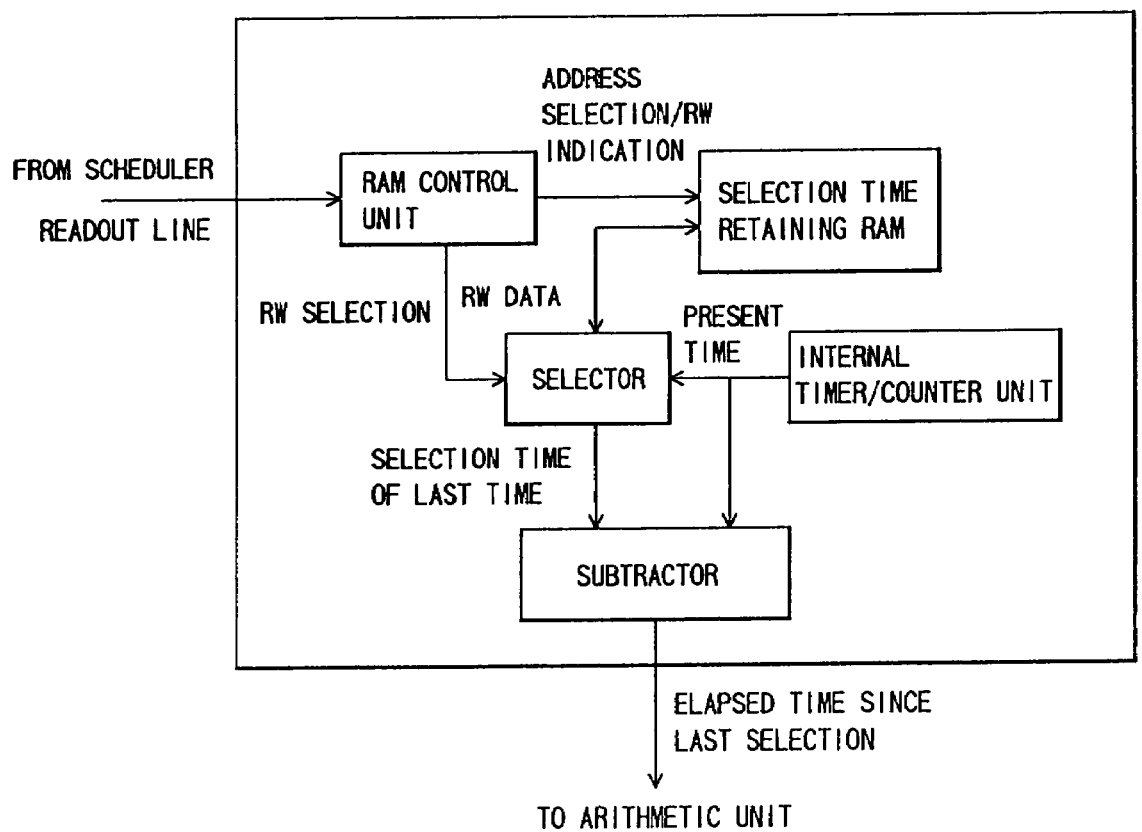
FIG. 73 is a functional block diagram in the embodiment 13.

Next, FIG. 73 shows another example of the construction of the representative counter. Herein, the elapsed time is measured by holding the time selected last time without using the counter. When the scheduler notifies the readout line, the previously-selected time of the corresponding line is read from a RAM. Then, an elapsed time since the previous selection is obtained by taking a difference between the readout value and a present time indicated by an internal timer/counter.

Simultaneously, a value of the corresponding RAM is rewritten with a present time. The function equal to that of the representative counter can be thereby attained. The RAM is accessed R/W times in the 1-packet time, which can be actualized. Hence, the system architecture can be configured by using not the counters having a large hardware size but the RAMs, which enables a hardware quantity to be reduced.

Herein, if the elapsed time is over a cycle of the internal/timer counter, there might be a possibility of being judged to be out of band because of the added value becoming small in spite of a sufficient elapse of time. The elapsed time exceeds the cycle of the internal timer/counter, which implies an assumption of such a case that there is not the input packet in the meantime, and hence a delay of the readout judgement may be allowed. When trying to prevent this delay, however, it is feasible to cope with this by adding an effective flag bit to the RAM retaining the elapsed time and periodically monitoring the effective flag bit.

FIG. 74 shows an example of a periodic monitoring method. A line indication counter for the periodic monitoring is prepared and, if a valid flag is valid for the elapsed time corresponding to this line indication counter, calculates a difference (an elapsed time) from the present time. Then, if this difference exceeds a threshold value for a judgement, the valid flag is rewritten into invalidity. Subsequently, when calculating the elapsed time of the readout line, the elapsed time is, if invalid, notified as a MAX value of the internal timer/counter. This makes it possible to prevent the elapsed time from being decreased. An R/W-fold increase in the accessing to the RAM for the periodic monitoring may suffice.

Further, another method is that one cycle of the internal timer is segmented into some number of regions, and an the valid flag of the selection time belonging to a clearing target region in accordance with a region belonging to the present time is cleared.

FIG. 74(b) shows an example of a valid time checking method when segmented into four regions. For example, if the present time falls into a region A, the valid flag with respect to a region B is cleared. The number of segments may be enough to be over a time for which to finish checking all the lines within one region. If the number of segments is, e.g., 4, it may be enough to check only high-order 2 bits, thereby simplifying the circuit.

Further, in a case where there is a comparatively long elapsed time with an absence of the input packet for a considerable period of time, the value of the LB counter after adding the value becomes too large, resulting in such a possibility that it might continue to be the readout target. By contrast, an upper limit value is set in the LB counter, and, if a result of calculation exceeds the upper limit value, the above inconvenience can be avoided by executing a process of setting the excess down to the upper limit value.

Embodiment 14

Figure 30:
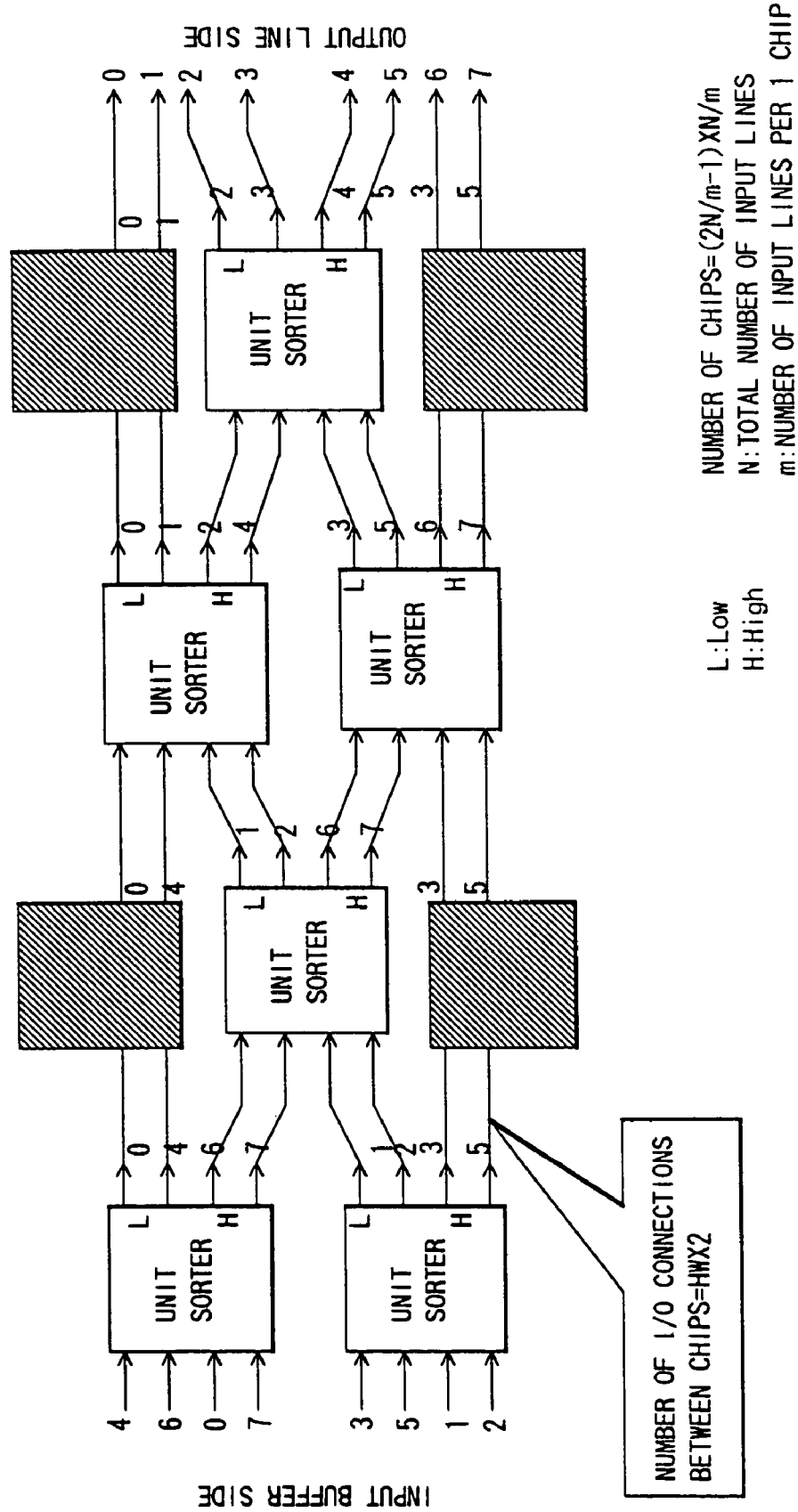
FIG. 30 is a diagram showing an example of scheduling in an embodiment 14.

In an embodiment 14, as illustrated in FIG. 30, the cells inputted from m-lengths of input lines per chip or package, are sorted out in a descent or ascent sequence based on output line information imparted to cell header fields, and N/m-pieces of unit sorters capable of outputting to the m-pieces of output lines are arranged and connected to the input buffers on the N-route.

M-lines of highways of the unit sorter concerned are divided by 2 and, as shown in FIG. 30, connected to the unit sorters at the next stage. In that case, excluding a dummy unit sorter for adjusting a line length delay, this stage has the unit sorters of which the number is less by one than at the first stage. Thus, the first and second stages are combined into one set, and N/m sets of sorters are connected, thereby configuring an N-input/N-output sorter network on the whole.

A total number of chips is, excluding the dummy unit sorter for adjusting the line length delay, given by (2N/m−1)×N/m.

Further, the dummy unit sorter for adjusting the line length delay may not be provided, if the line length delay can be adjusted by other circuit or absorbed by the unit sorter.

Embodiment 15

Figure 31:
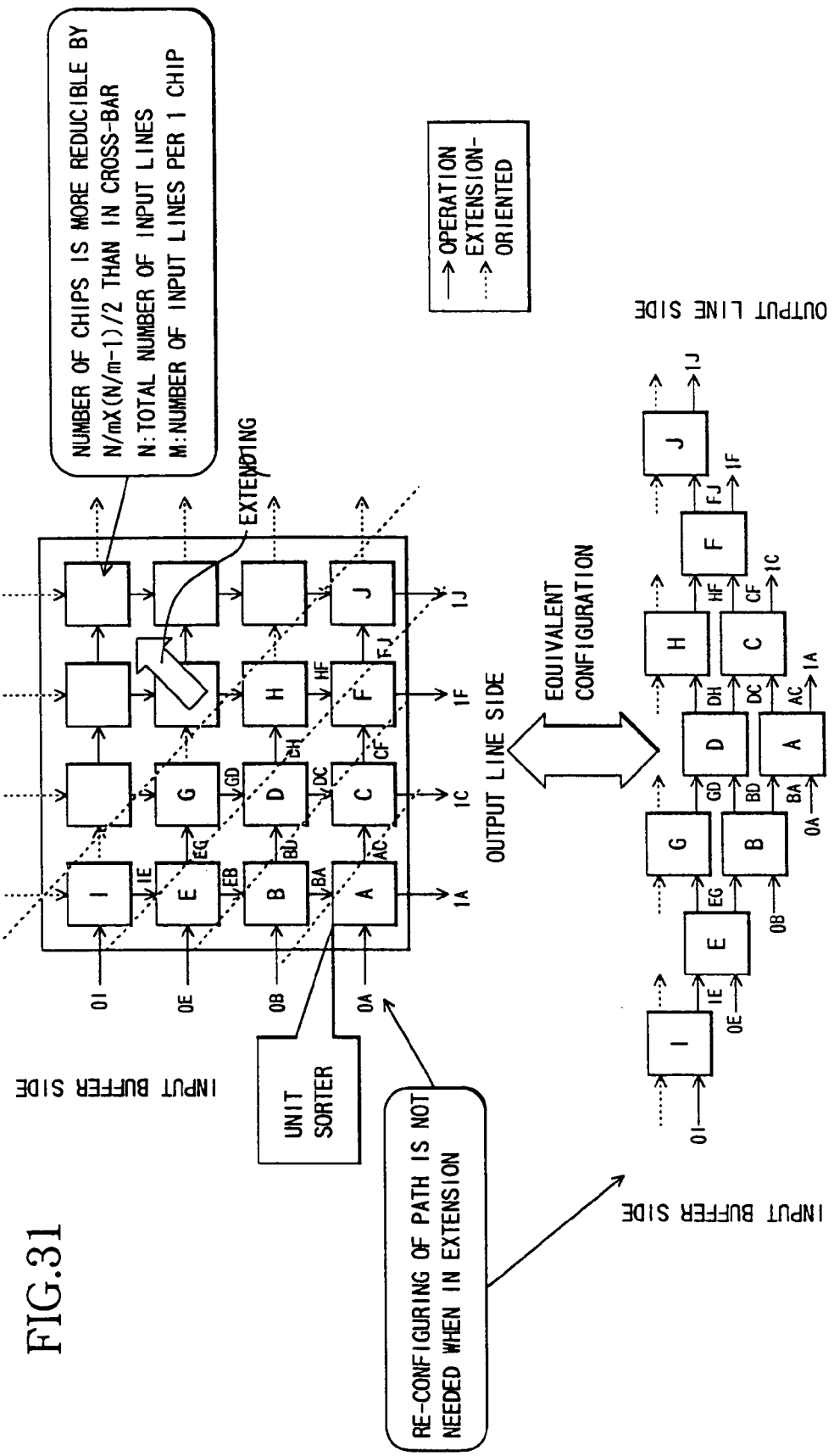
FIG. 31 is a diagram showing an example of scheduling in an embodiment 15.

In an embodiment 15, as shown in FIG. 31, the cells inputted from m-lines of input lines per chip or package, are sorted out in a descent or ascent sequence based on output line information imparted to cell header fields, and N/m-pieces of unit sorters capable of outputting to the m-pieces of output lines are arranged and connected to the input buffers on the N-route. The m-lines of highways of the unit sorter concerned are divided by 2, with the half of the highways being allocated for the operation and the remaining half of the highways being allocated for extensions, and are connected as shown in FIG. 31. Upper and lower diagrams in FIG. 31 show equivalent constructions.

Further, in the case of using only one unit sorter, a unit sorter A is only used. When extended, unit sorters B, C are connected to the highways for extensions, and sequentially unit sorters E, D, F and unit sorters I, G, H, J are connected in this sequence, thus expanding a scale of topology of the sorter network.

Embodiment 16

Figure 32:
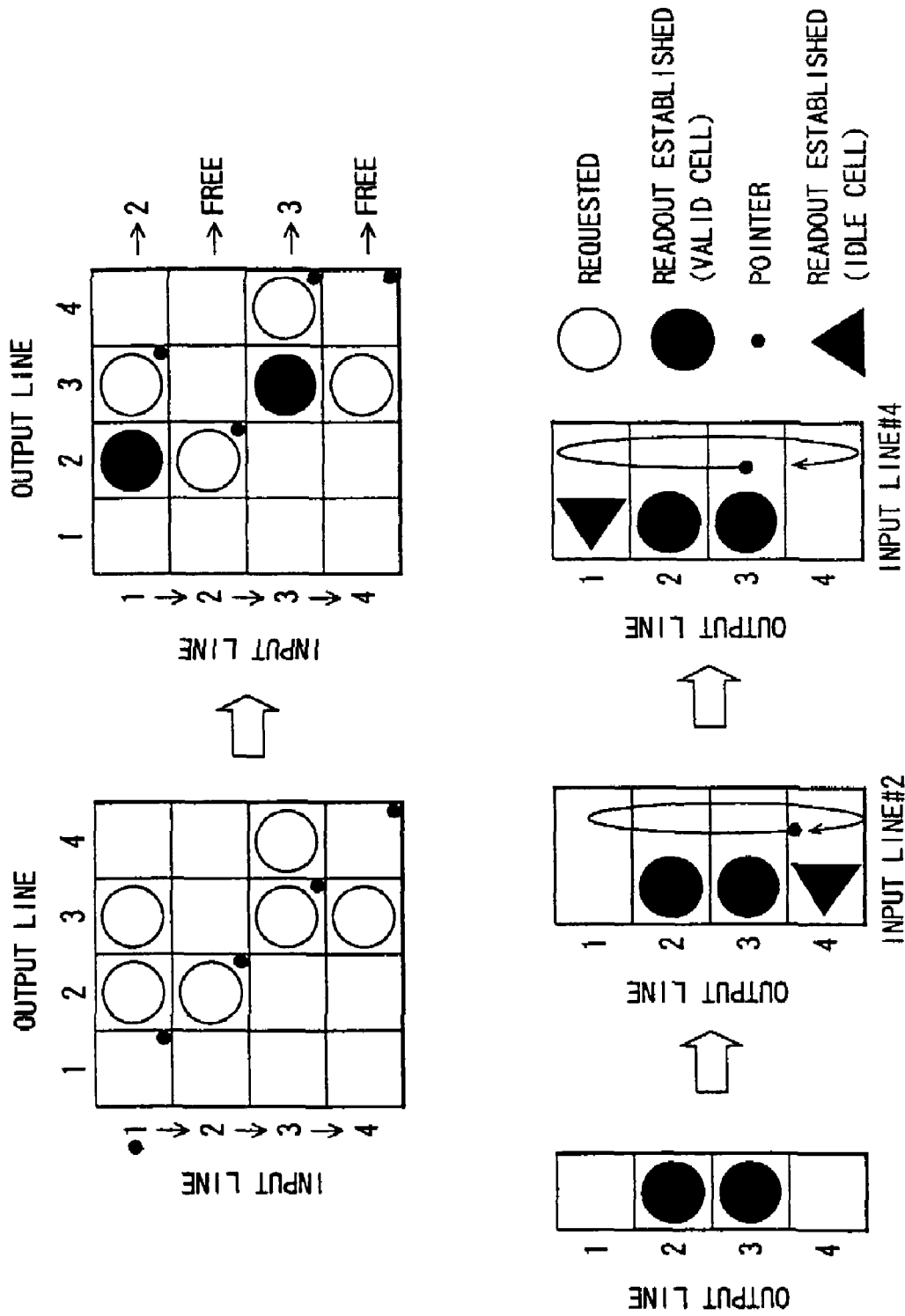
FIG. 32 is a diagram showing an example of scheduling in an embodiment 16.
Figure 75:
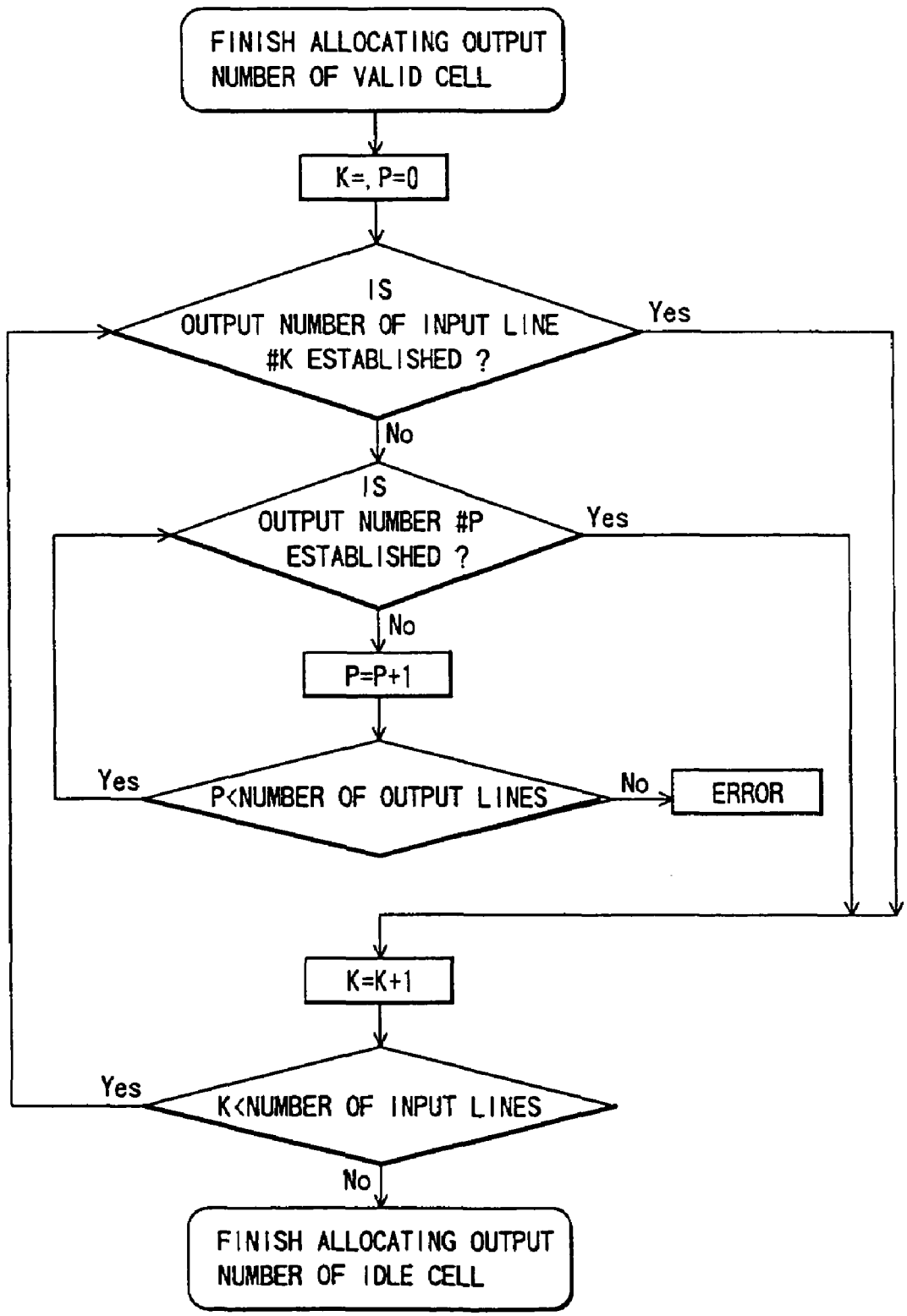
FIG. 75 is a processing flowchart in an embodiment 16.

In an embodiment 16, as shown in flowcharts in FIGS. 32 and 75, after an output line number of the valid cell transferred via each input line has been determined by the scheduling described above, with respect to the respective input lines with the output line numbers undetermined, the output line numbers are allocated to idle cells by using the numbers in sequence from the lowest number excluding the valid cell established output line number, and are transferred to the sorter network together with the valid cells to which the output line numbers were previously allocated.

In that case, the allocation of the output line numbers to the idle cells involves considering neither the contention control nor the fairness between the lines unlike the allocation of the numbers to the valid cells, and hence the output line number can be determined while one round robin pointer makes one loop from the lowest number to the largest number.

Further, the output line numbers may also be allocated to the valid cells in such a way that the scheduling processing unit sequentially performs the scheduling for N-patterns from the priority pattern showing the priority pointer, and a start number of this priority pattern is updated at the next scheduling cycle.

Embodiment 17

Figure 76:
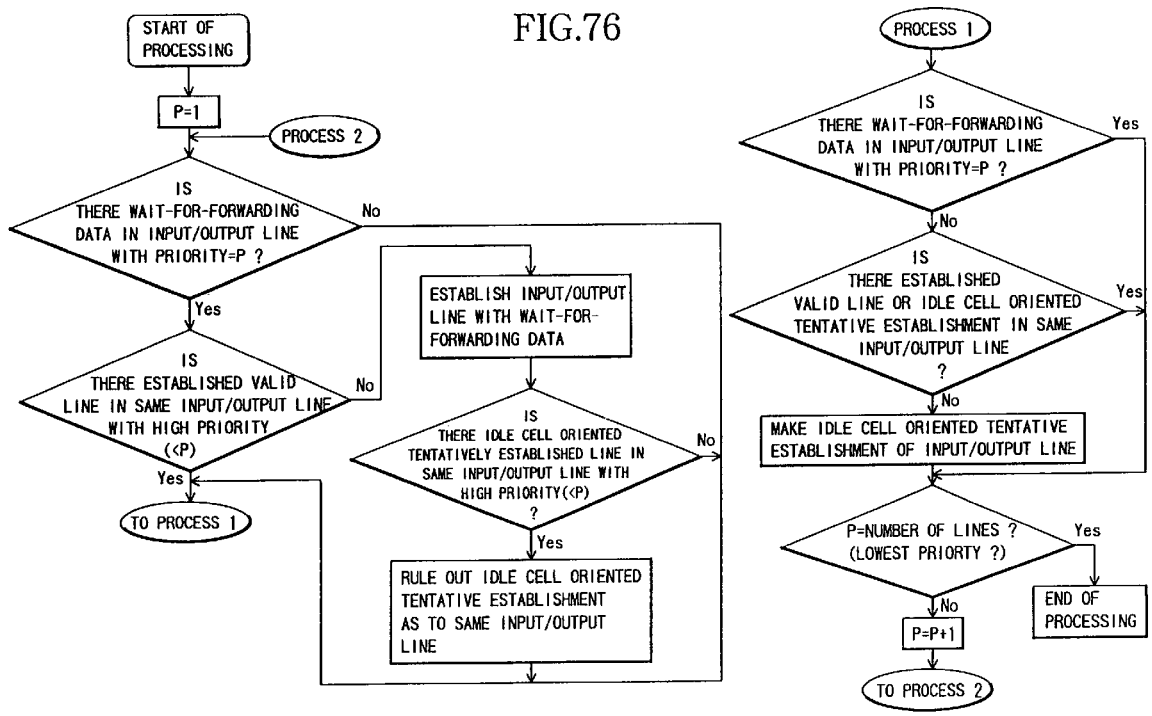
FIG. 76 is a processing flowchart in an embodiment 17.

In an embodiment 17, as shown in the flowcharts in FIGS. 33 and 76, the priorities are allocated beforehand to all the input and output lines so that the priority for the same input line or the same output line are different, and, based on those priorities, the scheduling for determining the output line numbers for the respective input lines is sequentially carried out. Then, when scheduling for a priority 1 defined as the top priority, the input line with the data existing in the queue is established as a readout line for the valid cell. The input line with no data existing in the queue is also, however, established as a tentatively established line for the idle cell.

Next, when scheduling for a priority 2, when the data exists in the queue corresponding to the priority 2 and when the same input or output line has already been established for the valid cell, the valid cell with the priority 2 is not established. If the same input or output line is established for the idle cell, however, the valid cell with the priority 2 is established.

In that case, if the idle cell is tentatively established with respect to the priority 2 and the priority 1 of the same input or output line, the tentative establishment is ruled out.

Thereafter, if neither the valid cell nor the idle cell is established for the same input or output line with respect to what no data exists in the queue corresponding to the priority 2, it is assumed that the priority concerned be tentatively established.

The same processes are executed for all the priorities, and what has finally been established for the valid cell or what has tentatively been established for the idle cell, is to be finally established.

Embodiment 18

In an embodiment 18, as illustrated in FIG. 35, when necessary for phase synchronization at a cell level as in the case of an extension of the switch and an initial state of the system, the scheduler forwards sequentially to the respective input buffers such a synchronization cell pattern as to increment the output route number and the sequence number.

On this occasion, the cell sequence numbers from the input lines adjacent to each other are made coincident, and the output route numbers are shifted one by one. In the case of starting the phase synchronization from the switch A serving as a minimum unit of the unit switch, $_\Delta SN-_\Delta T$ is calculated as a phase difference between the cells arriving from the input lines #1 and #2. When $_\Delta SN-_\Delta T=0$, this is judged to be OK. When $_\Delta SN-_\Delta T=0$, the input buffer #2 is informed of the phase difference, and the input buffer #2 changes a cell forwarding phase on the basis of the phase difference received.

Note that the judging process as to $_\Delta SN-_\Delta T=0$, is repeated until $_\Delta SN-_\Delta T=0$ is established. When $_\Delta SN-_\Delta T=0$, the unit switch B disposed at an upper stage and the unit switch D disposed on the right side are notified of a completion of the phase adjustment.

The processes explained above are repeated until the synchronization of all the unit switches is taken. Note that if the unit switch making the phase adjustment is not in the closest proximity to the input buffer, the same process as that of the input buffer is executed upon the phase adjustment buffer provided between the unit switch disposed at the previous stage and the unit switch concerned.

FIG. 35 shows an operational example of the phase adjustment when the phase differences between the respective input lines are previously 3, 2 and 1. Further, the synchronization may start, if not extended, from the G-side where a phase delay is maximum.

Figure 34:
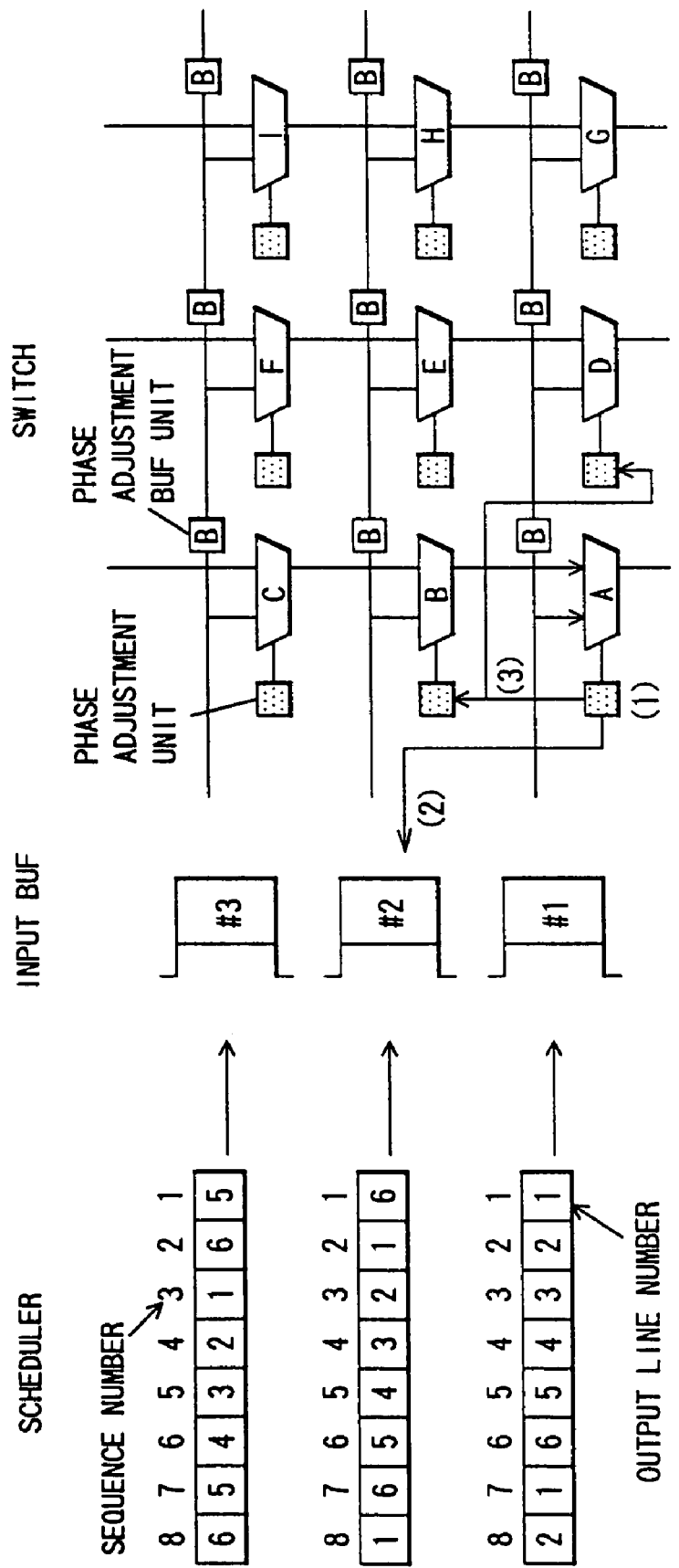
FIG. 34 is a diagram showing a construction of a switch in an embodiment 18.

It is to be noted that in FIG. 34 each lattice point corresponds to a 2-input/2-output minimum unit switch, however, this may be replaced with an N-input/N-output switch as a unit switch.

Embodiment 19

Figure 36:
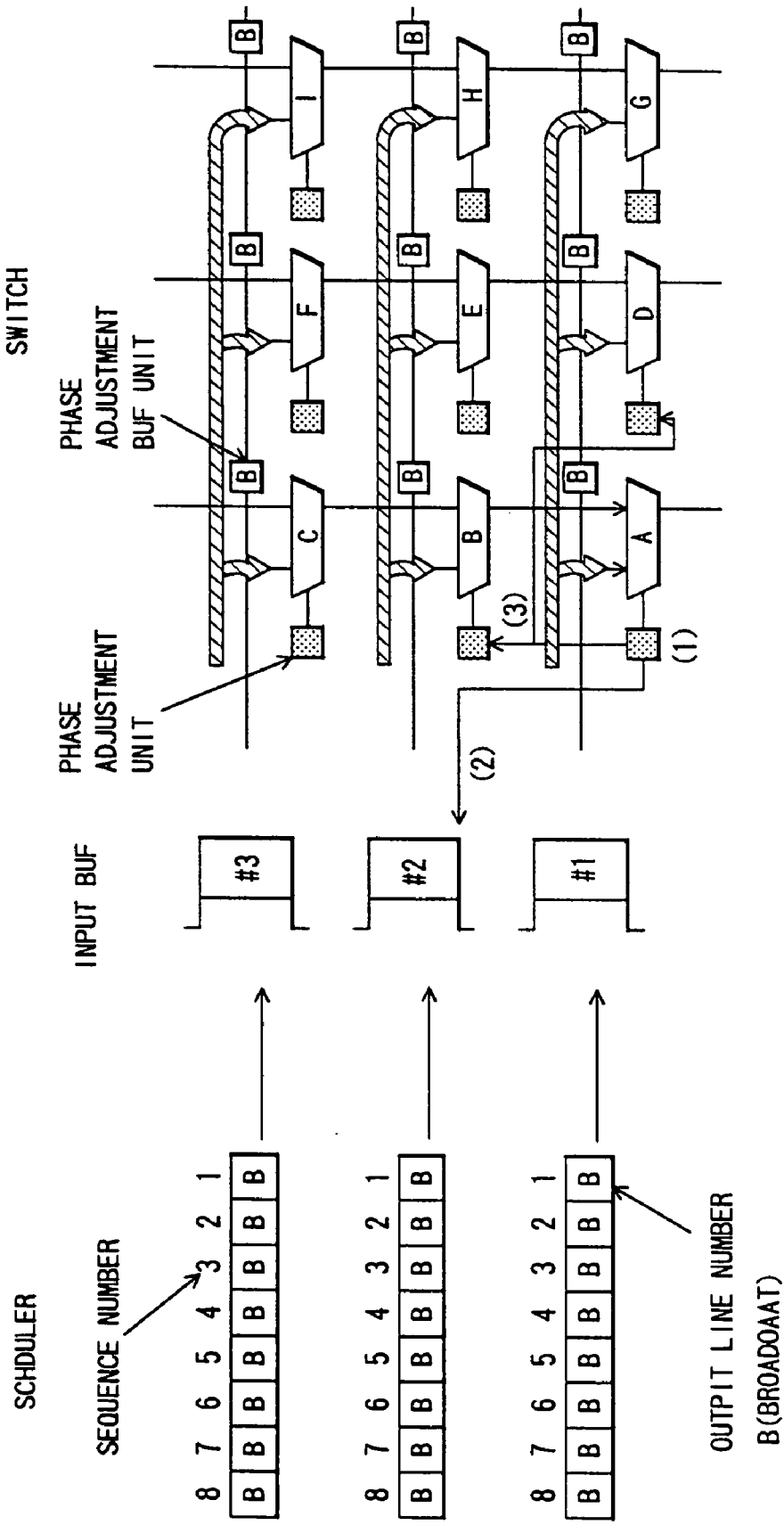
FIG. 36 is a diagram showing a construction of the switch in an embodiment 19.

In an embodiment 19, as shown in FIG. 36, when necessary for phase synchronization at a cell level as in the case of an extension of the switch and an initial state of the system, the scheduler imparts, to the respective input buffers, output route numbers (e.g., a maximum value of the output route number plus 1) which are not used for the normal cells, thereby giving an indication of being broadcast cells. Further, sequence numbers are given to the cells inputted from the respective schedulers. The sequence numbers given to the cells inserted at the same timing are made coincident in all the input lines, and the cells are forwarded with sequential increments being carried out.

The respective unit switches having received the broadcast cells transfer the broadcast cells to all the output routes. In the case of starting the phase synchronization from the switch A serving as a minimum unit of the unit switch, $\Delta SN$ is calculated as a phase difference between the cells arriving from the input lines #1 and #2. When $\Delta SN=0$, this is judged to be OK. When $\Delta SN \neq 0$, the input buffer #2 is informed of the phase difference, and the input buffer #2 changes a cell forwarding phase on the basis of the phase difference received.

Note that the judging process as to $\Delta SN=0$, is repeated until $\Delta SN=0$ is established. When $\Delta SN=0$, the unit switch B disposed at an upper stage and the unit switch D disposed on the right side are notified of a completion of the phase adjustment.

The processes explained above are repeated until the synchronization of all the unit switches is taken. Note that if the unit switch making the phase adjustment is not in the closest proximity to the input buffer, the same process as that of the input buffer is executed upon the phase adjustment buffer provided between the unit switch disposed at the previous stage and the unit switch concerned.

Further, the synchronization may start, if not extended, from the G-side where a phase delay is maximum.

It is to be noted that in FIG. 36 each lattice point corresponds to a 2-input/2-output minimum unit switch, however, this may be replaced with an N-input/N-output switch as a unit switch. Further, not the cross bar type but the sorter network may be applied to the configuration of the switch.

Embodiment 20

Figure 37:
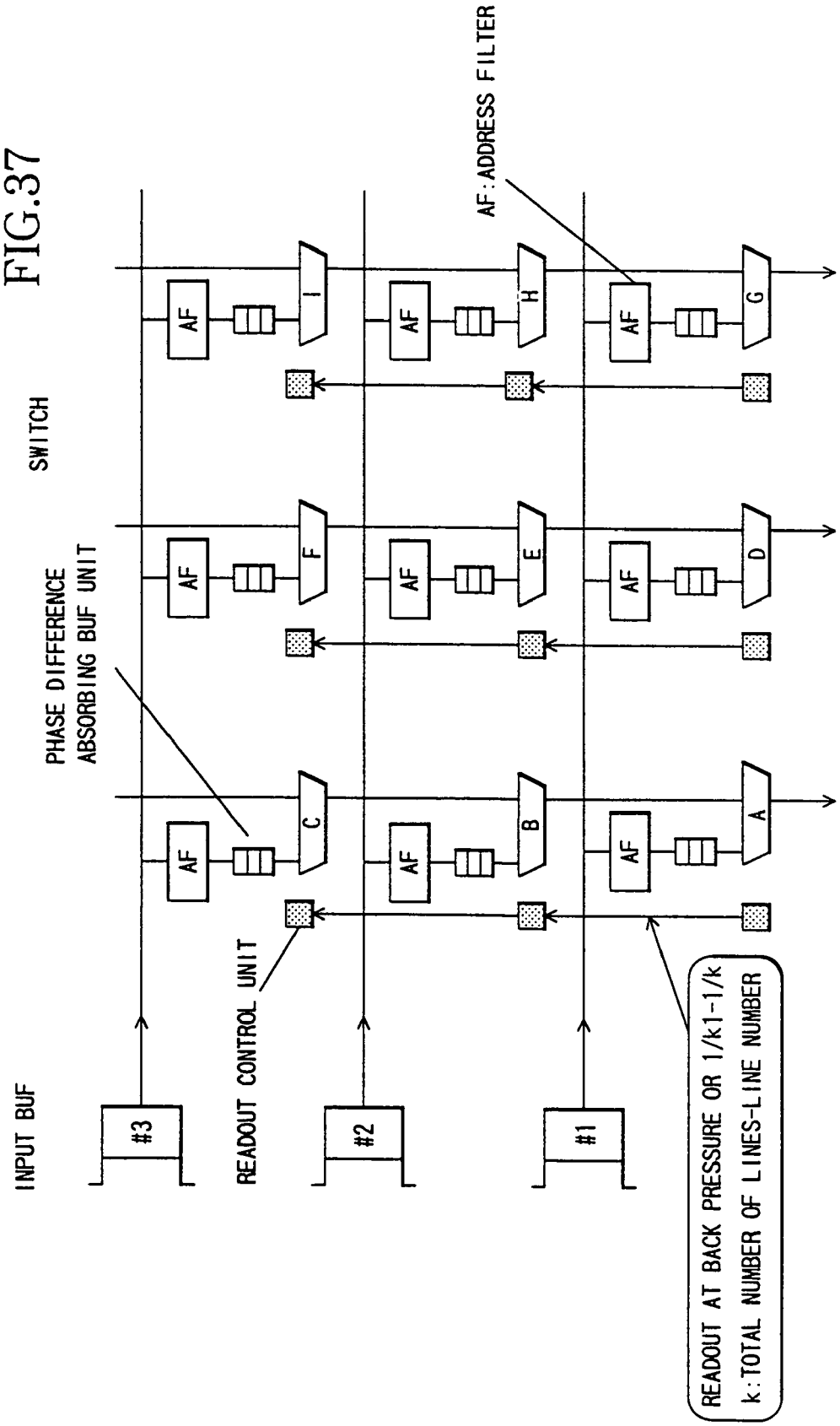
FIG. 37 is a diagram showing a construction of the switch in an embodiment 20.

In an embodiment 20, as shown in FIG. 37, the buffer for the phase synchronization is held at each lattice point, thereby absorbing a phase difference at the cell level.

Incidentally, a priority control method in the case of reading from the buffers of the posterior unit switch and of the anterior unit switch, may take a back pressure type in which reading from the buffer of the anterior unit switch stops simply when the cells exist in the posterior buffer, or may involve reading at a ratio of 1/k : 1−1/k (where k is total number of lines−line number) in consideration of the number of the unit switches connected o the anterior and posterior stages.

Although the embodiments of this invention have been described in detail above, those skilled in the art will readily appreciate that many modifications are possible in the preferred embodiments without departing from the novel teachings and advantages of this invention. Accordingly, all such modifications are intended to be included within the scope of this invention as defined by the following claims.

What is claimed is:

1. A scheduling control system for a switch having a Virtual Output Queue comprising:
    a request information management unit managing the number of scheduling requests and holding forwarding request information of each input line as a scheduling target with respect to a desired output line;
    an inter-highway pointer control unit for indicating a start-of-scheduling input line;
    an intra-highway pointer control unit for indicating a start-of-retrieval output line in the forwarding request information corresponding to each input line; and
    a scheduling processing unit for starting the retrieval of the output lines from the output line indicated by said intra-highway pointer control unit according to the forwarding request information, selecting the output line unselected by other input lines, performing the scheduling for all the input lines in sequence starting from the input line indicated by said inter-highway pointer control unit, and updating each start-of-retrieval output line indicated by said intra-highway pointer control unit at a next scheduling cycle, whereby said scheduling processing unit executes arbitration such that a scheduling result does not compete between lines.

2. A scheduling control system according to claim 1, wherein said scheduling processing unit updates an inter-highway pointer to a next adjacent line per scheduling cycle, and updates an intra-highway pointer to a next line adjacent to the line with forwarding determined.

3. A scheduling control system according to claim 1, wherein said scheduling processing unit updates an inter-highway pointer to a line next to the line with the forwarding established at first within the scheduling cycle, and updates in intra-highway pointer to a next line adjacent to the line with the forwarding determined.

4. A scheduling control system according to claims 1, wherein said scheduling processing unit, if the request information exists in the line indicated by the intra-highway pointer and this line is used by other lines, does not update the intra-highway pointer.

5. A scheduling control system according to claim 1, wherein said scheduling processing unit includes:
    means for dividing, when selecting the forwarding request information corresponding to each line as a scheduling target, the forwarding request information into two pieces of information before and after the intra-highway pointer, and obtaining the lines having lowest numbers based on a low number selection logic from those pieces of information; and
    means for obtaining a final forwarding line number from the obtained two lower number lines with a priority given a result after the intra-highway pointer.

6. A scheduling control system according to claim 1, wherein a plurality of said scheduling processing units are provided, and said scheduling control system further comprises pipeline processing means for each independently executing a pipeline process.

7. A scheduling control system for a switch for a switch having a Virtual Output Queue comprising:

a request information management unit managing the number of scheduling requests and holding forwarding request information of each input line as a scheduling target with respect to a desired output line;

an inter-highway pointer control unit for indicating a start-of-scheduling output line;

an intra-highway pointer control unit for indicating a start-of-retrieval input line in the forwarding request information corresponding to each input line; and a scheduling processing unit for starting the retrieval of the input lines from the input line indicated by said intra-highway pointer control unit according to the forwarding request information, selecting the input line that is not ensured by other output lines, performing the scheduling for all the output lines in sequence starting from the output line indicated by said inter-highway pointer control unit, and updating each start-of-retrieval input line indicated by said intra-highway pointer control unit at a next scheduling cycle, whereby said schedule processing unit executes arbitration such that a scheduling result does not compete between lines.

8. A scheduling control system according to claim 7, wherein said scheduling processing unit includes:

means for dividing, when selecting the forwarding request information corresponding to each line as a scheduling target, the forwarding request information into two pieces of information before and after the intra-highway pointer, and obtaining the lines having lowest numbers based on a low number selection logic from those pieces of information; and means for obtaining a final forwarding line number from the obtained two lower number lines with a priority given to a result after the intra-highway pointer.

9. A scheduling control system according to claim 7, wherein a plurality of said scheduling processing units are provided, and said scheduling control system further comprises pipeline processing means for each independently executing a pipeline process.

10. A scheduling control system for a switch having a Virtual Output Queue comprising:

a request information management unit managing the number of scheduling requests and holding forwarding request information of each input line as a scheduling target with respect to a desired output line;

an inter-highway pointer control unit for holding an inter-highway pointer for indicating a start-of-scheduling input line;

an intra-highway pointer control unit for holding an intra-highway pointer for indicating a start-of-retrieval output in the forwarding request information corresponding to each input line;

a request management control unit for holding forwarding request information to a desired output line; and a scheduling processing unit for starting the retrieval of the output lines from the output line indicated by said intra-highway pointer control unit based plural pieces of the forwarding request information, and selecting the output line unselected by other input lines, and after finishing the scheduling, updating the inter-highway pointer to an adjacent line by alternately executing between a process of updating to an adjacent line in a forward direction per scheduling cycle, and a process of updating to an adjacent line in a reverse direction, whereby said scheduling processing unit executes arbitration such that a scheduling result does not compete between lines.

11. A scheduling control system for a switch having a Virtual Output Queue comprising:

a request information management unit managing the number of scheduling requests and holding forwarding request information on each input line as a scheduling target with respect to a desired output line;

an inter-highway pointer control unit for holding an inter-highway pointer for indicating a start-of-scheduling input line;

an intra-highway pointer control unit for holding an intra-highway pointer for indicating a start-of-retrieval output line in the forwarding request information corresponding to each input line;

a request management control unit for holding forwarding request information to a desired output line; and a plurality of scheduling processing units for starting the retrieval of the output lines from the output line indicated by said intra-highway pointer control unit from plural pieces of the forwarding request information, and selecting the output line unselected by other input lines, said scheduling processing unit executing arbitration such that a scheduling result does not compete between lines, and wherein said plurality of scheduling processing units further include a plurality of pipeline processing means having inter-highway pointers with different start-of-scheduling line numbers and each independently executing a pipeline process, and said intra-highway pointer control unit is independently controlled per said pipeline processing means.

12. A scheduling control system for a switch having a Virtual Output Queue comprising:

a request information management unit managing the number of scheduling requests and holding forwarding request information on each input line as a scheduling target with respect to a desired output line;

an inter-highway pointer control unit for holding an inter-highway pointer for indicating a start-of-scheduling input line;

an intra-highway pointer control unit for holding an intra-highway pointer for indicating a start-of-retrieval output line in forwarding request information corresponding to each input line;

a request management control unit for holding forwarding request information to a desired output line; and a scheduling processing unit for starting the retrieval of the output lines from the output line indicated by said intra-highway pointer control unit from plural pieces of the forwarding request information, and selecting the output line unselected by other input lines, whereby said scheduling processing unit executes arbitration such that a scheduling result does not compete between lines, and wherein said scheduling processing unit further includes a load observing unit for counting the number of packets arrived within a fixed cycle per logical forwarding request information of each input line, and performs she scheduling of a next cycle in accordance with the number of packets counted by said load observing unit.

13. A scheduling control system according to claim 12, wherein said scheduling processing unit restricts the number of forwarding permission packets to each output line within the fixed cycle, to the number of arrived packets to each piece of logical forwarding request information at the previous cycle.

14. A scheduling control system according to claim 12, wherein said scheduling processing unit determines a rate for attaining a top priority output line in the scheduling within the fixed cycle in accordance with the number of arrived packets at the previous cycle.

15. A scheduling control system according to claim 14, wherein said scheduling processing unit holds a top priority forwarding pointer, other than the intra-highway pointer, for determining the line for forwarding with a top priority in accordance with the number of arrived packets at the previous cycle, determines the output line in accordance with a rate of the number of arrived packets to each piece of the forwarding request information in accordance with the top priority forwarding pointer with respect to the number of all the arrived packets arrived at the input line at the previous cycle, and executes the scheduling with respect to those excluding the number of all the arrived packets in accordance with the normal intra-highway pointer.

16. A scheduling control system according to claim 12, wherein said scheduling processing unit executes, if the packets, of which the number is the same as the number of arrived packets at the previous cycle, are not forwarded within a present cycle, a process of carrying over a remaining number of arrived packets to the number of arrived packets at a next cycle.

17. A scheduling control system according to claim 12, wherein said scheduling processing unit determines a rate for attaining a top priority output line in the scheduling within a fixed cycle in accordance with a forwarding request information length at the previous cycle.

18. A scheduling control system according to claims 12, wherein there are constructed extension units each including said scheduling processing unit per input line, two pieces of I/O ports, a selector unit for switching over an external I/O and an internal ring-connection, and a delay unit capable of changing a forwarding delay quantity to an extension output, and said extension units are ring-connected.

19. A scheduling control system for a switch having a Virtual Output Queue comprising:
   means for notifying a scheduling processing unit of a quality of service (QoS) class together with forwarding request information;
   a scheduling processing unit for executing a scheduling process based on the forwarding request information on a first priority class of each line in a first scheduling, and for executing, with an output line being unestablished in the first scheduling, the scheduling based on the request information on a second priority class, whereby said scheduling processing unit executes arbitration such that a scheduling result does not compete between lines,
   wherein said scheduling processing unit includes:
   a scheduler for managing the number of scheduling requests and performing the scheduling from a higher priority class among two or more classes; and
   a buffer for executing hand control of the output line determined by said scheduler and intra-group band control.

20. A scheduling control system according to claim 19, wherein said scheduling processing unit further includes notifying means for notifying said buffer of a result of scheduling after the scheduling with respect to the first priority class and a buffer band control unit for controlling the band of QoS class within the line determined by said scheduler and performing delay priority control,
   said buffer, if within a predetermined band of the QoS class, accepts a result given from said scheduler and forwards data accumulated in said buffer, and, if out of the band, makes the forwarding request information thereof invalid and notifies said scheduler of this purport, and
   said scheduling processing unit thus performs a second scheduling.

21. A scheduling control system according to claims 20, wherein said scheduling processing unit gives a forwarding right to the forwarding request in an arbitrary off-band QoS class if unable to obtain the forwarding right in any QoS classes under the band control.

22. A scheduling control system according to claim 19, wherein said scheduling processing unit gives a forwarding right to the forwarding request in an arbitrary off-band QoS class if unable to obtain the forwarding right in any QoS classes under the band control.

23. A switch having a Virtual Output Queue comprising:
   means for notifying a scheduling processing unit of QoS class together with forwarding request information;
   a scheduling processing unit having a scheduler for executing scheduling in order to determine an output line based on the forwarding request information, whereby said scheduling processing unit executes arbitration such that a scheduling result does not compete between lines;
   an input buffer for controlling a band of the output line determined by said scheduler; and
   a band control unit for executing delay and band control of each QoS class in the output line having a forwarding right determined in said scheduling processing unit, reading packet-formatted data from said buffer if within a predetermined band, and, if out of the predetermined band, notifying said scheduler of a purport that the forwarding request information is invalid without outputting the packet-formatted data from said buffer.

24. A packet device with a Virtual Output Queue comprising:
   means for notifying a scheduling processing unit of a QoS class together with forwarding request information;
   a scheduling processing unit for executing a scheduling process based on the forwarding request information on a first priority class of each input line in a first scheduling, and for executing, with an output line being unestablished in the first scheduling, the scheduling based on the request information on a second priority class, whereby said scheduling processing unit executes arbitration such that a scheduling result does not compete between lines,
   wherein said scheduling processing unit includes: a scheduler for executing scheduling in order to determine an output line based on the forwarding request information and performing the scheduling from a higher priority class among two or more classes; and
   a buffer for controlling a band of the output line determined by said scheduler and intra-group band control,
   wherein said scheduling processing unit further includes notifying means for notifying said buffer of a result of scheduling after the scheduling with respect to the first priority class and a buffer band control unit for controlling the band of the QoS class within the line determined by said scheduler and performing delay priority control,
   said buffer, if within a predetermined band of the QoS class, accepts a result given from said scheduler and forwards data accumulated in said buffer, and, if out of the band, makes the forwarding request information thereof invalid notifies said scheduler of this purport, and said scheduling processing unit thus performs a second scheduling.

25. A band control system for executing band control for a switch having a Virtual Output Queue, comprising:

means for notifying a scheduling processing unit of a QoS class together with forwarding request information;

a scheduling processing unit having a scheduler for executing scheduling in order to determine an output line based on the forwarding request information, whereby said scheduling processing unit executes arbitration such that a scheduling result does not compete between lines;

a buffer, divided in logical output routes, for controlling a band of the output line determined by said scheduler;

an individual counter, provided per line or per QoS class, for counting leaky buckets with respect to the output line selected by said scheduler; and a representative counter, provided per line, including an internal timer and for counting an elapsed time since the output line has been selected last time, wherein said each representative counter holds a time when the selection of the last time is made on the basis of said internal timer, and obtains the elapsed time by making a comparison with a present time when the selection is made next time.

26. A scheduling control system for a switch having a Virtual Output Queue comprising:

a request information management unit managing the number of scheduling requests and holding forwarding request information on each input line as a scheduling target with respect to a desired output line;

a scheduling processing unit, having N-pieces (N is a natural number equal to or more than 2) of priority patterns with different selection priorities between the respective output lines, for selecting the output line unused by other input lines in accordance with the priority pattern and the forwarding request information, whereby said scheduling processing unit executes arbitration such that a scheduling result does not compete between lines; and a priority pointer control unit for indicating a start number of the priority patterns, wherein said scheduling processing unit sequentially performs the scheduling for the N-patterns from the priority pattern indicated by a priority pointer, and updates the start number of the priority patterns at a next scheduling cycle.

27. A scheduling control system according to claim 26, wherein said scheduling processing unit applies a random array inverted LSB/MSB of binary notation permutation layout patterns as the above priority patterns.

28. A scheduling control system according to claim 26, wherein said scheduling processing unit includes means for selecting the forwarding line in accordance with the priority indicated by the priority pattern, and means for making a rotation of a combination of input line numbers and output line numbers which are different between the respective lines at every scheduling cycle.

29. A scheduling control system according to claim 26, wherein said scheduling processing unit includes a scheduler for determining a selection candidate within a small group having a plurality of priority patterns with different selection priorities between all the lines, and an arrangement scheduler for arranging the candidates selected by said scheduler in accordance with the priorities between all the times, and determining the final line.

30. A scheduling control system for a switch having a Virtual Output Queue comprising:

a request information management unit managing the number of scheduling requests and holding forwarding request information on each input line as a scheduling target with respect to a desired output line;

a scheduling processing unit, having N-pieces (N is a natural number equal to or more than 2) or priority patterns with different selection priorities between the respective input lines, for selecting the input line unused by other output lines in accordance with the priority pattern and the forwarding request information; and a priority pointer control unit for indicating a start number of the priority patterns, wherein said scheduling processing unit sequentially performs the scheduling for the N-patterns from the priority pattern indicated by a priority pointer, and updates the start number of the priority patterns at a next scheduling cycle, whereby said scheduling processing unit executes arbitration such that a scheduling result does not compete between lines.

31. A scheduling control system according to claim 30, wherein said scheduling processing unit applies a random array of invented LS/MSB of binary notation permutation layout patterns as the above priority patterns.

32. A packet switch having a Virtual Output Queue comprising:

sorters each serving as a unit sorter for sorting input cells coming from m-lines of input routes and transferring the sorted input cells to m-lines of output routes, said packet switch being constructed by connecting said unit sorters at multi-stages, wherein outputs per said unit sorter of a first-stage unit sorter group are outputted separately to a dummy sorter provided at a second stage and said unit sorter at the second stage, outputs of said second-stage dummy sorter and of said second-stage unit sorter are inputted to a third-stage unit sorter group, and N-input/N-output sorter network is configured on the whole by connecting (2N/m−1)×N/m pieces of said unit sorters, whereby said sorters execute arbitration such that a sorting result does not compete between lines.

33. A packet switch having a Virtual Output Queue comprising:

sorters each serving as a unit sorter for sorting input cells coming from m-lines of input routes an transferring the sorted input cells to N-lines of output routes, said packet switch being constructed by connecting said unit sorters at multi-stages in matrix in X- and Y-directions, wherein outputs of said respective unit sorters are inputted to next-stage unit sorters positioned in (+)X- and (−)Y-directions of said unit sorter, when extending said sort group, the outputs of said respective unit sorters are inputted next-stage unit sorters positioned in the (+)X-direction of said unit sorter, and an N-input/N-output sorter network is configured on the whole by connecting N/m×(N/m+1)/2 pieces of said unit sorters, whereby said sorters execute arbitration such that a sorting result does not compete between lines.

34. A packet switch having a Virtual Output Queue comprising:
- a request information management unit managing the number of scheduling requests and holding forwarding request information on each input line as a scheduling target with respect to a desired output line;
- an inter-highway pointer control unit for holding an inter-highway pointer for indicating a start-of-scheduling input line;
- an intra-highway pointer control unit for holding an intra-highway pointer for indicating a start-of-retrieval output in the forwarding request information corresponding to each input line;
- a request management control unit for holding forwarding request information to a desired output line; and
- a scheduling processing unit for starting the retrieval of the output lines from the output line indicated by said intra-highway pointer control unit from plural pieces of the forwarding request information, and selecting the output line unselected by other input lines, whereby said scheduling processing unit executes arbitration such that a scheduling result does not compete between lines,
- wherein said scheduling processing unit, after allocating the output line numbers to valid cells coming from the respective input lines, allocates dummy output line numbers for idle cells to the input lines to which the valid cells are not allocated, and transfers the output line numbers of the cells coming from all the input lines with different values without any overlaps.

35. A packet switch having a Virtual Output Queue comprising:
- a request information management unit managing the number of scheduling requests and holding forwarding request information on each input line as a scheduling target with respect to a desired output line;
- a scheduling processing unit, having N-pieces (N is a natural number equal to or more than 2) of priority patterns with different selection priorities between the respective output lines, for selecting the output line unused by other input lines in accordance with the priority pattern and the forwarding request information, whereby said scheduling processing unit executes arbitration such that a scheduling result does not compete between lines; and
- a priority pointer control unit for indicating a start number of the priority patterns,
- wherein said scheduling processing unit, sequentially performing the scheduling for the N-patterns from the priority pattern indicated by a priority pointer and updating the start number of the priority patterns at a next scheduling cycle, simultaneously allocates the output line numbers to the valid cells coming from the respective input lines and allocates dummy output line numbers to idle cells by effecting contention control, and transfers the output line numbers of the cells coming from all the input lines with different values without any overlaps.

36. A packet switching method for a switch having a Virtual Output Queue comprising, in a scheduling process of updating an inter-highway pointer indicating a start-of-scheduling input line to a next adjacent input line at every scheduling cycle, and updating an intra-highway pointer indicating a start-of-retrieval output line to a line adjacent to the line with the forwarding determined on the basis of forwarding request information corresponding to the input line, the steps of:
- imparting a sequence number to a phase-synchronization-oriented cell transferred from each input line;
- sequentially incrementing the output line number;
- shifting the output line number at the same tuning between the respective input lines; and
- executing phase synchronization at a cell level by comparing a timing of receiving the phase-synchronization-oriented cell with the sequence number at each lattice point on the switch side, thereby executing arbitration such that a scheduling result does not compete between lines.

37. A packet switching method for a switch having a Virtual Output Queue comprising, in a scheduling process of updating an inter-highway pointer indicating a start-of-scheduling input line to a next adjacent input line at every scheduling cycle, and updating an intra-highway pointer indicating a start-of-retrieval output line to a line adjacent to the line with the forwarding determined on the basis of forwarding request information corresponding to the input line, the steps of:
- transferring in broadcast the cells given the sequence numbers to respective lattice points within said switch from the respective input lines; and
- executing phase synchronization at a cell level by comparing the sequence numbers of the arrived cells at the lattice points within said switch, thereby executing arbitration such that a scheduling result does not compete between lines.

38. A packet switching method for a switch having a Virtual Output Queue comprising, in a scheduling process of updating an inter-highway pointer indicating a start-of-scheduling input line to a next adjacent input line at every scheduling cycle, and updating an intra-highway pointer indicating a start-of-retrieval output line to a line adjacent to the line with the forwarding determined on the basis of forwarding request information corresponding to the input line, the steps of:
- transferring the cells to the respective lattice points within said switch from the input lines; and
- adjusting a phase difference at a cell level by a phase adjustment buffer provided at each lattice point, thereby executing arbitration such that a scheduling result does not compete between lines.

39. A scheduling control system for a switch having a Virtual Output Queue comprising:
- a request information management unit holding forwarding request information for each input line as a scheduling target with respect to a desired output line;
- an inter-highway pointer control unit for indicating a start-of-scheduling input line for a scheduling cycle;
- an intra-highway pointer control unit for indicating, for each input line, a start-of-retrieval output line in the forwarding request information; and
- a scheduling processing unit for starting the scheduling cycle according to the start-of-scheduling input line and retrieving output line; for each input line, starting from the start-of-retrieval output line, said scheduling processing unit scheduling output lines based upon the forwarding request information for each input line and selecting the output line unselected by other input lines, performing the scheduling for all the input lines in sequence, and updating each start-of-retrieval output line indicated by said intra-highway pointer control unit at a next scheduling cycle.

* * * * *

UNITED STATES PATENT AND TRADEMARK OFFICE
CERTIFICATE OF CORRECTION

| | |
|---|---|
| PATENT NO. | : 7,046,685 B1 |
| APPLICATION NO. | : 09/460898 |
| DATED | : May 16, 2006 |
| INVENTOR(S) | : Naoki Matsuoka et al. |

It is certified that error appears in the above-identified patent and that said Letters Patent is hereby corrected as shown below:

Claim 7 column 42, line 66: "-for a switch for a switch-" should be changed to --for a switch--.

Claim 31 column 48, line 28: "-LS/MSB-" should be changed to --LSB/MSB--

Signed and Sealed this

Second Day of January, 2007

JON W. DUDAS
*Director of the United States Patent and Trademark Office*